US009605221B2

(12) United States Patent
Noureldin

(10) Patent No.: US 9,605,221 B2
(45) Date of Patent: Mar. 28, 2017

(54) ENERGY EFFICIENT GASIFICATION BASED MULTI GENERATION APPARATUS EMPLOYING ENERGY EFFICIENT GASIFICATION PLANT-DIRECTED PROCESS SCHEMES AND RELATED METHODS

(71) Applicant: SAUDI ARABIAN OIL COMPANY, Dhahran (SA)

(72) Inventor: Mahmoud Bahy Noureldin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 211 days.

(21) Appl. No.: 14/692,657

(22) Filed: Apr. 21, 2015

(65) Prior Publication Data

US 2015/0376520 A1    Dec. 31, 2015

Related U.S. Application Data

(60) Provisional application No. 62/018,604, filed on Jun. 28, 2014.

(51) Int. Cl.
```
B01J 7/00       (2006.01)
C10J 3/84       (2006.01)
```
(Continued)

(52) U.S. Cl.
CPC ............ *C10J 3/84* (2013.01); *B01J 19/0006* (2013.01); *B01J 19/24* (2013.01); *C10J 3/00* (2013.01);
(Continued)

(58) Field of Classification Search
CPC combination set(s) only.
See application file for complete search history.

(56) References Cited

U.S. PATENT DOCUMENTS 3,607,734 A    9/1971  Stafford, Sr.
3,661,543 A *  5/1972  Saxton .................... C10B 49/22
                                                       201/31

(Continued)

FOREIGN PATENT DOCUMENTS

DE    2853989 B1    11/1979
EP    2100945 A1     9/2009
(Continued)

OTHER PUBLICATIONS

International Search Report and Written Opinion for PCT Application No. PCT/US2015/037688 mailed Oct. 14, 2015; pp. 1-11.
(Continued)

*Primary Examiner* — Imran Akram
(74) *Attorney, Agent, or Firm* — Bracewell LLP; Constance G. Rhebergen; Christopher L. Drymalla

(57) ABSTRACT

Energy-efficient gasification-based multi-generation apparatus, facilities, or systems, and methods of modifying existing gasification-based multi-generation apparatus and the various conventional thermal coupling arrangements, are provided. An exemplary gasification-based multi-generation apparatus includes a gasification system configured to generate the raw syngas feed from a carbon-based feedstock. The gasification system includes a gasification plant or facility, a sour water stripping plant or facility comprising a sour water stripper, a gasification reactor, and a gasification system energy management system. The gasification system energy management system comprises a third gasification system process-to-process heat exchanger unit positioned to receive a wastewater bottom stream from the sour water stripper and to receive at least a portion of an oxygen feed to the gasification reactor to provide heat energy to the at least a second portion of the oxygen feed to the gasification reactor and to cool the wastewater bottom stream from the sour water stripper. The sour water stripping plant or facility
(Continued)

is integrated into the gasification plant or facility through at least the wastewater bottom stream from the sour water stripper.

14 Claims, 22 Drawing Sheets

(51) Int. Cl.
| | |
|---|---|
| C10J 3/82 | (2006.01) |
| C10K 1/00 | (2006.01) |
| C10K 1/02 | (2006.01) |
| C10K 1/10 | (2006.01) |
| B01J 19/00 | (2006.01) |
| B01J 19/24 | (2006.01) |
| C10J 3/20 | (2006.01) |
| F01K 25/10 | (2006.01) |
| C10K 1/04 | (2006.01) |
| C10J 3/00 | (2006.01) |
| C10J 3/80 | (2006.01) |

(52) U.S. Cl.
CPC . *C10J 3/20* (2013.01); *C10J 3/80* (2013.01); *C10J 3/82* (2013.01); *C10K 1/003* (2013.01); *C10K 1/02* (2013.01); *C10K 1/046* (2013.01); *C10K 1/10* (2013.01); *C10K 1/101* (2013.01); *F01K 25/10* (2013.01); *B01J 2219/00103* (2013.01); *B01J 2219/24* (2013.01); *C10J 2200/00* (2013.01); *C10J 2200/09* (2013.01); *C10J 2300/169* (2013.01); *C10J 2300/1861* (2013.01); *C10J 2300/1869* (2013.01); *C10J 2300/1884* (2013.01); *C10J 2300/1892* (2013.01); *Y02E 20/18* (2013.01); *Y02P 20/124* (2015.11); *Y02P 20/129* (2015.11); *Y02P 30/10* (2015.11)

(56) References Cited

U.S. PATENT DOCUMENTS

| | | | |
|---|---|---|---|
| 3,687,646 A | | 8/1972 | Brent et al. |
| 4,017,272 A | | 4/1977 | Anwer et al. |
| 4,032,618 A | * | 6/1977 | Matthews ............ C01B 17/0408 |
| | | | 423/238 |
| 4,087,354 A | | 5/1978 | Hessler |
| 4,129,606 A | | 12/1978 | Gewartowski |
| 4,158,948 A | * | 6/1979 | Schlinger ............... C10G 1/002 |
| | | | 208/414 |
| 4,211,638 A | | 7/1980 | Akell et al. |
| 4,219,402 A | * | 8/1980 | DeGeorge ............... C10B 49/22 |
| | | | 208/410 |
| 4,274,944 A | | 6/1981 | Bannon |
| 4,276,150 A | * | 6/1981 | McHenry, Jr. ........... B01J 29/90 |
| | | | 208/113 |
| 4,673,490 A | | 6/1987 | Subramanian et al. |
| 4,693,883 A | * | 9/1987 | Fleming .................... C01C 1/12 |
| | | | 252/373 |
| 5,100,447 A | | 3/1992 | Krishnamurthy et al. |
| 5,164,070 A | | 11/1992 | Munro |
| 5,240,476 A | | 8/1993 | Hegarty |
| 5,453,177 A | | 9/1995 | Goebel et al. |
| 5,846,268 A | | 12/1998 | Diehl et al. |
| 6,610,112 B1 | | 8/2003 | Klock et al. |
| 6,767,530 B2 | | 7/2004 | Kobayashi et al. |
| 6,902,711 B1 | | 6/2005 | Fujimura |
| 8,070,863 B2 | | 12/2011 | Tsangaris et al. |
| 8,298,505 B2 | | 10/2012 | Zhai et al. |
| 8,567,200 B2 | | 10/2013 | Brook |
| 2003/0131582 A1 | | 7/2003 | Anderson |
| 2005/0126156 A1 | | 6/2005 | Anderson |
| 2008/0015839 A1 | | 1/2008 | Noureldin et al. |
| 2008/0210089 A1 | | 9/2008 | Tsangaris et al. |
| 2009/0206006 A1 | | 8/2009 | Allam |
| 2009/0206007 A1 | | 8/2009 | Allam |
| 2010/0077767 A1 | | 4/2010 | Balmas et al. |
| 2010/0204348 A1 | | 8/2010 | Pedersen et al. |
| 2010/0275781 A1 | | 11/2010 | Tsangaris et al. |
| 2011/0108405 A1 | | 5/2011 | Bommareddy et al. |
| 2011/0120012 A1 | | 5/2011 | Balmas et al. |
| 2011/0203289 A1 | | 8/2011 | Guitierrez et al. |
| 2011/0209407 A1 | | 9/2011 | Arya et al. |
| 2011/0286894 A1 | | 11/2011 | Frydman et al. |
| 2011/0300059 A1 | | 12/2011 | Zhai et al. |
| 2012/0000175 A1 | | 1/2012 | Wormser |
| 2012/0006200 A1 | | 1/2012 | Mazumdar |
| 2012/0055331 A1 | | 3/2012 | Steele |
| 2012/0198768 A1 | | 8/2012 | Khosravian et al. |
| 2012/0313378 A1 | | 12/2012 | Depuy et al. |
| 2013/0047574 A1 | | 2/2013 | Kidambi |
| 2013/0062883 A1 | | 3/2013 | Kaneeda et al. |
| 2013/0291808 A1 | | 11/2013 | Kautto et al. |
| 2015/0005398 A1 | | 1/2015 | Chakravarti |
| 2015/0034876 A9 | | 2/2015 | Ariyapadi |
| 2015/0073188 A1 | | 3/2015 | Floudas et al. |
| 2015/0273386 A1 | * | 10/2015 | Menzel ............. B01D 53/1425 |
| | | | 95/186 |

FOREIGN PATENT DOCUMENTS

| | | |
|---|---|---|
| EP | 2498033 | 9/2012 |
| WO | 9707247 A1 | 2/1997 |
| WO | 0233027 A2 | 4/2002 |
| WO | 2005033022 A1 | 4/2005 |
| WO | 2009132449 A1 | 11/2009 |
| WO | 2009142608 A2 | 11/2009 |
| WO | 2011097648 | 8/2011 |
| WO | 2012036049 A1 | 3/2012 |
| WO | 2012075000 | 6/2012 |

OTHER PUBLICATIONS

PCT International Search Report and Written Opinion dated Sep. 20, 2012 for related PCT Application PCT/2012/036049.
Zukauskas, "Aromatics Production and Use", Giovanni Treccani Encyclopedia of Hydrocarbons, vol. II Dec. 31, 2006, pp. 591-605.
Kataoka, "Energy Saving Process Intensification of an Oil Refinery Distillation Plant by an Internal Heat Integration Method", Proceedings of European Congress of Chemical Engineers, Sep. 20, 2007, pp. 1-15.
Hirata, "Heat Integration of Distillation Column", vol. 18, Dec. 31, 2009, pp. 39-44.
Nakaiwa, "Innovation in Distillation Process", Synthesiology, vol. 2, No. 1, Jun. 30, 2009, pp. 55-63.
Douglas, "Heat Exchanger Networks", Conceptual Design of Chemical Processes, Dec. 31, 1988, McGraw-Hill International Editions, Singapore, pp. 216-288.
International Search Report and Written Opinion for related PCT application PCT/US2015/037675 dated Oct. 14, 2015.
International Search Report and Written Opinion for related PCT application PCT/US2015/037702 dated Oct. 7, 2015.
International Search Report and Written Opinion PCT/US2015/037603 dated Dec. 21, 2015.
EP Examination Report for EP Application Serial No. 12722003.6; Report Mail Date Jul. 5, 2016.
Invitation to Pay Additional Fees and, where applicable, Protest Fee for PCT Application No. PCT/US2015/037603 mailed Oct. 14, 2015; pp. 1-10.
Kemp, "Pinch Analysis and Process Integration, A User Guide on Process Integration for the Efficient Use of Energy", IChem E, 2007 pp. 1-415, Elsevier.

* cited by examiner

ENERGY EFFICIENT GASIFICATION BASED MULTI GENERATION APPARATUS EMPLOYING ENERGY EFFICIENT GASIFICATION PLANT-DIRECTED PROCESS SCHEMES AND RELATED METHODS

RELATED APPLICATIONS

This application claims priority to and the benefit of U.S. Provisional Patent Application Ser. No. 62/018,604, by Noureldin, titled "Energy Efficient Gasification Based Multi Generation Apparatus Employing Advanced Process Schemes and Related Methods" filed on Jun. 28, 2014, which is related to U.S. patent application Ser. No. 13/099,144, by Noureldin, titled "Energy-Efficient and Environmentally Advanced Configurations for Naptha Hydrotreating Process" filed on May 2, 2011, which are each incorporated herein by reference in their entireties. This application also relates to: U.S. patent application Ser. No. 14/692,633, by Noureldin, titled "Energy Efficient Gasification Based Multi Generation Apparatus Employing Advanced Process Schemes and Related Methods" filed on the same day as this application, Apr. 21, 2015; U.S. patent application Ser. No. 14/692,666, by Noureldin, titled "Energy Efficient Gasification-Based Multi Generation Apparatus Employing Energy Efficient Acid Gas Removal Plant-Directed Process Schemes and Related Methods" filed on the same day as this application, Apr. 21, 2015; and U.S. patent application Ser. No. 14/392,673, by Noureldin, titled "Energy Efficient Apparatus Employing Energy Efficient Process Schemes Providing Enhanced Integration of Gasification-Based Multi-Generation and Hydrocarbon Refining Facilities and Related Methods" filed on the same day as this application, Apr. 21, 2015; all of which are each incorporated herein by reference in their entireties.

BACKGROUND OF THE INVENTION

1. Field of the Invention

This invention relates generally to energy conservation and greenhouse gas reduction, and to gasification based multi-generation apparatus employing advanced energy integration process schemes and methods of reducing energy utility requirements and greenhouse gas emissions in a gasification based multi-generation apparatus through advanced energy integration.

2. Description of the Related Art

Carbon-based feedstock-gasification plants and facilities for multi-commodities generation facilities have become a competitive option for syngas; combined heat and power plants and utilities; hydrogen production; sulfur production; and chilled water production for power generation, oil refining, gas-to-liquid conversion, and chemical and petrochemical industry applications.

Gasification is a process that converts carbonaceous materials into carbon monoxide, hydrogen and carbon dioxide. This is achieved by reacting the material at high temperatures (>700° C.), without combustion, with a controlled amount of oxygen and/or steam. The resulting gas mixture is called syngas (synthetic gas) or producer gas and is itself a fuel. The power derived from gasification and combustion of the resultant gas is considered to be a source of renewable energy if the gasified compounds were obtained from biomass.

An advantage of gasification is that using the syngas is potentially more efficient than direct combustion of the original fuel because it can be combusted at higher temperatures or even in fuel cells. Syngas can be burned directly in gas engines, used to produce methanol and hydrogen, or converted into synthetic fuel. Gasification can also begin with material which would otherwise have been disposed of such as biodegradable waste. Additionally, the high-temperature process can refine out corrosive ash elements such as chloride and potassium, allowing clean gas production from what would otherwise be considered problematic (dirty) fuels. Gasification of fossil fuels is currently used on industrial scales to generate electricity.

Power generators, oil refinery operators, and methanol and ammonia producers are looking for cleaner, reliable, and proven technology to generate power using coal, crude vacuum residues, biomass and other carbon-based fuels. Gasification is also an efficient means of converting low-value fuels and residuals into syngas. Syngas is used to produce power, steam, hydrogen, sulfur and basic chemicals such as methanol and ammonia. Gasification can also help solve the challenges of reliable power generation in industrial complexes.

Coal has traditionally powered much of the industrial world for more than a hundred years, and is still an abundant, low-cost resource. However, there is a growing concern over carbon emissions and their effect on the environment. As such, environmental regulations are demanding that coal be used in a cleaner, more efficient way to solve the world's growing demand for energy.

Integrated Gasification Combined Cycle, or IGCC. Integrated IGCC is a process that can turn coal and other carbon-based materials into a cleaner fuel that is used for more efficient power generation and raw material for chemical and oil refining facilities. For an example, gasification can turn coal into syngas gas. Syngas is also carbon capture ready, meaning it is possible to capture up to 90% of the $CO_2$ generated from coal. To further increase efficiency and output, IGCC calls for taking any leftover heat or steam to power a second turbine. Gasification can also turn heavy refinery residues and petcoke into clean syngas (synthetic natural gas), creating more economic value from residues by converting into energy and valuable commodities like oxygen, nitrogen and hydrogen. It can provide an alternative source of natural gas in regions with high prices. Syngas output has more than enough energy value to power various users and enough energy value to run a Methanol Plant.

The process of producing energy using the gasification method has been in use for more than 180 years. During that time coal and peat were used to power these plants. Initially it was developed to produce town gas for lighting and cooking in 1800s, then later replaced by electricity and natural gas. It has also been used in blast furnaces, but has played a larger role since the 1920s in the production of synthetic chemicals. By 1945 there existed trucks, buses and agricultural machines that were powered by gasification.

In a gasifier, the carbonaceous material undergoes several different processes. The dehydration or drying process occurs at around 100° C. Typically the resulting steam is mixed into the gas flow and can be involved with subsequent chemical reactions, notably the water-gas reaction if the temperature is sufficiently high enough. The pyrolysis (or de-volatilization) process occurs at around 200-300° C. Volatiles are released and char is produced, resulting in up to a 70% weight loss for coal. The process is dependent on the properties of the carbonaceous material and determines the structure and composition of the char, which will then undergo gasification reactions. The combustion process occurs as the volatile products and some of the char, for example, reacts with oxygen to primarily form carbon dioxide and small amounts of carbon monoxide, which provides heat for the subsequent gasification reactions. The basic reaction is:

$$C+O_2 \rightarrow CO_2.$$

The gasification process occurs as the char reacts with carbon and steam to produce carbon monoxide and hydrogen, via the following reaction:

$$C+H_2O \rightarrow H_2+CO.$$

The reversible gas phase water gas shift reaction reaches equilibrium very fast at the temperatures in a gasifier. This balances the concentrations of carbon monoxide, steam, carbon dioxide and hydrogen:

$$CO+H_2O \leftrightarrow CO_2+H_2.$$

A limited amount of oxygen or air is introduced into the reactor to allow some of the organic material to be "burned" to produce carbon monoxide and energy, which drives a second reaction that converts further organic material to hydrogen and additional carbon dioxide. Further reactions occur when the formed carbon monoxide and residual water from the organic material react to form methane and excess carbon dioxide. This third reaction occurs more abundantly in reactors that increase the residence time of the reactive gases and organic materials, as well as heat and pressure of the reaction. In more sophisticated reactors, catalysts are used to improve the reaction rates, resulting in a movement of the system to a state that is closer to the reaction equilibrium for a fixed residence time.

Several types of gasifiers are currently available for commercial use. They include: counter-current fixed bed, co-current fixed bed, fluidized bed, entrained flow, plasma, and free radical.

In the counter-current fixed bed ("up draft") gasifier, a fixed bed of carbonaceous fuel, e.g., coal or biomass, through which the "gasification agent," e.g., steam, oxygen and/or air, flows in counter-current configuration. The ash is either removed in the dry condition or as a slag. Gasifiers generally require that the fuel have a high mechanical strength and preferably non-caking so that it will form a permeable bed, although recent developments have reduced these restrictions to some extent. The throughput for this type of gasifier is relatively low. Thermal efficiency is high as the temperatures in the gas exit are relatively low. Tar and methane production, however, is significant at typical operation temperatures, so the product gas must be extensively cleaned before use. The tar can be recycled to the reactor.

In the gasification of fine, uncondensed biomass, it is necessary to blow air into the reactor by means of a fan. This creates very high gasification temperature, as high as 1000° C. Above the gasification zone, a bed of fine and hot char is formed, and as the gas is forced through this bed, most complex hydrocarbons are broken down into simple components of hydrogen and carbon monoxide.

In the co-current fixed bed ("down draft") gasifier, the gasification agent gas flows in co-current configuration with the fuel, i.e., downwards, hence the name "down draft gasifier." Heat is added to the upper part of the bed, either by combusting small amounts of the fuel or from external heat sources. The produced gas leaves the gasifier at a high temperature, and most of this heat is transferred to the gasification agent added in the top of the bed, resulting in energy efficiency on level with the counter-current type. Since all tars must pass through a hot bed of char in this configuration, tar levels, however, are much lower than in the counter-current type.

In the fluidized bed reactor, the fuel is fluidized in oxygen and steam or air. The ash is removed dry or as heavy agglomerates that de-fluidize. The temperatures are relatively low in dry ash gasifiers, so the fuel must be highly reactive; low-grade coals are particularly suitable. The agglomerating gasifiers have slightly higher temperatures, and are suitable for higher rank coals. Fuel throughput is higher than for the fixed bed, but not as high as for the entrained flow gasifier. The conversion efficiency can be rather low due to elutriation of carbonaceous material. Recycle or later combustion of solids can be used to increase conversion. Fluidized bed gasifiers are most useful for fuels that form highly corrosive ash that would damage the walls of slagging gasifiers. Biomass fuels, which typically contain high levels of corrosive ash, are a candidate for this type of gasifier.

In the entrained flow gasifier, a dry pulverized solid, an atomized liquid fuel or a fuel slurry is gasified with oxygen (much less frequent: air) in co-current flow. The gasification reactions take place in a dense cloud of very fine particles. Most types of coal are suitable for this type of gasifier because of the high operating temperatures and because the coal particles are generally well separated from one another. The high temperatures and pressures of this type of gasifier allow for a higher throughput. Thermal efficiency, however, is somewhat lower as the gas must be cooled before it can be cleaned according to existing technology. The high temperatures also result in the nonexistence of tar and methane in the product gas. However the oxygen requirement is higher than for the other types of gasifiers. All entrained flow gasifiers remove the major part of the ash as a slag as a result of the operating temperature being well above the ash fusion temperature.

Additionally, a smaller fraction of the ash is produced either as a very fine dry fly ash or as "black" colored fly ash slurry. Some fuels, in particular certain types of biomasses, can form slag that is corrosive to the ceramic inner walls that protect the gasifier outer wall. Some entrained flow type of gasifiers, however, do not possess a ceramic inner wall, but instead have an inner water or steam cooled wall covered with partially solidified slag. These types of gasifiers do not suffer from problems associated with corrosive slags.

Some fuels have ashes with very high ash fusion temperatures. In these types of fuels, a limestone additive is mixed with the fuel prior to gasification. Additionally of relatively small amounts of limestone will generally lower the fusion temperatures. In this gasifier, the fuel particles must be much smaller than for other types of gasifiers. As such, the fuel must be pulverized, which requires somewhat more energy than for the other types of gasifiers. The most energy consumption related to entrained flow gasification is not the milling of the fuel but the production of oxygen used for the gasification.

In a plasma gasifier, a high-voltage current is fed to a torch, creating a high-temperature arc. The inorganic residue is retrieved as a glass-like substance.

There are a large number of different feedstock types for use in the various types of gasifiers, each with different characteristics, including size, shape, bulk density, moisture content, energy content, chemical composition, +ash fusion characteristics, and homogeneity of all these properties. Coal and petroleum coke are typically used as feedstocks for many large gasification plants worldwide. Additionally, a variety of biomass and waste-derived feedstocks can be gasified, to include wood pellets and chips, waste wood, plastics, aluminum, municipal solid waste, refuse derived fuel, agricultural and industrial wastes, sewage sludge, switch grass, discarded seed corn, corn stover, and other crop residues.

Gasification of waste materials has several advantages over incineration. The necessary extensive flue gas cleaning can be performed on the syngas instead of the much larger volume of flue gas after combustion. Electric power can be generated in engines and gas turbines, which are much cheaper and more efficient than the steam cycle used in incineration. Even fuel cells may potentially be used, but these have rather severe requirements regarding the purity of the gas. Chemical processing of the syngas may produce other synthetic fuels instead of electricity. Some gasification processes treat ash containing heavy metals at very high temperatures so that it is released in a glassy and chemically stable form.

A major challenge for waste gasification technologies is to reach an acceptable (positive) gross electric efficiency. The high efficiency of converting syngas to electric power is counteracted by significant power consumption in the waste preprocessing, the consumption of large amounts of pure oxygen, which is often used as a gasification agent, and in gas cleaning. Another challenge when implementing the processes is how to obtain long service intervals, so that it is not necessary to close down the plant every few months for cleaning the reactor.

Syngas can not only be used for heat production and generation of mechanical and electrical power, but also as a raw material to many chemicals production. Like other gaseous fuels, use of syngas provides greater control over power levels when compared to solid fuels, leading to more efficient and cleaner operation. Syngas can also be used for further processing to liquid fuels or chemicals.

Gasifiers also offer a flexible option for thermal applications, because they can be retrofitted into existing gas fueled devices such as ovens, furnaces, boilers, etc., where syngas may replace fossil fuels. Notably, the heating values of syngas are generally considered to be around 4-10 $MJ/m^3$. Industrial-scale gasification is currently mostly used to produce electricity from fossil fuels, such as coal, where the syngas is burned in a gas turbine. Gasification is also used industrially in the production of electricity, ammonia and liquid fuels (e.g., oil) using the Integrated Gasification Combined Cycles (IGCC), described previously. IGCC is also considered to be a more efficient method of $CO_2$ capture as compared to conventional technologies. IGCC demonstration plants have been operating since the early 1970s and some of the plants constructed in the 1990s are now ready to enter commercial service.

In Europe, where the wood source is sustainable, 250-1000 kWe and new zero carbon biomass gasification plants have been installed in Europe that produce tar free syngas from wood and burn it in reciprocating engines connected to a generator with heat recovery. This type of plant is often referred to as a wood biomass CHP unit, and is typically used in small business and building applications.

Diesel engines can be operated on dual fuel mode using a producer gas, such as syngas. Diesel substitution of over 80% at high loads and 70-80% under normal load variations can be achieved. Spark ignition engines can operate on 100% gasification gas. Mechanical energy from the engines can be used, for an example, in driving water pumps for irrigation or for coupling with an alternator for electrical power generation.

While small scale gasifiers have existed for well over 100 years, there have been few sources to obtain a ready to use machine.

In principle, gasification can proceed from just about any organic material, including biomass and plastic waste, to produce syngas, which can be combusted. Alternatively, if the syngas is clean enough, it can be used for power production in gas engines, gas turbines or even fuel cells, or converted efficiently to dimethyl ether, methane, or a diesel like synthetic through fuel. In many gasification processes most of the inorganic components of the input material, such as metals and minerals, are retained in the ash. In some gasification processes, such as slagging gasification, for example, this ash has the form of a glassy solid with low leaching properties, but the net power production in slagging gasification is low or negative, and the costs can be higher.

Regardless of the final fuel form, gasification itself and subsequent processing neither directly emits nor traps greenhouse gases such as carbon dioxide. Power consumption in the gasification and syngas conversion processes can be significant, and can indirectly cause $CO_2$ emissions; and in slagging and plasma gasification, the electricity consumption may even exceed the power production from the produced syngas.

Notably, the combustion of syngas or derived fuels emits exactly the same amount of carbon dioxide as would have been emitted from direct combustion of the initial fuel. Biomass gasification and combustion could, however, play a significant role in a renewable energy economy, because biomass production removes the same amount of $CO_2$ from the atmosphere as is emitted from gasification and combustion. While other biofuel technologies, such as biogas and biodiesel are carbon neutral, gasification in principle may utilize a much larger variety of input materials and can be used to produce a much larger variety of output fuels.

Referring to FIG. 1, the carbon-based feedstock-gasification multi-generation facilities 50 generally includes the core plants, including a gasification plant 51, an acid gas removal plant 52, a hydrogen recovery plant 53, a sour water stripping plant 54, a condensate polishing plant 55, a sulfur recovery plant 56, and an air separation plant 57, described below, along with a power generation plant 58.

Gasification Plant (GP):

In a typical example, the gasification plant 51 in the carbon-based feedstock-gasification multi-commodities-generation facility 50 for power, steam, hydrogen and chilled water generation, can convert about 500 ton per hour vacuum residue (VR) or high sulfur fuel oil (HSFO) feed into carbon monoxide (CO), hydrogen (H2) and carbon dioxide (CO2). These gaseous products, collectively known as "syngas," are subsequently used in a power generation plant block as fuel, and as feedstock to a hydrogen recovery unit (HRU) of a hydrogen recovery plant 53. The gasification process is a non-catalytic and auto-thermal process where the feedstock is partially oxidized with oxygen and steam to produce syngas.

Referring to FIG. 3, the syngas at about 1300° C. from a gasification reactor 61 is cooled in the syngas effluent cooler 63 (SEC). In this SEC 63, boiler feed water (BFW) is heated to generate high pressure (HP) steam by an economizer heat exchange unit BE1. Once the syngas leaves the SEC 63, it further cools in an economizer BE1 against BFW. Leaving the economizer BE1, the syngas still contains carbon and ash particles so it passes to the Soot Ash Removal Unit 65 (SARU). In order to remove all syngas solids content in the SARU 65, the syngas is contacted in a two-stage water wash. The first stage 67 is called the soot quench and the second stage 68 is the soot scrubber. The treated syngas leaves the soot scrubber 68 and passes to the acid gas removal plant 52. The SARU 65 also includes a soot separator 69 and a soot filter 70.

Within the gasification plant 51, the high pressure steam is produced by heat recovery from the hot syngas leaving the SEC 63. The other hot streams in the gasification plant are air-cooled to their target temperatures using coolers C1, C2. The oxygen required for gasification is preheated by high pressure steam stream produced in the plant using utility heat exchanger unit H1.

Acid Gas Removal Plant:

The Acid Gas Removal (AGRP) plant 52 is an integral part of any carbon-based feedstock-gasification multi-commodities-generation facilities, e.g., power, steam, hydrogen, sulfur and chilled water generation, and treats the syngas produced from the upstream Gasification Unit or Plant 51.

Referring to FIG. 5, the AGRP 52 normally includes several identical trains including a reaction section 81 and a separation section 82 with back-up to guarantee the carbon-based feedstock-gasification desired facility availability level. Note, only one train is shown in the figure. Each train has a HCN/COS (HCN and/or COS) Hydrolysis unit 83 located in the reaction section 81 and typically comprising a contaminant hydrolysis (catalytic) reactor 85, and a Sulfinol-M unit 91 located in the separation section 82 and typically comprising a contaminant absorber column 92, a solvent regenerator 93, and an enrichment contractor 94, for example. The HCN/COS Hydrolysis unit 83 removes contaminants such as Hydrogen° Cyanide (HCN) and Carbonyl Sulfide (COS). These contaminants are formed in the gasification plant 51 and may cause amine degradation to the downstream Sulfinol-M unit 91. The Sulfinol-M unit 91 is a regenerative amine process to remove H2S, CO2, COS, mercaptans and organic sulfides/disulfides from the gas streams. These harmful contaminants are either in the syngas stream from the gasification plant 51 or formed in the HCN/COS Hydrolysis unit 83. After the syngas is treated in the acid gas removal plant 52, it is routed either to the Hydrogen Recovery Plant 53 for high purity hydrogen production or the Power Generation plant 58 for steam production and power generation.

In the acid gas removal plant 52, the syngas feed 101 from the gasification plant 51 is preheated by the reactor effluent 102 in reactor feed-effluent heat exchanger BE3 and the reactor effluent 102 is further cooled by cold polished condensate stream 103 in condensate-reactor effluent heat exchanger BE4 which recovers heat from the bottom stream effluent at 102 of the HCN/COS hydrolysis main catalytic reactor 85. A HCN/COS syngas knockout (KO) drum 95 collects sour water condensed as a result of a reduction in temperature of the effluent bottom stream 102 of the contaminant hydrolysis reactor 85 by reactor effluent-condensate heat exchanger BE4 and cooler/chiller C8 prior to entering the contaminant absorber 92.

Heat recovery is also utilized between the lean solvent bottom stream 105 from the Sulfinol-M regenerator unit 93 and the rich solvent bottom stream 106 of the main absorber section 92 in the rich solvent-lean solvent bottom streams heat exchanger BE5. Hot utilities, such as high pressure steam and low pressure steam via hot utility heat exchanger units H3, H4, H5, are used to further heat process steams to their target temperatures. Cold utilities, such as air, cooling water and chilled water through cold utility exchangers C8, C9, C10, C11, C12, are utilized to cool process streams to their desired target temperatures.

Recognized by the inventor, however, is that although the technology of acid gas removal on a standalone basis is mature in the gas processing industry, its energy integration with the gasification, power generation and condensate handling plants, is not optimally addressed in the public domain.

Hydrogen Recovery Plant:

The hydrogen recovery plant (HRP) 53 in the carbon-based feedstock-gasification multi-commodities generation facility 50 for power, steam, hydrogen and chilled water generation, upgrades the hydrogen from the treated syngas leaving the acid gas removal plant 52. The plant 53 generally includes a membrane pre-treatment section 111, gas separation membrane unit 112, a compressor 113, and a pressure swing adsorption (PSA) unit 114.

Referring to FIG. 7, the Syngas upon entering the HRP 53 is first treated in the membrane pre-treatment unit 111. In this membrane pre-treatment unit 111, all liquids in the treated syngas feed are removed in its feed filter coalescer (not shown). The feed is then heated in a steam heater H2, for example, to the operation temperature of a gas separation membrane unit 112. The gas separation membrane unit 112 separates the available feed gas into two streams. One stream is available at high pressure and the other stream is available at low pressure. The high-pressure stream leaving the gas separation membrane unit 112 is called the non-permeate and is available at a pressure equal to the pressure in the feed minus the friction losses in the piping and membrane modules. The non-permeate directly feeds the power generation plant 58. The low-pressure stream leaving the gas separation membrane unit 112 is called the "permeate". The permeate design pressure has been selected so that there is an optimum separation (i.e., hydrogen enrichment) of the feed gas proceeding to the membranes 112.

Downstream of the membranes 112, this permeate is first cooled and made free of liquids in the permeate knock-out drum (not shown). The permeate then flows to the permeate compressor 113 in order to pressurize this hydrogen rich stream to such a level that it is sufficient to pass through a PSA unit 114 before supplying the end user such as, for example, a finery with hydrogen.

Downstream of the permeate compressor 113, the gas is first cooled in water cooler C3 and then consequently in a chilled water cooler (not shown). The stream leaving the permeate compressor's after coolers (not shown) is then made free of liquids in the PSA feed knock-out drum (not shown). The gas leaving the PSA feed knock-out drum then enters the PSA unit 114. This PSA unit 114 separates the permeate gas into a high-purity hydrogen stream and a PSA tail gas stream. The PSA tail gas is used as fuel for power generation in the power generation plant 58. The high-purity hydrogen stream is the final product of this hydrogen recovery plant 53 and is available at the required pressure for the end user, such as an oil refinery.

Regarding the energy requirements within the HRP 53, there is a hot stream to be cooled by cooling unit C3 and a cold stream to be heated by steam heater H2 by using cold and hot utilities. Hence heating and cooling duties are required. Low pressure steam is used to heat the treated syngas coming from the AGRP after it has been made free of liquids. The permeate process stream in the conventional design is cooled using cooling water. The stream leaving the permeate compressor 113 is first cooled using cooling water and then it gets chilled using chilled water.

Sour Water Stripper Plant (SWSP):

The SWSP 54 is an integral part of any carbon-based feedstock-gasification multi-commodities generation facility 50. Referring to FIG. 9, the SWSP 54 receives sour water streams that include the excess filtrate water from the soot water filtration from the soot filter of the gasification plant 51, and the condensate and sour waters from the acid gas removal plant 52, sulfur recovery plant 56, and flare unit (not shown). These streams are collected in the waste water collection tank (not shown) of the sour/waste water stripping unit, which includes a sour water stripper column 117. The SWSP 54 also receives the sour gas stripped and released from the soot water flash vessel.

In the sour water stripper 117, the sour water from SWSP tank is stripped counter-currently with live steam. The ascending flow of steam strips the sour components, primarily carbon dioxide ($CO_2$), hydrogen sulfide ($H_2S$) and ammonia ($NH_3$), from the descending sour water stream. A caustic solution (NaOH) is also added at an intermediate point in the stripper 117 bottom to enhance ammonia stripping. The temperature of the overhead column should be maintained well above 80° C. in order to avoid plugging in the upper section of the column caused by the formation of $NH_4HS$ and $NH4HCO_3$ salts/solids. The condensing sour gas stream leaves over the top and the stripped waste water stream leaves at the bottom.

The overhead vapors from the stripper 117 and from soot water flash vessel (not shown) are partially condensed in the stripper off-gas air cooler (not shown) before being routed to the stripper reflux accumulator (not shown). The overhead condenser (not shown) of the stripper off-gas air cooler maintains the exit temperature at minimum 100° C. including in seasons with low ambient temperatures. The temperature is an optimum of forming salts and corrosion in the stripper off-gas air cooler. In the stripper reflux accumulator, the liquid and the non-condensed vapors are separated. The stripper reflux pump (not shown) delivers/pumps the liquid back to the rectifying section in the top of the column. The produced sour gas stream, having low water content, cooled by a cooling utility exchanger C4, is routed to the sulfur recovery plant 56 and at upset conditions to the sour flare.

The waste water stream leaving the bottom of the stripper 117 is cooled by waste water air cooler C5 and waste water cooler C6, and then routed to the off-site battery/bound limit (OSBL) for further treatment in a bio-treatment plant. The wastewater still contains dissolved ash components, which makes the effluent water from the bottom of the stripper 117 unfit for reprocessing as make-up/boiler water. For biological treatment reasons, the wastewater is cooled to minimum achievable temperature given the cooling capabilities of air cooling and closed loop cooling water (about 45° C.).

Condensate Polishing Plant:

The carbon-based feedstock-gasification multi-commodities generation facility 50 includes a condensate collection and polishing plant 55 that collects and polishes condensate from the whole facility 50. Referring to FIG. 11, the condensate polishing plant 55 stores the polished condensate in the condensate storage tank 121 and sends the polished condensate to the power generation plant 58 to make boiler feed water (BFW) for steam and power generation. Therefore, the condensate polishing system is linked to all the site-wide process plants in the carbon-based feedstock-gasification multi-commodities generation facility 50.

Referring to FIG. 11, atmospheric condensate flash drum(s) 122 collects the carbon-based feedstock-gasification multi-commodities generation facility condensate and uses an air cooler (not shown) as a trim steam condenser. In turn, low pressure (LP) condensate collected from various units in the carbon-based feedstock-gasification multi-commodities generation facility 50 is cooled with demineralized water in heat exchangers BE2. It is further cooled by trim cooler(s) C7. The condensate from the atmospheric condensate flash drum 122 mixes with the LP condensate collected from various other units in the carbon-based feedstock-gasification multi-commodities generation facility 50. This condensate is then polished in the condensate polisher unit 123. The carbon-based feedstock-gasification multi-commodities generation facility polished condensate is treated by neutralizing amine for pH adjustment and then stored in the condensate storage tanks 121. Such condensate is then pumped to the power generation plant to make boilers/economizers BE1/heat recovery steam generators feed water.

Sulfur Recovery Plant:

Referring again to FIG. 1, the sulfur recovery plant 56 (components not shown in detail) in the carbon-based feedstock-gasification multi-commodities generation facility 50, as would be understood by one of ordinary skill in the art, produces sulfur via processing the acid gas streams leaving the acid gas removal plant(s) 52 and the Claus off-gas treating process. These acid gas streams are combined and routed to amine acid gas knock-out drum to separate entrained water. In order to increase the main burner temperature for ammonia destruction, the acid gas from knock-out drum is divided into a main stream which feeds the main burner and a minor stream which flows to the main combustion chamber. Before entering the main burner the main amine acid gas stream flows through the amine gas pre-heater where it is heated to 240° C. against HP Steam. Off-gas from the sour water stripper (SWS) 117 flows to the SWS 117 gas knock-out drum where any sour water liquid is removed. It then flows to the SWS 117 gas pre-heater where the gas is also heated to about 240° C. by HP steam.

The amine acid gas and the SWS 117 off-gas are then combined and become the feed gas for the Claus main burner. Pure oxygen is supplied to the main burner to maintain the temperature in the main combustion chamber sufficiently high. The oxygen supplied to the burner is exactly sufficient to accomplish the complete oxidation of all hydrocarbons and ammonia present in the feed gas. The minor acid gas stream is introduced to the back end of the combustion chamber to mix and react with the hot gasses from the front end prior to entering the Claus waste heat boiler.

The process gas is cooled with boiler feed water thereby generating saturated HP steam. Part of the steam is used for heating the process gas in the re-heaters and the surplus is superheated in the steam super-heater in the incinerator section before being fed into the HP steam grid. The process gas is introduced into the first sulfur condenser, where it is further cooled and the sulfur vapor is condensed while generating LP steam. Liquid sulfur is drained to the sulfur collecting vessel via first sulfur lock. The process gas outlet temperature is determined by the condenser design and the pressure of the LP steam generated in the condenser.

Further conversion into sulfur is achieved by using a catalytic process in two subsequent converters containing highly reactive catalysts. Prior to entering first Claus converter, the process stream is heated in the first Claus re-heater to the optimum temperature for catalytic conversion. The effluent gas of the first converter is passed to second Sulfur Condenser where the sulfur is condensed and drained to the collecting vessel via second sulfur lock. After the first stage, approximately 85-90% of the sulfur present in the feed gas has been recovered. In order to increase the recovery rate, a second converter stage has been incorporated, consisting of second Claus re-heater, second Claus converter, and third sulfur condenser. The condensed sulfur is drained via third sulfur lock. After the second converter stage approximately 95% of the sulfur has been recovered. The Claus tail gas is routed via coalescer to the "Claus off-gas treating" process section.

Any produced sulfur is drained via fourth sulfur lock. The heat released by cooling the gas and condensing the sulfur results in the production of LP steam. The sulfur as it is produced in the Claus section is routed to the sulfur degassing section that reduces the hydrogen sulfide (H2S) content in the stripping section of the sulfur degassing vessel. The sulfur collecting vessel is provided to obtain the gravity draining from the sulfur condensers. Prior to entering the collecting vessel, the sulfur from the locks is cooled in sulfur cooler. The Claus tail gas is reheated to about 210° C. in the re-heater prior to entering the converter, which contains a reducing catalyst. In the converter all sulfur components are catalytically converted into H2S by the reducing components in the process gas. The reactions in the converter are exothermic, so the gas temperature rises.

The process gas exiting the converter is cooled to approximately 43° C. by direct contact cooling with a counter-current flow of water in quench column. The water vapor in the process gas is partly condensed and mixed with the circulating cooling water. The excess water (condensed) is sent to sour water collecting drum. The overhead gas from the quench column is routed to the absorber 92. The circulating water is cooled from approximately 74 to 42° C. in quench water air cooler followed by quench water trim cooler and sent to the top of the quench column. In the Absorber 92, the process gas is contacted counter-currently with a lean 40 wt. % MDEA solution supplied to the top of the column. Virtually all H2S is removed from the gas and only approximately 10-20% of the carbon dioxide (CO2) present in the process gas is co-absorbed in the solvent.

The treated gas leaving the absorber 92 (so-called off-gas) is sent to the incinerator section. The rich solvent leaving the absorber 92 bottom is heated in lean/rich exchanger and sent to the regenerator 93. In the lean/rich heat exchanger, the cold rich solvent is heated by the hot lean solvent from the regenerator 93 bottom. In the regenerator 93, H2S and CO2 are stripped from the solvent. The required heat is delivered by reboiler, in which lean solvent is re-boiled using LP steam. The released H2S, CO2 and residual steam are routed from the regenerator 93 top via overhead condenser to the regenerator 93 reflux drum. The condensed water is separated in this drum from the acid gas and the gas is recycled to the front of the Claus section. Lean solvent from the regenerator 93 bottom proceeds to the lean/rich exchanger. The lean solvent is further cooled in lean solvent trim cooler against cooling water to about 45° C., after which a part of the solvent is passed through lean solvent filter. To obtain the required lean solvent temperature of 30° C., the lean solvent is further cooled in lean solvent chilled cooler against chilled water. The cooled lean solvent is then routed as reflux to the absorber 92. The tail gas and the vent gas from the sulfur degassing contain residual H2S and other sulfur compounds, which cannot be released directly to atmosphere. These gases are therefore thermally incinerated in the incinerator chamber at 850° C. to convert residual H2S and sulfur compounds into sulfur dioxide. The gases to be incinerated are heated by mixing with hot flue gas, obtained by combustion of fuel gas in the incinerator burner. The flue gas leaving the incinerator chamber is cooled first in the incinerator waste heat boiler, prior to entering the HP Steam super-heater. Here the flue gas is further cooled to approximately 300° C. thereby superheating the surplus of HP steam after which the flue gas is discharged to the atmosphere via stack.

Air Separation Plant:

The air separation unit (ASU) 57 (not shown in detail) of the IGCC complex takes ambient air and produces near-pure oxygen and nitrogen streams. The oxygen is used in the Gasifier Unit (GU) and Sulfur Recovery Unit (SRU), and the nitrogen is used in the SRU and Power Block. In total, about 770 tph oxygen at 35° C. and 80 barg is needed, and about 2500 tph nitrogen is produced alongside for about 500 tph vacuum residue feed for the gasification plant 51. The typical double-column ASU 57 is usually used on site in the carbon-based feedstock-gasification multi-commodities generation facility 50.

Carbon-based-feedstock-gasification plants for multi-commodities generation facilities have become one of the competitive options for syngas; combined heat and power; hydrogen; sulfur; chilled water production for power generation, oil refining, Gas-to-Liquid, chemical and petrochemical industries' applications.

Accordingly, recognized by the inventor is that it would be beneficial to numerous industries such as combined heat and power generation, oil refining, and chemicals production industries, to make carbon-based feedstock-gasification multi-generation facilities significantly more energy efficient and to reduce heating energy-utility-based GHG emissions, while preserving its operability and "retrofitability" due to future expansion needs for more power and heat generation; more syngas production for chemical industries, and/or more hydrogen for oil refining.

The inventor has also recognized that it will be beneficial to such industries to make such very important carbon-based feedstock-gasification facilities, comprising many integrated plants for multi-commodities generation, significantly more "green" via enhanced energy efficiency and reducing energy-based GHG emissions by 30%, or more, with a view towards operability with even more involved plants integration, and retrofitability due to future expansions in production capacities.

The inventor has further recognized the need for modifications to various configurations of carbon-based-feedstocks-gasification for multi-generation facilities' plants configurations to make the whole multi-generation facility energy system, which includes several plants and/or facilities, more efficient, less polluting, operable at different plants'-specific operating modes, and readily retrofitable upon future expansions.

For such purpose, the inventor has recognized the need to modify carbon-based-feedstock-gasification for multi-generation facilities that produce, for example, power; hydrogen; sulfur; steam; syngas; and chilled water, to be more energy integrated to make it dramatically more energy efficient and less polluting due to energy-based GHG emissions, as well as operable and retrofitable upon its future expansion. These facilities can include gasification, acid gas removal, hydrogen recovery, condensate handling, sour water stripping, air separation, power generation and sulfur recovery plants or facilities.

Further recognized by the inventor, is the need to modify various configurations of carbon-based feedstock-gasification multi-generation facilities that combine new energy efficient configurations that result in significant energy and energy-based GHG emissions reductions of about 30% or more in the carbon-based feedstock-gasification plants in multi-generation facilities.

SUMMARY OF THE INVENTION

In view of the foregoing, various embodiments of the present invention advantageously provide gasification-based multi-generation facilities/apparatus that are significantly more energy efficient and that reduce heating energy-utility-based GHG emissions, while preserving its operability and "retrofitability" due to future expansion needs for more power and heat generation; more syngas production for chemical industries, and/or more hydrogen for oil refining.

Various embodiments of the present invention also provide modified configurations of carbon-based-feedstocks-gasification for multi-generation facilities' plants configurations designed to make the whole multi-generation facility energy system more efficient, less polluting, operable at different plants'-specific operating modes, and readily retrofitable upon future expansions.

Various embodiments of the present invention advantageously include various energy management systems employing various advanced thermal coupling process-based schemes that provide energy reductions of about 30% or more and reduce heating energy utility-based GHG emissions by about 30% or more for a carbon-based feedstock-gasification multi-generation apparatus, normally consisting of multiple integrated plants that provide multi-commodities generation, and make them significantly more "green" via enhanced energy efficiency as a result of the energy reductions and the reduced energy-based GHG emissions, with a view towards operability with even more involved plants integration and retrofitability due to future expansions in production capacities.

Various embodiments of the present invention provide gasification-based multi-generation apparatus and/or multi-generation facilities that utilize carbon-based feedstock to produce, for example, power; hydrogen; sulfur; steam; syngas; and chilled water, to be more energy integrated to make it dramatically more energy efficient and less polluting due to energy-based GHG emissions, as well as operable and retrofitable upon its future expansion.

More specifically, an example of an embodiment of the present invention provides a gasification-based-multi-generation apparatus including an acid gas removal system and/or a gasification system. Another example provides the acid gas removal system and the gasification system, and optionally one or more other systems including those for providing hydrogen recovery, condensate handling, sour water stripping, air separation, power generation, and sulfur recovery. Other examples provide various combinations of the respective systems, which can be in the form of plants or facilities, which can include various energy management systems comprising various heat exchanger network (HEN) configurations.

According to the exemplary embodiment, the gasification system is configured to generate a raw syngas feed from a carbon-based feedstock. The gasification system can include a gasification reactor, a syngas fluid cooler reactor, a soot quench column, a soot separator, and a soot scrubber, typically contained within a gasification plant or facility, and optionally at least portions of other systems including an air separation system, condensate polishing system, sour water stripping system, sulfur recovery plant, and/or hydrogen recovery system.

According to an exemplary embodiment, the acid gas removal system is configured to remove contaminants including hydrogen cyanide (HCN), carbonyl sulfide (COS), hydrogen sulfide ($H_2S$), and/or carbon dioxide ($CO_2$) from the raw syngas feed to thereby provide a treated syngas feed. The acid gas removal system can include: a hydrolysis/catalytic reactor (on-site or off-site), and acid gas contaminant ($H_2S$, $CO_2$, COS) absorber, a solvent regenerator, a membrane pre-treatment unit typically located, typically contained within an acid gas removal plant or facility; and an acid gas removal system energy management system.

The gasification system can also include a gasification system energy management system including one or more of at least three process-to-process heat exchanger units added to what otherwise could be considered a functional gasification plant structure, and one or more repurposed heat exchanger units.

The first added gasification system process-to-process heat exchanger unit (C4') can be positioned to receive a polished cold condensate stream originating, for example, from the condensate polishing plant but split into two branches in the acid gas removal plant. The first branch of the split stream receives an added thermal load from the top stream of an acid gas removal system solvent regenerator, and the second branch receives an added thermal load from the bottom stream of the contaminant hydrolysis reactor, which thereafter are combined together. The resulting polished cold condensate stream can receive an added thermal load from an overhead stream of a sour water stripper via the first gasification system process-to-process heat exchanger unit, while cooling the overhead stream of the sour water stripper, negating the need for a cooling utility.

The second added gasification system process-to-process heat exchanger unit (E1) can be positioned to receive the polished cold condensate stream having the added thermal load from the overhead stream of the sour water stripper and at least a portion (e.g., a first branch) of an oxygen feed to the gasification reactor (collectively reactor or set of reactors) to provide heat energy to the at least a portion of the oxygen feed and to remove at least a portion of, but more typically, the entire added thermal load added to the polished cold condensate stream by the first gasification system process-to-process heat exchanger unit.

The third added gasification system process-to-process heat exchanger unit (E2) can be positioned to receive an, e.g., uncooled, wastewater bottom stream from the sour water stripper and at least a portion (e.g., a second branch) of the oxygen feed to the gasification reactor to provide heat energy to the at least a second portion (e.g., a second branch) of the oxygen feed to the gasification reactor and to cool the wastewater bottom stream from the sour water stripper.

The fourth added gasification system process-to-process heat exchanger unit (E3) can be positioned to receive a hot condensate stream, e.g., from a power generation system, and the oxygen feed to the gasification reactor to provide heat energy to heat the oxygen feed to the gasification reactor and to cool the hot condensate stream from the power generation system.

The acid gas removal system energy management system can include, for example, one or more or all of at least five process-to-process heat exchanger units added to what otherwise could be considered a functional acid gas removal plant structure, and one or more repurposed heat exchanger units.

The first added acid gas removal system process-to-process heat exchanger unit (E4) can be positioned to receive a hot condensate stream from the gasification system and the raw syngas feed from the gasification system to provide heat energy to the raw syngas feed and to cool the hot condensate stream from the gasification system.

The second added acid gas removal system process-to-process heat exchanger unit (E5) can be positioned to receive the hot condensate stream from the gasification system and the treated syngas feed from the acid gas contaminant absorber to provide heat energy to the treated syngas feed and to further cool the hot condensate stream from the gasification system.

The third added acid gas removal system process-to-process heat exchanger unit (E6) can be positioned to receive a reactor effluent bottom stream from the contaminant hydrolysis reactor and the at least a portion (e.g., a first branch] of a rich solvent bottom stream from the acid gas contaminant absorber to provide heat energy to the rich solvent bottom stream and to cool the reactor effluent bottom stream.

The fourth added acid gas removal system process-to-process heat exchanger unit (E7) defining a solvent regenerator reboiler positioned to receive at least a portion of a soot scrubber bottom stream from the gasification system and a solvent regenerator tray stream extracted from a solvent stream tray of the solvent regenerator to provide heat energy to reboil the extracted solvent regenerator tray stream and to cool the soot scrubber bottom stream.

The fifth added acid gas removal system process-to-process heat exchanger unit (E8) positioned to receive at least a portion (e.g., a first branch) of a polished cold condensate stream from the condensate polishing plant or facility, and a solvent regenerator top stream from the solvent regenerator to provide heat energy to the at least a portion of the polished cold condensate stream and to cool the solvent regenerator top stream.

The acid gas removal system energy management system can also or alternatively include a sixth acid gas removal system process-to-process heat exchanger unit (BE4) positioned to receive a second branch of the polished cold condensate stream from the condensate polishing plant or facility, and the reactor effluent bottom stream from the contaminant hydrolysis reactor to provide heat energy to the second branch of the polished cold condensate stream and to cool the reactor effluent bottom stream.

The acid gas removal system energy management system can also or alternatively include a seventh acid gas removal system process-to-process heat exchanger unit (BE2) positioned to receive the hot condensate stream from the gasification system and a demineralized water stream from a demineralized water tank to provide heat energy to the demineralized water stream and to further cool the hot condensate stream from the gasification system.

The acid gas removal system energy management system can also or alternatively include an eighth acid gas removal system process-to-process heat exchanger unit (C9') positioned to receive the demineralized water stream from the demineralized water tank and a lean solvent bottom stream from the solvent regenerator to provide heat energy to the demineralized water system and to cool the lean solvent bottom stream.

Various embodiments of the invention also include additional or alternative less integrated and/or less energy-efficient process schemes. These include, for example, a process scheme whereby the sour water stripping system, plant, or facility is integrated into the gasification system, plant, or facility gasification system, plant or facility, and whereby the gasification system energy management system includes the third gasification system process-to-process heat exchanger unit, the at least a portion of an oxygen feed to the gasification reactor received by the third gasification system process-to-process heat exchanger unit being substantially the entire oxygen feed to the gasification reactor.

Another additional or alternative process scheme is provided whereby the acid gas removal system energy management system further includes a sixth acid gas removal system process-to-process heat exchanger unit positioned to receive at least a portion of the polished cold condensate stream from the condensate polishing plant or facility, and from the reactor effluent bottom stream from the contaminant hydrolysis reactor to provide heat energy to the at least a portion of the polished cold condensate stream and to cool the reactor effluent bottom stream. According to this process scheme, the gasification system energy management system includes the first, second, and third gasification system process-to-process heat exchanger units. According to such configuration, the acid gas removal plant or facility is integrated with the condensate polishing plant or facility through the at least a portion of the polished cold condensate stream received by the sixth acid gas removal system process-to-process heat exchanger unit, and the condensate polishing plant or facility, the acid gas removal plant or facility, the sour water stripping plant or facility are integrated with the gasification plant or facility through at least the polished condensate stream received by the sixth acid gas removal system process-to-process heat exchanger unit and the first and the second gasification system process-to-process heat exchanger units, en route to a power generation plant or facility, working as a buffer to indirectly gather heat energy from the bottom stream of the contaminant hydrolysis reactor and the overhead stream of the sour water stripper to heat the first branch of the oxygen feed to the gasification reactor; and the sour water stripping plant or facility is further integrated with the gasification plant or facility through at least the wastewater bottom stream from the sour water stripper en route to a bio treatment unit, plant or facility, to provide heat energy to heat the second branch of the oxygen feed to the gasification reactor.

Another additional or alternative process scheme is provided whereby the gasification system energy management system includes the third gasification system process-to-process heat exchanger unit, a high-pressure hot (tempered) water system or circuit, a fifth gasification system process-to-process heat exchanger unit positioned to receive a tempered water stream from the tempered water circuit and the overhead stream of the sour water stripper to add a thermal load to the tempered water and to cool the overhead stream of the sour water stripper, and a sixth gasification system process-to-process heat exchanger unit positioned to receive the tempered water stream having the added thermal load from the top stream of the sour water stripper and a first branch of oxygen feed to the gasification reactor to provide heat energy to the first branch of the oxygen feed and to remove at least a substantial portion of the added thermal load added to the tempered water stream. According to such configuration, the sour water stripping plant or facility is integrated with the gasification plant or facility through at least the tempered water circuit functioning as a buffer to collect the thermal load from the overhead stream of the sour water stripper column to heat the first branch of the oxygen feed to the gasification reactor, and the wastewater bottom stream from the sour water stripper provide heat energy to heat the second branch of the oxygen feed while en route to a bio treatment unit, plant or facility, to provide heat energy to heat the second branch of the oxygen feed to the gasification reactor.

Another additional or alternative process scheme is provided whereby the acid gas removal system energy management system comprises a sixth acid gas removal system process-to-process heat exchanger unit positioned to receive at least a portion of the polished cold condensate stream from the condensate polishing plant or facility, and a reactor effluent bottom stream from the contaminant hydrolysis reactor to provide heat energy to the at least a portion of the polished cold condensate stream and to cool the reactor effluent bottom stream, the gasification system energy management system comprises the first, second, third, and fourth gasification system process-to-process heat exchanger units. According to such configuration, the acid gas removal plant or facility is integrated with the condensate polishing plant or facility through the at least a portion of the polished cold condensate stream received by the sixth acid gas removal system process-to-process heat exchanger unit; the condensate polishing plant or facility, the acid gas removal plant or facility, the sour water stripping plant or facility is integrated with the gasification plant or facility through at least the polished condensate stream received by sixth acid gas removal system process-to-process heat exchanger unit and the first and the second gasification system process-to-process heat exchanger units, en route to a power generation plant or facility, working as a buffer to indirectly gather heat energy from the bottom stream of the contaminant hydrolysis reactor and the overhead stream of the sour water stripper to heat the first branch of the oxygen feed to the gasification reactor; and the sour water stripping plant or facility being further integrated with the gasification plant or facility through at least the wastewater bottom stream from the sour water stripper en route to a bio treatment unit, plant or facility, to provide heat energy to heat the second branch of the oxygen feed to the gasification reactor.

Another additional or alternative process scheme is provided whereby wherein the gasification system energy management system includes the third and the fourth gasification system process-to-process heat exchanger units, a high-pressure tempered water circuit, a fifth gasification system process-to-process heat exchanger unit positioned to receive a tempered water stream from the tempered water circuit and the overhead stream of the sour water stripper to add a thermal load to the tempered water and to cool the overhead stream of the sour water stripper; and a sixth gasification system process-to-process heat exchanger unit positioned to receive the tempered water stream having the added thermal load from the top stream of the sour water stripper and a first branch of oxygen feed to the gasification reactor to provide heat energy to the first branch of the oxygen feed and to remove at least a substantial portion of the added thermal load added to the tempered water stream. According to such configuration, the sour water stripping plant or facility integrated with the gasification plant or facility through at least the tempered water circuit functioning as a buffer to collect the thermal load from the overhead stream of the sour water stripper column to heat the first branch of the oxygen feed to the gasification reactor, and the wastewater bottom stream from the sour water stripper provide heat energy to heat the second branch of the oxygen feed while en route to a bio treatment unit, plant or facility, to provide heat energy to heat the second branch of the oxygen feed to the gasification reactor.

Another additional or alternative process scheme is provided whereby the acid gas removal plant or facility includes the contaminant hydrolysis reactor and a demineralized water tank, the gasification plant or facility comprises soot scrubber in fluid communication with the contaminant hydrolysis reactor to provide the raw syngas feed thereto, the gasification system energy management system includes the first, second, third, and fourth gasification system process-to-process heat exchanger units, and the acid gas removal system energy management system includes: the first acid gas removal system process-to-process heat exchanger unit positioned to receive the hot condensate stream from the fourth gasification system process-to-process heat exchanger unit, en route to the condensate polishing plant or facility, and the raw syngas feed from the soot scrubber to provide heat energy to the raw syngas feed and to cool the hot condensate stream, a sixth acid gas removal system process-to-process heat exchanger unit positioned to receive the hot condensate stream at least partially cooled by the first acid gas removal system process-to-process heat exchanger unit, and a demineralized water stream from the demineralized water tank to provide heat energy to the demineralized water stream to provide boiler water feed to the gasification plant or facility, and to further cool the hot condensate stream, and an acid gas removal system cooling utility unit positioned to receive the hot condensate stream at least partially cooled by the first and sixth acid gas removal system process-to-process heat exchanger units to further cool the hot condensate stream to a preselected temperature for collection in a condensate collection tank.

The acid gas removal system energy management system further includes: a seventh acid gas removal system process-to-process heat exchanger unit positioned to receive at least a portion of the polished cold condensate stream from the condensate polishing plant or facility, en route to the first gasification system process-to-process heat exchanger unit, and the reactor effluent bottom stream from the contaminant hydrolysis reactor to provide heat energy to the at least a portion of the polished cold condensate stream and to cool the reactor effluent bottom stream, and an eighth acid gas removal system process-to-process heat exchanger unit positioned to receive the demineralized water stream from the demineralized water tank and a lean solvent bottom stream from the solvent regenerator to provide heat energy to the demineralized water stream and to cool the lean solvent bottom stream.

According to such configuration, the acid gas removal plant or facility is integrated with the condensate polishing plant or facility through the at least a portion of the polished cold condensate stream received by the seventh acid gas removal system process-to-process heat exchanger unit, the condensate polishing plant or facility; the acid gas removal plant or facility, the sour water stripping plant or facility are integrated with the gasification plant or facility through at least the polished condensate stream received by the seventh acid gas removal system process-to-process heat exchanger unit and the first and the second gasification system process-to-process heat exchanger units, en route to a power generation plant or facility, working as a buffer to indirectly gather heat energy from the bottom stream of the contaminant hydrolysis reactor and the overhead stream of the sour water stripper to heat the first branch of the oxygen feed to the gasification reactor; the sour water stripping plant or facility is integrated with the gasification plant or facility through at least the wastewater bottom stream from the sour water stripper en route to a bio treatment unit, plant or facility, to provide heat energy to heat the second branch of the oxygen feed to the gasification reactor; and the gasification plant or facility is further integrated with the acid gas removal plant or facility through the hot condensate stream received by the first and the sixth acid gas removal system process-to-process heat exchanger units to provide heat energy to the raw syngas feed to the contaminant hydrolysis reactor and to provide heat energy to the demineralized water stream after providing heat energy to heat the oxygen feed to the gasification reactor.

Another additional or alternative process scheme is provided whereby the acid gas removal plant or facility comprises a reaction section containing the contaminant hydrolysis reactor and a separation section containing the acid gas contaminant absorber and the solvent regenerator, both located in a same plot plan, adjacent to each other in a same process area; the gasification system energy management system comprises at least one of the following: the first, the second, and the fourth gasification system process-to-process heat exchanger units; and the at least a portion of the polished cold condensate stream received by the fifth process-to-process heat exchanger unit of the acid gas removal system comprises a first branch of the polished cold condensate stream receiving heat energy from the solvent regenerator top stream.

Additionally, according to this process scheme, the acid gas removal system energy management system includes the third and the fifth process-to-process heat exchanger units, a sixth acid gas removal system process-to-process heat exchanger unit positioned to receive a second branch of the polished cold condensate stream from the condensate polishing plant or facility, and the reactor effluent bottom stream from the contaminant hydrolysis reactor to provide heat energy to the second branch of the polished cold condensate stream and to cool the reactor effluent bottom stream, wherein the third and the sixth process-to-process heat exchanger units are located in the reaction section, and the fifth process-to-process heat exchanger unit is located in the separation section of the acid gas removal plant or facility, and the first and the second branches of the polished cold conduit stream being recombined into a single polished cold conduit stream and received by the first gasification system process-two-process heat exchanger unit of the gasification plant or facility after receiving heat energy at the respective fifth and sixth process-to-process heat exchanger units.

According to such configuration, the acid gas removal plant or facility is integrated with at least the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by one or more of the gasification system process-to-process heat exchanger units, working as a buffer to indirectly gather heat energy from the solvent regenerator top stream and the bottom stream of the contaminant hydrolysis reactor of the acid gas removal plant or facility, to heat at least portions of the oxygen feed to the gasification reactor.

Another additional or alternative process scheme is provided whereby the acid gas removal plant or facility includes a reaction section containing the contaminant hydrolysis reactor and a separation section containing the acid gas contaminant absorber and the solvent regenerator, both located in different plot plans and in different process areas; the gasification system energy management system includes at least one of the following: the first, the second, and the fourth gasification system process-to-process heat exchanger units; the at least a portion of the polished cold condensate stream received by the fifth process-to-process heat exchanger unit of the acid gas removal system comprises a first branch of the polished cold condensate stream receiving heat energy from the solvent regenerator top stream; and the acid gas removal system energy management system includes the third and the fifth process-to-process heat exchanger units.

The acid gas removal system energy management system also includes a sixth acid gas removal system process-to-process heat exchanger unit positioned to receive a second branch of the polished cold condensate stream from the condensate polishing plant or facility, and the reactor effluent bottom stream from the contaminant hydrolysis reactor to provide heat energy to the second branch of the polished cold condensate stream and to cool the reactor effluent bottom stream, wherein the third, fifth, and the sixth process-to-process heat exchanger units are located in the separation section of the acid gas removal plant or facility, and the first and the second branches of the polished cold conduit stream are combined into a single polished cold conduit stream received by the first gasification system process-to-process heat exchanger unit of the gasification plant or facility after receiving heat energy at the respective fifth and sixth process-to-process heat exchanger units.

According to such configuration, the acid gas removal plant or facility is integrated with at least the condensate polishing plant or facility and the gasification plant or facility, through at least the first and the second branches of the polished condensate stream from the condensate polishing plant or facility, received by the fifth and the sixth acid gas removal system process-to-process heat exchanger units and the single polished cold conduit stream received by one or more of the gasification system process-to-process heat exchanger units, working as a buffer to indirectly gather heat energy from the solvent regenerator top stream and the bottom stream of the contaminant hydrolysis reactor to heat at least portions of the oxygen feed to the gasification reactor.

Another additional or alternative process scheme is provided whereby the gasification system energy management system comprises the first, second, third, and fourth gasification system process-to-process heat exchanger units; the solvent regenerator reboiler is a first solvent regenerator reboiler; the acid gas removal system energy management system does not include the first solvent regenerator reboiler; and the acid gas removal system energy management system includes a second solvent regenerator reboiler positioned to receive the hot condensate stream from the gasification system after passing through the fourth process-to-process heat exchanger unit, en route to a demineralized water heater, and a solvent regenerator tray stream extracted from a solvent stream tray of the solvent regenerator to provide heat energy to reboil the extracted solvent regenerator tray stream; and a sixth acid gas removal system process-to-process heat exchanger unit positioned to receive at least a portion of the polished cold condensate stream from the condensate polishing plant or facility, to provide heat energy to the at least a portion of the polished cold condensate stream.

According to such configuration, the acid gas removal plant or facility is integrated with the condensate polishing plant or facility through the at least a portion of the polished cold condensate stream received by the sixth acid gas removal system process-to-process heat exchanger unit; the condensate polishing plant or facility, the acid gas removal plant or facility, the sour water stripping plant or facility are integrated with the gasification plant or facility through at least the polished condensate stream received by the sixth acid gas removal system process-to-process heat exchanger unit and the first and the second gasification system process-to-process heat exchanger units, en route to a power generation plant or facility, working as a buffer to indirectly gather heat energy from the bottom stream of the contaminant hydrolysis reactor and the overhead stream of the sour water stripper to heat the first branch of the oxygen feed to the gasification reactor; the sour water stripping plant or facility is further integrated with the gasification plant or facility through at least the wastewater bottom stream from the sour water stripper en route to a bio treatment unit, plant or facility, to provide heat energy to heat the second branch of the oxygen feed to the gasification reactor, and the acid gas removal plant or facility being further integrated with the gasification plant or facility through the hot condensate stream to provide heat energy to heat the solvent regenerator reboiler.

Another additional or alternative process scheme is provided whereby the acid gas removal plant or facility includes a reaction section containing the contaminant hydrolysis reactor and a separation section containing the acid gas contaminant absorber and the solvent regenerator, both located in a same plot plan, adjacent to each other in a same process area; the gasification system energy management system comprises the first, second, third, and fourth gasification system process-to-process heat exchanger units; the at least a portion of the polished cold condensate stream received by the fifth process-to-process heat exchanger unit of the acid gas removal system comprises a first branch of the polished cold condensate stream receiving heat energy from the solvent regenerator top stream; the solvent regenerator reboiler is a first solvent regenerator reboiler; and the acid gas removal system energy management system does not include the first solvent regenerator reboiler.

Further, the acid gas removal system energy management system includes: a second solvent regenerator reboiler positioned to receive hot condensate from the fourth gasification system process-to-process heat exchanger unit of the gasification system and a solvent regenerator tray stream extracted from a solvent stream tray of the solvent regenerator to provide heat energy to reboil the extracted solvent regenerator tray stream; the third and the fifth process-to-process heat exchanger units; and a sixth acid gas removal system process-to-process heat exchanger unit positioned to receive a second branch of the polished cold condensate stream from the condensate polishing plant or facility, and the reactor effluent bottom stream from the contaminant hydrolysis reactor to provide heat energy to the second branch of the polished cold condensate stream and to cool the reactor effluent bottom stream, with the first and the second branches of the polished cold conduit stream being recombined into a single polished cold conduit stream and received by the first gasification system process-to-process heat exchanger unit, after receiving heat energy at the respective fifth and sixth process-to-process heat exchanger units.

According to such configuration, the acid gas removal plant or facility is integrated with the sour water stripping plant or facility, the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by the first and the second gasification system process-to-process heat exchanger units, en route to a power generation plant or facility, working as a buffer to indirectly gather heat energy from the solvent regenerator top stream and the bottom stream of the contaminant hydrolysis reactor of the acid gas removal plant or facility, and to gather heat energy from the overhead stream of the sour water stripper to heat a first branch of the oxygen feed to the gasification reactor; the sour water stripping plant or facility being further integrated with the gasification plant or facility through at least the wastewater bottom stream from the sour water stripper en route to a bio treatment unit, plant or facility, to provide heat energy to heat the second branch of the oxygen feed to the gasification reactor; and the acid gas removal plant or facility being further integrated with the gasification plant or facility through the hot condensate stream from the gasification plant or facility to provide heat energy to heat the solvent regenerator reboiler.

Another additional or alternative process scheme is provided whereby the acid gas removal plant or facility includes a reaction section containing the contaminant hydrolysis reactor and a separation section containing the acid gas contaminant absorber and the solvent regenerator, both located in different plot plans and in different process areas; the gasification system energy management system comprises the first, second, third, and fourth gasification system process-to-process heat exchanger units; the at least a portion of the polished cold condensate stream received by the fifth process-to-process heat exchanger unit of the acid gas removal system comprises a first branch of the polished cold condensate stream receiving heat energy from the solvent regenerator top stream; wherein the solvent regenerator reboiler is a first solvent regenerator reboiler; and the acid gas removal system energy management system does not include the first solvent regenerator reboiler. Additionally, the acid gas removal system energy management system includes a second solvent regenerator reboiler positioned to receive hot condensate from the fourth gasification system process-to-process heat exchanger unit of the gasification system and the solvent regenerator tray stream extracted from a solvent stream tray of the solvent regenerator to provide heat energy to reboil the extracted solvent regenerator tray stream; the third and the fifth process-to-process heat exchanger units; and a sixth acid gas removal system process-to-process heat exchanger unit positioned to receive a second branch of the polished cold condensate stream from the condensate polishing plant or facility, and the reactor effluent bottom stream from the contaminant hydrolysis reactor to provide heat energy to the second branch of the polished cold condensate stream and to cool the reactor effluent bottom stream, with the first and the second branches of the polished cold conduit stream being recombined into a single polished cold conduit stream and received by the first gasification system process-to-process heat exchanger unit, after receiving heat energy at the respective fifth and sixth process-to-process heat exchanger units.

According to such configuration, the acid gas removal plant or facility is integrated with the sour water stripping plant or facility, the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by the first and the second gasification system process-to-process heat exchanger units, en route to a power generation plant or facility, working as a buffer to indirectly gather heat energy from the solvent regenerator top stream and the bottom stream of the contaminant hydrolysis reactor of the acid gas removal plant or facility, and to gather heat energy from the overhead stream of the sour water stripper to heat a first branch of the oxygen feed to the gasification reactor; the sour water stripping plant or facility being further integrated with the gasification plant or facility through at least the wastewater bottom stream from the sour water stripper en route to a bio treatment unit, plant or facility, to provide heat energy to heat the second branch of the oxygen feed to the gasification reactor; and the acid gas removal plant or facility being further integrated with the gasification plant or facility through the hot condensate stream from the gasification plant or facility to provide heat energy to heat the solvent regenerator reboiler.

Another additional or alternative process scheme is provided whereby the acid gas removal plant or facility comprises a reaction section containing the contaminant hydrolysis reactor and a separation section containing the acid gas contaminant absorber, the solvent regenerator, and a demineralized water tank, both located in a same plot plan, adjacent to each other in a same process area; the gasification plant or facility comprises soot scrubber in fluid communication with the contaminant hydrolysis reactor to provide the raw syngas feed thereto; the gasification system energy management system comprises the first, second, third, and fourth gasification system process-to-process heat exchanger units; and the at least a portion of the polished cold condensate stream received by the fifth process-to-process heat exchanger unit of the acid gas removal system comprises a first branch of the polished cold condensate stream receiving heat energy from the solvent regenerator top stream.

Additionally, the acid gas removal system energy management system includes the first acid gas removal system process-to-process heat exchanger unit positioned to receive the hot condensate stream from the fourth gasification system process-to-process heat exchanger unit, en route to the condensate polishing plant or facility, and the raw syngas feed from the soot scrubber to provide heat energy to the raw syngas feed and to cool the hot condensate stream; the third and the fifth process-to-process heat exchanger units; a sixth acid gas removal system process-to-process heat exchanger unit positioned to receive a second branch of the polished cold condensate stream from the condensate polishing plant or facility, en route to the first gasification system process-to-process heat exchanger unit, and the reactor effluent bottom stream from the contaminant hydrolysis reactor to provide heat energy to the second branch of the polished cold condensate stream and to cool the reactor effluent bottom stream; a seventh acid gas removal system process-to-process heat exchanger unit positioned to receive the hot condensate stream at least partially cooled by the first acid gas removal system process-to-process heat exchanger unit, and a demineralized water stream to provide heat energy to the demineralized water stream to provide boiler water feed to the gasification plant or facility, and to further cool the hot condensate stream; an acid gas removal system cooling utility unit positioned to receive the hot condensate stream at least partially cooled by the first and sixth acid gas removal system process-to-process heat exchanger units to further cool the hot condensate stream to a preselected temperature for collection in a condensate collection tank; and an eighth acid gas removal system process-to-process heat exchanger unit positioned to receive the demineralized water stream and a lean solvent bottom stream from the solvent regenerator to provide heat energy to the demineralized water stream and to cool the lean solvent bottom stream.

According to such configuration, the acid gas removal plant or facility is integrated with the sour water stripping plant or facility, the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by the first and the second gasification system process-to-process heat exchanger units, en route to a power generation plant or facility, working as a buffer to indirectly gather heat energy from the solvent regenerator top stream and the bottom stream of the contaminant hydrolysis reactor of the acid gas removal plant or facility, and to gather heat energy from the overhead stream of the sour water stripper to heat a first branch of the oxygen feed to the gasification reactor.

Also, the sour water stripping plant or facility is further integrated with the gasification plant or facility through at least the wastewater bottom stream from the sour water stripper en route to a bio treatment unit, plant or facility, to provide heat energy to heat the second branch of the oxygen feed to the gasification reactor; and the gasification plant or facility is further integrated with the acid gas removal plant or facility through the hot condensate stream received by the first and the seventh acid gas removal system process-to-process heat exchanger units to provide heat energy to the raw syngas feed to the contaminant hydrolysis reactor and to provide heat energy to the demineralized water stream after providing heat energy to heat the oxygen feed to the gasification reactor.

Another additional or alternative process scheme is provided whereby the acid gas removal plant or facility includes a reaction section containing the contaminant hydrolysis reactor and a separation section containing the acid gas contaminant absorber, the solvent regenerator, and a demineralized water tank, both located in different plot plans and in different process areas; the gasification plant or facility includes soot scrubber in fluid communication with the contaminant hydrolysis reactor to provide the raw syngas feed thereto; the gasification system energy management system comprises the first, second, third, and fourth gasification system process-to-process heat exchanger units; and the at least a portion of the polished cold condensate stream received by the fifth process-to-process heat exchanger unit of the acid gas removal system comprises a first branch of the polished cold condensate stream receiving heat energy from the solvent regenerator top stream.

Additionally, the acid gas removal system energy management system includes the first acid gas removal system process-to-process heat exchanger unit positioned to receive the hot condensate stream from the fourth gasification system process-to-process heat exchanger unit, en route to the condensate polishing plant or facility, and the raw syngas feed from the soot scrubber to provide heat energy to the raw syngas feed and to cool the hot condensate stream; the third and the fifth process-to-process heat exchanger units; and a sixth acid gas removal system process-to-process heat exchanger unit positioned to receive a second branch of the polished cold condensate stream from the condensate polishing plant or facility, en route to the first gasification system process-to-process heat exchanger unit, and the reactor effluent bottom stream from the contaminant hydrolysis reactor to provide heat energy to the second branch of the polished cold condensate stream and to cool the reactor effluent bottom stream.

The acid gas removal system energy management system includes a seventh acid gas removal system process-to-process heat exchanger unit positioned to receive the hot condensate stream at least partially cooled by the first acid gas removal system process-to-process heat exchanger unit, and a demineralized water stream to provide heat energy to the demineralized water stream to provide boiler water feed to the gasification plant or facility, and to further cool the hot condensate stream; an acid gas removal system cooling utility unit positioned to receive the hot condensate stream at least partially cooled by the first and sixth acid gas removal system process-to-process heat exchanger units to further cool the hot condensate stream to a preselected temperature for collection in a condensate collection tank; and an eighth acid gas removal system process-to-process heat exchanger unit positioned to receive the demineralized water stream and a lean solvent bottom stream from the solvent regenerator to provide heat energy to the demineralized water stream and to cool the lean solvent bottom stream, wherein the first and the second branches of the polished cold conduit stream are combined into a single polished cold conduit stream received by the first gasification system process-to-process heat exchanger unit, after receiving heat energy at the respective fifth and sixth process-to-process heat exchanger units.

According to such configuration, the acid gas removal plant or facility is integrated with the sour water stripping plant or facility, the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by the first and the second gasification system process-to-process heat exchanger units, en route to a power generation plant or facility, working as a buffer to indirectly gather heat energy from the solvent regenerator top stream and the bottom stream of the contaminant hydrolysis reactor of the acid gas removal plant or facility, and to gather heat energy from the overhead stream of the sour water stripper to heat a first branch of the oxygen feed to the gasification reactor; the sour water stripping plant or facility is further integrated with the gasification plant or facility through at least the wastewater bottom stream from the sour water stripper en route to a bio treatment unit, plant or facility, to provide heat energy to heat the second branch of the oxygen feed to the gasification reactor; and the gasification plant or facility is further integrated with the acid gas removal plant or facility through the hot condensate stream received by the first and the seventh acid gas removal system process-to-process heat exchanger units to provide heat energy to the raw syngas feed to the contaminant hydrolysis reactor and to provide heat energy to the demineralized water stream after providing heat energy to heat the oxygen feed to the gasification reactor.

Another additional or alternative process scheme is provided whereby the acid gas removal plant or facility includes a reaction section containing the contaminant hydrolysis reactor and a separation section containing the acid gas contaminant absorber, and the solvent regenerator, a syngas separation membrane pre-treatment drum to clean water droplets from the treated syngas to thereby provide clean treated syngas, and a demineralized water tank, both located in a same plot plan, adjacent to each other in a same process area; wherein the gasification plant or facility includes a soot scrubber in fluid communication with the contaminant hydrolysis reactor to provide the raw syngas feed thereto; the gasification system energy management system comprises the first, second, third, and fourth gasification system process-to-process heat exchanger units; and the at least a portion of the polished cold condensate stream received by the fifth process-to-process heat exchanger unit of the acid gas removal system comprises a first branch of the polished cold condensate stream receiving heat energy from the solvent regenerator top stream.

Additionally, the acid gas removal system energy management system includes the first acid gas removal system process-to-process heat exchanger unit positioned to receive the hot condensate stream from the fourth gasification system process-to-process heat exchanger unit, en route to the condensate polishing plant or facility, and the raw syngas feed from the soot scrubber to provide heat energy to the raw syngas feed and to cool the hot condensate stream; and the second, the third, and the fifth process-to-process heat exchanger units; a sixth acid gas removal system process-to-process heat exchanger unit positioned to receive a second branch of the polished cold condensate stream from the condensate polishing plant or facility, en route to the first gasification system process-to-process heat exchanger unit, and the reactor effluent bottom stream from the contaminant hydrolysis reactor to provide heat energy to the second branch of the polished cold condensate stream and to cool the reactor effluent bottom stream, wherein the first and the second branches of the polished cold conduit stream being recombined into a single polished cold conduit stream and received by the first gasification system process-to-process heat exchanger unit, after receiving heat energy at the respective fifth and sixth process-to-process heat exchanger units.

The acid gas for global system energy management system also includes a seventh acid gas removal system process-to-process heat exchanger unit positioned to receive the hot condensate stream at least partially cooled by the first acid gas removal system process-to-process heat exchanger unit, and a demineralized water stream to provide heat energy to the demineralized water stream to provide boiler water feed to the gasification plant or facility, and to further cool the hot condensate stream; an acid gas removal system cooling utility unit positioned to receive the hot condensate stream at least partially cooled by the first and sixth acid gas removal system process-to-process heat exchanger units to further cool the hot condensate stream to a preselected temperature for collection in a condensate collection tank; and an eighth acid gas removal system process-to-process heat exchanger unit positioned to receive the demineralized water stream and a lean solvent bottom stream from the solvent regenerator to provide heat energy to the demineralized water stream and to cool the lean solvent bottom stream.

According to such configuration, the acid gas removal plant or facility is integrated with the sour water stripping plant or facility, the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by the first and the second gasification system process-to-process heat exchanger units, en route to a power generation plant or facility, working as a buffer to indirectly gather heat energy from the solvent regenerator top stream and the bottom stream of the contaminant hydrolysis reactor of the acid gas removal plant or facility, and to gather heat energy from the overhead stream of the sour water stripper to heat a first branch of the oxygen feed to the gasification reactor; the sour water stripping plant or facility is further integrated with the gasification plant or facility through at least the wastewater bottom stream from the sour water stripper en route to a bio treatment unit, plant or facility, to provide heat energy to heat the second branch of the oxygen feed to the gasification reactor; and the gasification plant or facility is further integrated with the acid gas removal plant or facility through the hot condensate stream received by the first, the second, and the seventh acid gas removal system process-to-process heat exchanger units to provide heat energy to the raw syngas feed to the contaminant hydrolysis reactor, to provide heat energy to the demineralized water stream, and to provide heat energy to the treated syngas feed, after providing heat energy to heat the oxygen feed to the gasification reactor.

Another additional or alternative process scheme is provided whereby the acid gas removal plant or facility includes a reaction section containing the contaminant hydrolysis reactor and a separation section containing the acid gas contaminant absorber, the solvent regenerator, a syngas separation membrane pre-treatment drum to clean water droplets from the treated syngas, and a demineralized water tank, both located in different plot plans and in different process areas; wherein the gasification plant or facility comprises soot scrubber in fluid communication with the contaminant hydrolysis reactor to provide the raw syngas feed thereto; and the gasification system energy management system comprises the first, second, third, and fourth gasification system process-to-process heat exchanger units.

Additionally, the acid gas removal system energy management system includes the first acid gas removal system process-to-process heat exchanger unit positioned to receive the hot condensate stream from the fourth gasification system process-to-process heat exchanger unit, en route to the condensate polishing plant or facility, and the raw syngas feed from the soot scrubber to provide heat energy to the raw syngas feed and to cool the hot condensate stream; the second, the third, and the fifth process-to-process heat exchanger units; and a sixth acid gas removal system process-to-process heat exchanger unit positioned to receive a second branch of the polished cold condensate stream from the condensate polishing plant or facility, en route to the first gasification system process-to-process heat exchanger unit, and the reactor effluent bottom stream from the contaminant hydrolysis reactor to provide heat energy to the second branch of the polished cold condensate stream and to cool the reactor effluent bottom stream, with the third and the sixth process-to-process heat exchanger units being located in the reaction section, and the fifth process-to-process heat exchanger unit is located in the separation section of the acid gas removal plant or facility.

The acid gas removal system energy management system also includes a seventh acid gas removal system process-to-process heat exchanger unit positioned to receive the hot condensate stream at least partially cooled by the first acid gas removal system process-to-process heat exchanger unit, and a demineralized water stream to provide heat energy to the demineralized water stream to provide boiler water feed to the gasification plant or facility, and to further cool the hot condensate stream, an acid gas removal system cooling utility unit positioned to receive the hot condensate stream at least partially cooled by the first and sixth acid gas removal system process-to-process heat exchanger units to further cool the hot condensate stream to a preselected temperature for collection in a condensate collection tank; and an eighth acid gas removal system process-to-process heat exchanger unit positioned to receive the demineralized water stream and a lean solvent bottom stream from the solvent regenerator to provide heat energy to the demineralized water stream and to cool the lean solvent bottom stream.

According to such configuration, the acid gas removal plant or facility is integrated with the sour water stripping plant or facility, the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by the first and the second gasification system process-to-process heat exchanger units, en route to a power generation plant or facility, working as a buffer to indirectly gather heat energy from the solvent regenerator top stream and the bottom stream of the contaminant hydrolysis reactor of the acid gas removal plant or facility, and to gather heat energy from the overhead stream of the sour water stripper to heat a first branch of the oxygen feed to the gasification reactor; the sour water stripping plant or facility is further integrated with the gasification plant or facility through at least the wastewater bottom stream from the sour water stripper en route to a bio treatment unit, plant or facility, to provide heat energy to heat the second branch of the oxygen feed to the gasification reactor; and the gasification plant or facility is further integrated with the acid gas removal plant or facility through the hot condensate stream received by the first, the second, and the seventh acid gas removal system process-to-process heat exchanger units to provide heat energy to the raw syngas feed to the contaminant hydrolysis reactor, to provide heat energy to the demineralized water stream, and to provide heat energy to the treated syngas feed, after providing heat energy to heat the oxygen feed to the gasification reactor.

Another additional or alternative process scheme is provided whereby the acid gas removal plant or facility includes the contaminant hydrolysis reactor, the acid gas contaminant absorber, and the solvent regenerator; the gasification system energy management system includes at least one or more of the following: the first and second gasification system process-to-process heat exchanger units; and the acid gas removal system energy management system includes the solvent regenerator reboiler, the fifth process-to-process heat exchanger unit, and a sixth acid gas removal system process-to-process heat exchanger unit positioned to receive at least a portion of the polished cold condensate stream from the condensate polishing plant or facility, to provide heat energy to the at least a portion of the polished cold condensate stream, wherein the first and the second branches of the polished cold conduit stream are combined into a single polished cold conduit stream received by the gasification plant or facility after receiving heat energy at the respective fifth and sixth process-to-process heat exchanger units.

According to such configuration, the acid gas removal plant or facility is integrated with the condensate polishing plant or facility through the at least a portion of the polished cold condensate stream received by the sixth acid gas removal system process-to-process heat exchanger unit; the acid gas removal plant or facility is integrated with at least the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by one or more of the gasification system process-to-process heat exchanger units, working as a buffer to indirectly gather heat energy from the solvent regenerator top stream and the bottom stream of the contaminant hydrolysis reactor of the acid gas removal plant or facility, to heat at least portions of the oxygen feed to the gasification reactor; and the acid gas removal plant or facility is further integrated with the gasification plant or facility through the soot scrubber bottom stream to provide heat energy to heat the solvent regenerator reboiler.

Another additional or alternative process scheme is provided whereby the acid gas removal plant or facility includes the contaminant hydrolysis reactor, the acid gas contaminant absorber, and the solvent regenerator; the gasification system energy management system comprises at least one or more of the following: the first and second gasification system process-to-process heat exchanger units; the acid gas removal system energy management system does not include the first acid gas removal system process-to-process heat exchanger unit; and the at least a portion of the polished cold condensate stream received by the fifth process-to-process heat exchanger unit of the acid gas removal system includes a first branch of the polished cold condensate stream receiving heat energy from the solvent regenerator top stream; and the acid gas removal system energy management system includes the solvent regenerator reboiler; the fifth process-to-process heat exchanger unit; a sixth acid gas removal system process-to-process heat exchanger unit positioned to receive at least a portion of the polished cold condensate stream from the condensate polishing plant or facility, to provide heat energy to the at least a portion of the polished cold condensate stream, with the first and the second branches of the polished cold conduit stream being recombined into a single polished cold conduit stream and received by the gasification plant or facility after receiving heat energy at the respective fifth and sixth process-to-process heat exchanger units; and a seventh acid gas removal system process-to-process heat exchanger unit positioned to receive the raw syngas feed from the gasification system and a hot condensate stream from one or more of the following: the gasification plant or facility, the power generation plant or facility, an adjacent refinery, and an adjacent chemical plant, and to provide heat energy to the raw syngas feed and to cool the hot condensate stream from the gasification system.

According to such configuration, the acid gas removal plant or facility is integrated with the condensate polishing plant or facility through the at least a portion of the polished cold condensate stream received by the sixth acid gas removal system process-to-process heat exchanger unit; the acid gas removal plant or facility is integrated with at least the condensate polishing plant or facility, and the gasification plant or facility, through at least the first and the second branches of the polished condensate stream from the condensate polishing plant or facility, received by the fifth and the sixth acid gas removal system process-to-process heat exchanger units and the single polished cold conduit stream received by one or more of the gasification system process-to-process heat exchanger units, working as a buffer to indirectly gather heat energy from the solvent regenerator top stream and the bottom stream of the contaminant hydrolysis reactor of the acid gas removal plant or facility, to heat at least portions of the oxygen feed to the gasification reactor; and the acid gas removal plant or facility is further integrated with the gasification plant or facility through the soot scrubber bottom stream to provide heat energy to heat the solvent regenerator reboiler.

According to such embodiments/process schemes, the solvent regenerator can have a solvent regenerator bottom functioning at an operating pressure of between approximately 1.2 and 1.5 barg to thereby minimize pressure drop across column portions of the solvent regenerator.

Another additional or alternative process scheme is provided whereby the acid gas removal system comprises an acid gas removal plant or facility comprising the acid gas removal system energy management system; wherein the apparatus comprises the acid gas removal plant or facility; and wherein the acid gas removal system energy management system comprises the first, the second, the third, the fourth, and the fifth acid gas removal system process-to-process heat exchanger units.

Another additional or alternative process scheme is provided whereby the gasification system comprises a gasification plant or facility comprising the gasification system energy management system; wherein the apparatus comprises the gasification plant or facility, and a sour water stripping plant or facility comprising the sour water stripper; and wherein the gasification system energy management system comprises the first, the second, the third, and the fourth gasification system process-to-process heat exchanger units.

Another additional or alternative process scheme is provided whereby the acid gas removal system comprises an acid gas removal plant or facility comprising the acid gas removal system energy management system; the apparatus comprises the acid gas removal plant or facility; the acid gas removal system energy management system comprises the first, the second, the third, the fourth, and the fifth acid gas removal system process-to-process heat exchanger units; the gasification system comprises a gasification plant or facility comprising the gasification system energy management system; the apparatus comprises the gasification plant or facility, and a sour water stripping plant or facility comprising the sour water stripper; and the gasification system energy management system comprises the first, the second, the third, and the fourth gasification system process-to-process heat exchanger units.

According to an additional example of such configuration, the solvent regenerator has a solvent regenerator bottom functioning at an operating pressure of between approximately 1.2 and 1.5 barg to thereby minimize pressure drop across column portions of the solvent regenerator.

Another additional or alternative process scheme is provided whereby the carbon-based feedstock-gasification multi-generation apparatus comprises: an acid gas removal system configured to remove acidic contaminants from raw syngas feed to thereby provide a treated syngas feed; and a gasification system configured to generate the raw syngas feed from a carbon-based feedstock, the gasification system integrated with, or containing and integrated with a sour water stripping system comprising a sour water stripper. According to such embodiment, the acid gas removal system can include an acid gas contaminant absorber, a solvent regenerator, and an acid gas removal system energy management system. The acid gas removal system energy management system can include a first acid gas removal system process-to-process heat exchanger unit positioned to receive a hot condensate stream from the gasification system and the raw syngas feed from the gasification system to provide heat energy to the raw syngas feed and to cool the hot condensate stream from the gasification system, a second acid gas removal system process-to-process heat exchanger unit positioned to receive the hot condensate stream from the gasification system and the treated syngas feed from the acid gas contaminant absorber to provide heat energy to the treated syngas feed and to further cool the hot condensate stream from the gasification system, a third acid gas removal system process-to-process heat exchanger unit positioned to receive a reactor effluent bottom stream from a contaminant hydrolysis reactor and a rich solvent bottom stream from the acid gas contaminant absorber to provide heat energy to the rich solvent bottom stream and to cool the reactor effluent bottom stream, a fourth acid gas removal system process-to-process heat exchanger unit defining a solvent regenerator reboiler positioned to receive a soot scrubber bottom stream from the gasification system and a solvent regenerator tray stream extracted from a solvent stream tray of the solvent regenerator to provide heat energy to reboil the extracted solvent regenerator tray stream and to cool the soot scrubber bottom stream, a fifth acid gas removal system process-to-process heat exchanger unit positioned to receive a first portion of a polished cold condensate stream from a condensate polishing unit, plant, or facility, and a solvent regenerator top stream from the solvent regenerator to provide heat energy to the at least a portion of the polished cold condensate stream and to cool the solvent regenerator top stream, and a sixth acid gas removal system process-to-process heat exchanger unit positioned to receive a second portion of the polished cold condensate stream from the condensate polishing unit, plant, or facility, and the reactor effluent bottom stream from the contaminant hydrolysis reactor to provide heat energy to the second branch of the polished cold condensate stream and to cool the reactor effluent bottom stream.

The gasification system can include a gasification reactor, a syngas fluid cooler reactor, and a soot ash removal unit comprising a soot quench column, a soot separator, a soot filter, a soot scrubber, and a gasification system energy management system. The gasification system energy management system can include: a first gasification system process-to-process heat exchanger unit positioned to receive the polished cold condensate stream originating from the condensate polishing plant but split into two branches in the acid gas removal plant, a first branch receiving an added thermal load from the top stream of the solvent regenerator, and a second branch receiving an added thermal load from the bottom stream of the contaminant hydrolysis reactor, and an overhead stream of the sour water stripper to add a thermal load to the polished cold condensate stream and to cool the overhead stream of the sour water stripper, a second gasification system process-to-process heat exchanger unit positioned to receive the polished cold condensate stream having the added thermal load from the overhead stream of the sour water stripper and a first branch of an oxygen feed to the gasification reactor to provide heat energy to the first branch of the oxygen feed and to remove at least a portion of the added thermal load added to the polished cold condensate stream by the first gasification system process-to-process heat exchanger unit, a third gasification system process-to-process heat exchanger unit positioned to receive a wastewater bottom stream from the sour water stripper and a second branch of the oxygen feed to the gasification reactor to provide heat energy to the second branch of the oxygen feed to the gasification reactor and to cool the wastewater bottom stream from the sour water stripper, and a fourth gasification system process-to-process heat exchanger unit positioned to receive a hot condensate stream and the oxygen feed to the gasification reactor to provide heat energy to the oxygen feed to the gasification reactor and to cool the hot condensate stream.

According to an additional example of such configuration, the acid gas removal system comprises an acid gas removal plant, the acid gas removal plant contains, is integrated with, or both contains and is integrated with the contaminant hydrolysis reactor, the acid gas removal plant comprises the acid gas contaminant absorber, the solvent regenerator, the acid gas removal system energy management system, and a syngas separation membrane pretreatment drum to thereby provide clean water droplets from the syngas to thereby provide clean treated syngas. According to this embodiment, the acid gas removal system energy management system further includes a seventh acid gas removal system process-to-process heat exchanger unit positioned to receive the hot condensate stream from the gasification system and demineralized water from a demineralized water tank to provide heat energy to the demineralized water and to further cool the hot condensate stream from the gasification system; and an eighth acid gas removal system process-to-process heat exchanger unit positioned to receive the demineralized water from the demineralized water tank and a lean solvent bottom stream from the solvent regenerator to provide heat energy to the demineralized water and to cool the lean solvent bottom stream.

According to another example of either of the above configurations, the solvent regenerator has a solvent regenerator bottom functioning at an operating pressure of between approximately 1.2 and 1.5 barg to thereby minimize pressure drop across column portions of the solvent regenerator.

Various embodiments of the invention advantageously provide processing schemes that result in significant energy and energy-based GHG reductions of up to up to about 30% in carbon-based-feedstock-gasification multi-generation facilities, realizable through, for example, various combinations of: smart integration of various combinations of five core plants of the gasification facility; optimal manipulation of the operating pressure of the acid gas removal plant's separation section solvent regenerator; the addition of new heat exchangers; the removal of some heaters and coolers; the optimal allocation of a major section of one of the core plants (e.g., acid gas removal plant reaction section); the optimal allocation of one of the core plants' equipment (e.g., membrane pre-treatment unit from the hydrogen recovery plant), optimal allocation of one of the core plant's heat exchangers (e.g., heat exchanger and cooling unit from condensate polishing plant); and the unique linkage of equipment/units in-plants and among plants using advanced streams routing in-plant and among plants; as well as the allocation of the gasification facility's plants relative to each other including the best location of utilities storage tanks (e.g., demineralized water tank).

Advantageously, it is expected that it will be beneficial to the combined heat and power generation industry to make gasification-based facilities for multi-commodities generation, significantly more energy efficient and to have improved energy-based GHG emissions reductions of about 30%, while preserving its operability and retrofitability due to future expansion for more power generation; that it will be beneficial to oil refining, chemical and petrochemical industries to make gasification-based facilities for multi-commodities generation, significantly more energy efficient and to have improved energy-based GHG emissions reductions of about 30%, while preserving its operability and retrofitability due to future expansion for more chemicals production using hydrogen and syngas; that it will be beneficial to the integrated power generation, oil refining, chemical and petrochemical industries to make gasification-based facilities for multi-commodities generation, significantly more energy efficient and to have improved energy-based GHG emissions reductions of about 30%, while preserving its operability and retrofitability due to future expansion for power generation and chemicals production, through: process schemes smart integration among five core plants of the gasification facility, the optimal manipulation of the operating pressure of the acid gas removal plant's separation section solvent regenerator, the addition of new heat exchangers, the removal of some heaters and coolers, the optimal allocation of a major section of one of the plants, optimal allocation of one plants' equipment, optimal allocation of one plant heat exchangers and the unique linkage of equipment/units in-plants and among plants using advanced streams routing in-plant and among plants as well as the allocation of the gasification facility's plants relative to each other including the best location of utilities storage tanks, according to various embodiments of the present invention.

According to one or more processing schemes, the gasification plant heating utilities' consumption is advantageously reduced by about 65%, the hydrogen recovery plant heating utilities consumption is reduced by 100%, and the acid gas removal plant heating utility consumption is reduced by about 21%.

Advantageously, it is expected that it will be beneficial to the combined heat and power generation industry to make the gasification-based facilities, significantly more energy-efficient and to have improved energy-based GHG emissions reductions by at least reducing the gasification plant heating utility consumption 65%, while preserving its operability due to the involved plants integration and retrofitability due to future expansion for more power generation; and that it will be beneficial to the oil refining, chemical and petrochemical industries to make the gasification-based facilities, significantly more energy-efficient and to have improved energy-based GHG emissions reductions by at least reducing the gasification plant heating utility consumption 65%, while preserving its operability due to the involved plants integration and retrofitability due to future expansions, through: process schemes smart integration among five core plants of the gasification facility, the optimal manipulation of the operating pressure of the acid gas removal plant's separation section solvent regenerator, the addition of new heat exchangers, the removal of some heaters and coolers, the optimal allocation of a major section of one of the plants, optimal allocation of one plants' equipment, optimal allocation of one plant heat exchangers and the unique linkage of equipment/units in-plants and among plants using advanced streams routing in-plant and among plants as well as the allocation of the gasification facility's plants relative to each other including the best location of utilities storage tanks, according to various embodiments of the present invention.

Advantageously, it is expected that it will be beneficial to the combined heat and power generation industry to make the gasification-based facilities, significantly more energy-efficient and to have improved energy-based GHG emissions reductions by at least reducing the hydrogen recovery plant heating utility consumption 100%, while preserving its operability due to the involved plants integration and retrofitability due to future expansion for more power generation; and that it will be beneficial to the oil refining, chemical and petrochemical industries to make the gasification-based facilities, significantly more energy-efficient and to have improved energy-based GHG emissions reductions by at least reducing the hydrogen recovery plant heating utility consumption 100%, while preserving its operability due to the involved plants integration and retrofitability due to future expansions, through: process schemes smart integration among five core plants of the gasification facility, the optimal manipulation of the operating pressure of the acid gas removal plant's separation section solvent regenerator, the addition of new heat exchangers, the removal of some heaters and coolers, the optimal allocation of a major section of one of the plants, optimal allocation of one plants' equipment, optimal allocation of one plant heat exchangers and the unique linkage of equipment/units in-plants and among plants using advanced streams routing in-plant and among plants as well as the allocation of the gasification facility's plants relative to each other including the best location of utilities storage tanks, according to various embodiments of the present invention.

Advantageously, it is expected that it will be beneficial to the combined heat and power generation industry to make the gasification-based facilities, significantly more energy-efficient and to have improved energy-based GHG emissions reductions by at least reducing the acid gas removal plant heating utility consumption 21%, while preserving its operability due to the involved plants integration and retrofitability due to future expansion for more power generation; and that it will be beneficial to the oil refining, chemical and petrochemical industries to make the gasification-based facilities, significantly more energy-efficient and to have improved energy-based GHG emissions reductions by at least reducing the acid gas removal plant heating utility consumption 21%, while preserving its operability due to the involved plants integration and retrofitability due to future expansions, through: process schemes smart integration among five core plants of the gasification facility, the optimal manipulation of the operating pressure of the acid gas removal plant's separation section solvent regenerator, the addition of new heat exchangers, the removal of some heaters and coolers, the optimal allocation of a major section of one of the plants, optimal allocation of one plants' equipment, optimal allocation of one plant heat exchangers and the unique linkage of equipment/units in-plants and among plants using advanced streams routing in-plant and among plants as well as the allocation of the gasification facility's plants relative to each other including the best location of utilities storage tanks, according to various embodiments of the present invention.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
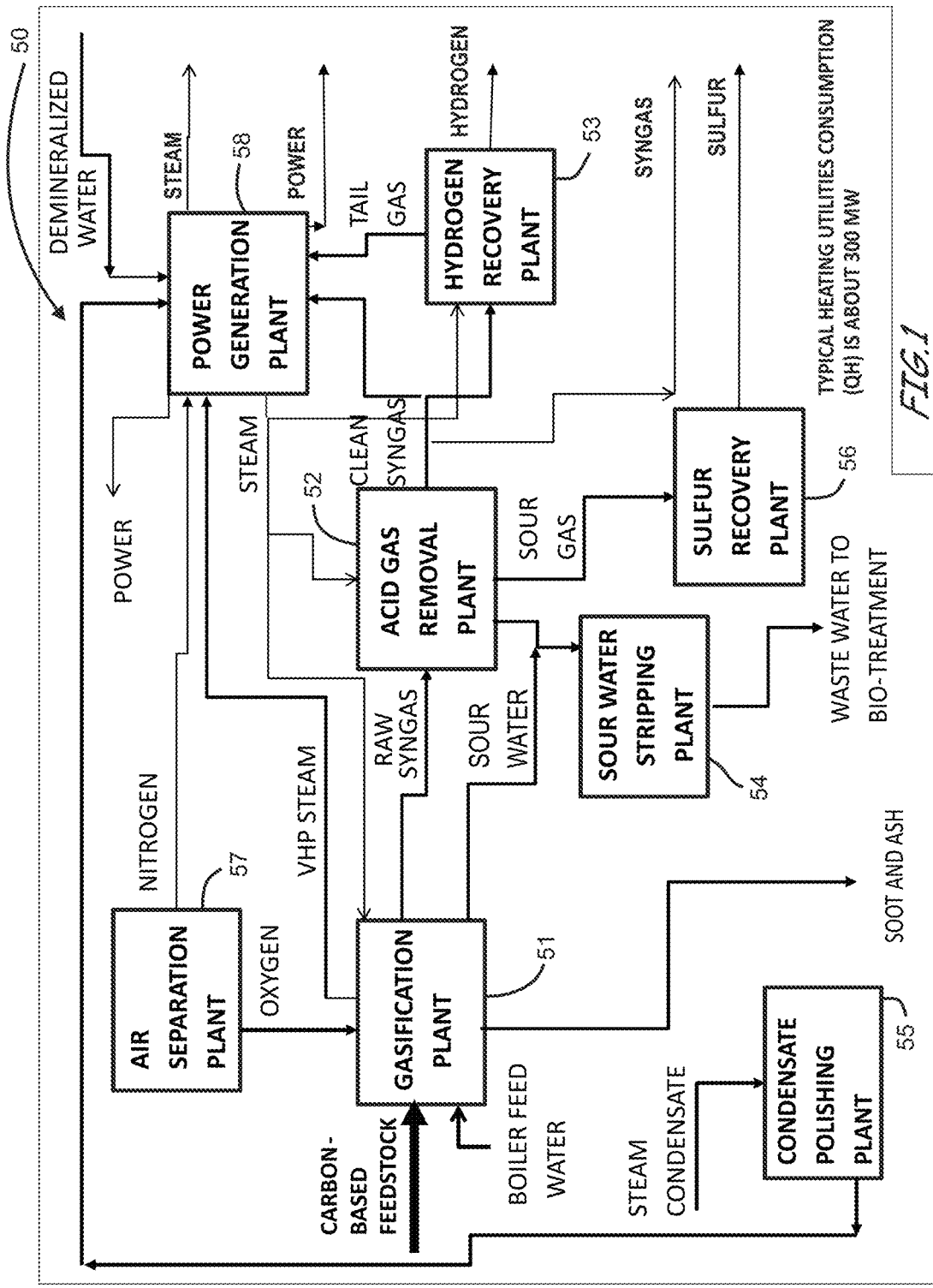
FIG. 1 is a schematic diagram of a general architecture of a carbon-based feedstock-gasification multi-generation apparatus.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Although specific terms have been employed, the terms themselves were generally used in a descriptive sense only, and unless indicated otherwise, were not used for purposes of limitation. For example, depending upon the context, the terms apparatus, system, and facility in the singular or plural with respect to discussions of multi-generation apparatus, systems, and facilities and hydrocarbon refining apparatus, systems, and facilities, for example, have been used interchangeably. Additionally, dependent upon the context, terms system and plant in the singular or plural with respect to discussions of acid gas removal systems and plants, gasification systems and plants, and xylene/aromatics systems and plants, among others, for example, have been used interchangeably. The terms about and approximately had been used interchangeably. One of ordinary skill in the art would recognize that they refer to tolerances and/or operating windows, depending upon the context of their use.

Additionally, specific stream temperatures, thermal loads of the heat exchanger units, corresponding cooling loads of the cold streams, heating duties of the heating units, and/or cooling duties of the units, representing a snapshot of the values, are shown solely to enhance the exemplary illustrations. One of ordinary skill in the art would recognize that the various stream temperatures, thermal loads of the heat exchanger units, corresponding cooling loads of the cold streams, heating duties of the heating units, and/or cooling duties of the units, function within certain tolerances and/or operating windows, regardless of whether or not they're values have been preceded by the terms "about" or "approximately."

A reference to a certain stream, unless stated otherwise, should be considered to describe at least a conventional conduit arrangement needed to carry the stream. Reference to a component receiving or otherwise interfacing with a certain stream, unless stated otherwise, should be considered to describe employment of at least conventional connection devices connecting an adjacent portion or portions of the conduit arrangement carrying the stream, as understood by one of ordinary skill in the art.

Dotted/dash lines in figures indicate new pipelines or connections or implementations thereof within and/or among the respective plants, facilities, or other systems. Steam heaters are designated by "H" and its number, and water/air/chilled water coolers are designated by "C" and its number unless indicated with a prime number indicating that it has taken another form.

Energy Efficient Gasification-Based Multi-Generation Apparatus Employing Energy Efficient Process Schemes and Methods The economics of industrial production, the limitations of global energy supply, and the realities of environmental conservation are an enduring concern for all industries. The majority in the world scientific communities believe that the world's environment has been negatively affected by the global warming phenomenon due to the release of greenhouse gases (GHG) into the atmosphere. Carbon-based feedstock-gasification for multi-commodities generation facilities 50 have become one of the competitive options for syngas; combined heat and power; hydrogen; sulfur; chilled water production for power generation, oil refining, Gas-to-Liquid, chemical and petrochemical industries' applications.

The inventor has recognize that it will be beneficial to such industries to make such very important carbon-based feedstock-gasification facilities, consisting of many integrated plants, for multi-commodities generation significantly "green" via much better energy efficiency and energy-based GHG emissions by as much as 30% or more dependent upon the integration scheme employed, with a view toward operability even with more involved plants integration, and retrofitability due to future expansions in production capacities.

Various embodiments of the invention provide carbon-based-feedstocks-gasification for multi-generation facilities' plants configurations, which convert whole multi-generation facility energy systems that can include several plants, to be more efficient, less polluting, operable at different plants' specific operating modes, and retrofitable upon future expansions. Various carbon-based-feedstock-gasification for multi-generation facilities, which can produce power; hydrogen; sulfur; steam; syngas; and chilled water, normally include gasification, acid gas removal, hydrogen recovery, condensate handling, sour water stripping, air separation, power generation, and sulfur recovery plants. These plants (or facilities) can be made more energy integrated to make it/them dramatically more energy efficient and less polluting as a result of energy-based GHG emissions, as well as operable and retrofitable upon its/their future expansion.

One or more embodiments of the invention provide for energy and energy-based GHG reduction through the combination of new energy efficient configurations, which can result in significant energy and energy-based GHG emissions reduction of about 30% in the carbon-based feedstock-gasification multi-generation facilities—equivalent to a large size plastic plant's heating utility energy consumption and energy-based GHG emissions.

Illustrative Multi-Generation Apparatus Including Gasification System- and Acid Gas Removal System Energy Management Systems Employing Integrated Gasification and Acid Gas Removal Plants-Directed Energy Efficient Advanced Process Schemes, and Configuration and Employment Methods The most advanced integrated process schemes example of the illustrated process schemes examples, is depicted in details in FIGS. 4, 6, 8, 10, and 12, and the less integrated process schemes depicted in FIGS. 13-22 result in significant reductions in heating utilities and energy-based GHG emissions. According to such combination of configurations, the gasification plant's heating utilities consumption can be reduced up to 65%. The hydrogen recovery plant's heating utilities consumption can be reduced by 100%, and the acid gas removal plant's heating utility consumption can be reduced by 21%.

The most advanced integrated process scheme, in particular, can result in significant energy and energy-based GHG reductions of up to about 30% in carbon-based-feedstock-gasification multi-generation facilities 50, realizable through, for example, various combinations of: smart integration of various combinations of five core plants of the gasification facility (e.g., gasification plant 51, acid gas removal plant 52, hydrogen recovery plant 53, sour water stripping plant 54 and condensate polishing plant 55); the optimal manipulation of the operating pressure of the acid gas removal plant's separation section 82 solvent regenerator 93; the addition of added heat exchangers (e.g., E1-E8); the removal of some heaters and coolers (e.g., H2, H4, C5, C6); the optimal allocation of a major section of one of the core plants (e.g., acid gas removal plant reaction section 81); the optimal allocation of the hydrogen recovery plant's equipment (e.g., membrane pre-treatment unit 111), the optimal allocation of condensate polishing plant's heat exchangers (e.g., BE2, C7); and the unique linkage of equipment/units in-plants and among plants using advanced streams routing in-plant and among plants; as well as the allocation of the gasification facility's plants relative to each other including the best location of utilities storage tanks (e.g., demineralized water tank).

Various embodiments of the invention also provide other unique process schemes for the carbon-based feedstock-gasification multi-generation facilities site-wide heating utilities optimization designed to enhance energy recovery and to reduce energy-based GHG emissions, albeit less than a specific targeted optimal smart energy integration scheme among the gasification facility's plants, realizable through less than all of the above described unique configurations of: the operating pressure of the acid gas removal plant's separation section solvent regenerator; the added heat exchangers; the removal of some heaters and coolers; the allocation of sections of plants; the optimal allocation of plant equipment; the optimal allocation of plant heat exchangers; and the unique linkage of equipment/units in-plants and among plants using advanced streams routing in-plant, and among plants, as well as the allocation of the multi-generation gasification apparatus' plants relative to each other.

Note, the operability and retrofitability of one or more of the exemplary processing schemes, described below, which can provide various levels of desired energy efficiency or efficiencies, are at least in part attained through the simultaneous consideration of both mass and energy future expansions' in the respective process schemes.

Referring to FIG. 1, in a typical industrial scale carbon-based-gasification processes/plants for multi-generation facility 50, being utilized for comparative purposes, the facility 50 consumes about 300 MW of heating utilities. It is an energy intensive facility that consumes about 3 to 4 times the energy needed for a large chemical plant for plastics production. This conventional carbon-based feedstock-gasification multi-generation facility 50 has reasonable level of integration. The high heating utilities consumers and the most energy-based GHG polluters in any carbon-based feedstock-gasification multi-generation facility are the gasification plant 51, the acid gas removal plant 52, and the hydrogen recovery plant 53. In such a typical carbon-based feedstock-gasification multi-generation facility 50 to generate hydrogen, steam and power, syngas and sulfur using carbon-based-feedstock, for example, requiring 12000 tons per day petroleum coke, the acid gas removal plant 52 consumes about 245 MW of heating utilities; the gasification plant 51 consumes about 40 MW, and the hydrogen plant 53 consumes about 15 MW of heating utilities.

The development of the first exemplary integrated energy efficient process scheme, providing various advanced thermal coupling arrangements, modifies various plants of the multi-generation facility 50, is shown in FIGS. 4, 6, 8, 10, and 12. This first exemplary process scheme is designed to save about 90 MW of heating utilities consumption in the comparative gasification-based-multi-generation facility 50, or about 30% of the whole gasification facility's heating utility consumption. Such reduction is equivalent to the amount of energy consumed by a large plastic plant heating utility. Further optimized plan plot of the core plants of gasification 51', acid gas removal 52', and hydrogen recovery 53' as well as sour water stripping 54', and condensate polishing 55' for the multi-generation facility 50, according to this exemplary integrated process scheme, can beneficially provide significant advantages over those of conventional multi-generation gasification-based facilities.

Figure 2:
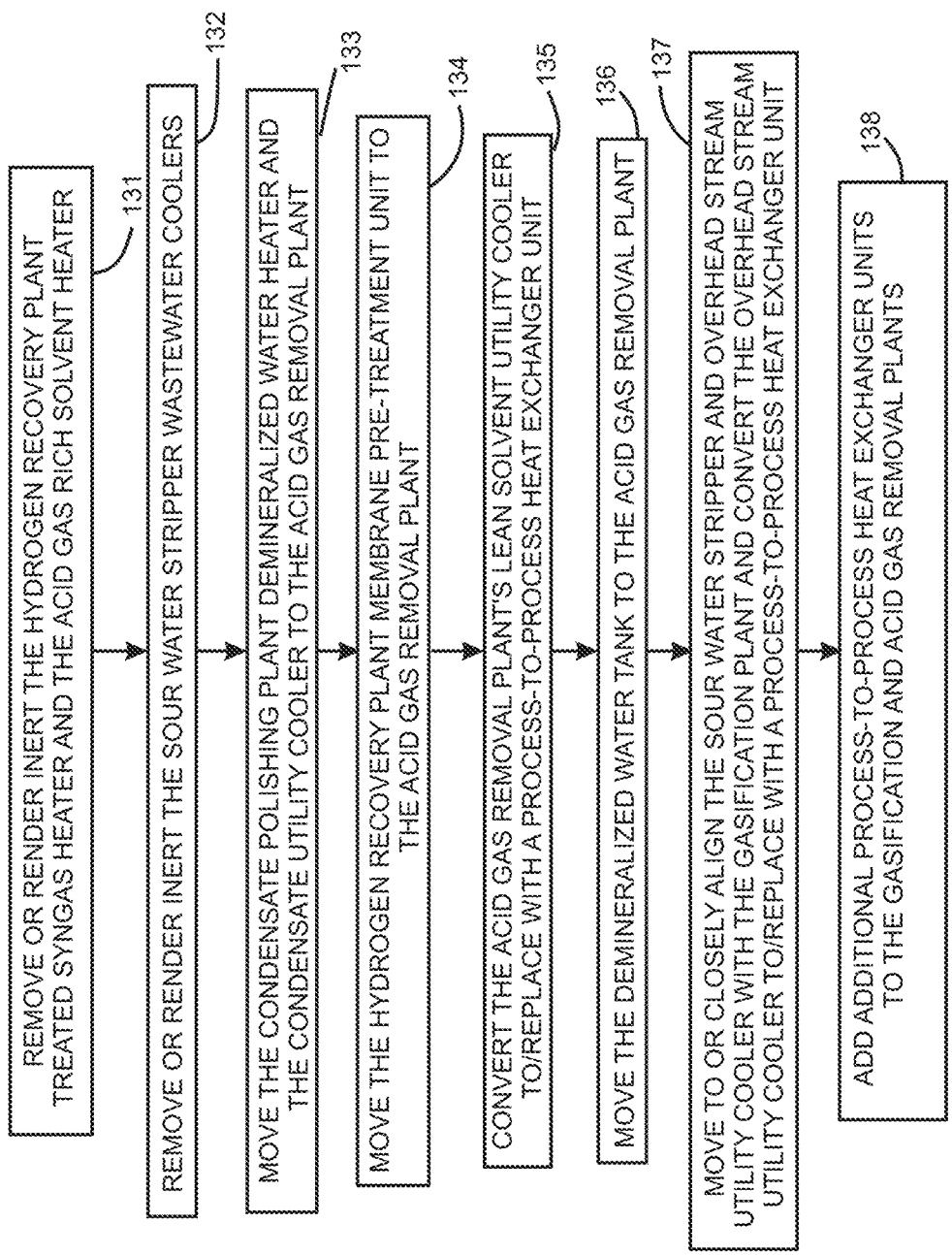
FIG. 2 is a block flow diagram illustrating steps for retrofitting portions of a carbon-based feedstock gasification multi-generation apparatus to provide enhanced energy efficiency according to an embodiment the present invention.

Referring to FIG. 2, in this first exemplary integrated energy efficient process scheme embodiment providing the 30% savings across the entire modified multi-generation facility/facilities 50, having modifications illustrated in FIGS. 4, 6, 8, 10 and 12, as part of the realization: the hydrogen recovery plan treated syngas heater H2 and acid gas rich solvent heater H4 were removed, rendered inert, or otherwise deleted (block 131); sour water stripper wastewater coolers C5, C6 were removed, rendered inert, or otherwise deleted (block 132); the condensate polishing plant demineralized water heater heat exchanger BE2 and the condensate utility cooler C7 were moved to the acid gas removal plant 52' (block 133); the hydrogen recovery plant membrane pre-treatment unit 111 was moved to the acid gas removal plant 52' (block 134); the acid gas removal plants lean solvent utility cooler C9 was converted to a process-to-process heat exchanger unit C9' (block 135); the demineralized water tank was moved from the power generation plant 58 or the condensate polishing plant 55', to the acid gas removal plant (block 136); the sour water stripper 117 and the overhead stream utility cooler C4 was moved are closely aligned with the gasification plant 51' and the utility cooler C4 was converted to a process-to-process heat exchanger unit C4' (block 137); and additional heat exchanger units E1-E3 were added to the gasification plant and additional heat exchanger units E4-E8 were added to the acid gas removal plant (block 138).

In particular, utility heater H1 was replaced with or supplemented by additional heat exchangers E1, E2, E3. Utility heater H2 was replaced by added heat exchanger E5. The heating duty required by utility heater H3 was reduced by added heat exchanger E4. Utility heater H4 was replaced by added heat exchanger E6. The heating duty of utility heater H5 was reduced by added heat exchanger E7. The cooling requirements of the gasification plant soot scrubber pump around cooler C2 was reduced by added heat exchanger E7. The sour water stripping plant utility coolers C5, C6 was replaced by added heat exchanger E3. The condensate polishing plant heat exchanger BE2 and utility cooler C7 was moved to the acid gas removal plant 52', and the cooling duty of C7 was increased. The cooling duty of the acid gas removal plant utility cooler C8 was also increased due to the addition of E6, and the duty of heat exchanger BE2 was reduced by added heat exchanger E4. The required cooling utility of acid gas removal plant utility coolers C10, C11 were reduced by replacing utility cooler C9 with a heat exchanger C9'. The cooling duty of the acid gas removal plant utility cooler C12 was reduced as a result of added heat exchanger E8.

Figure 3:
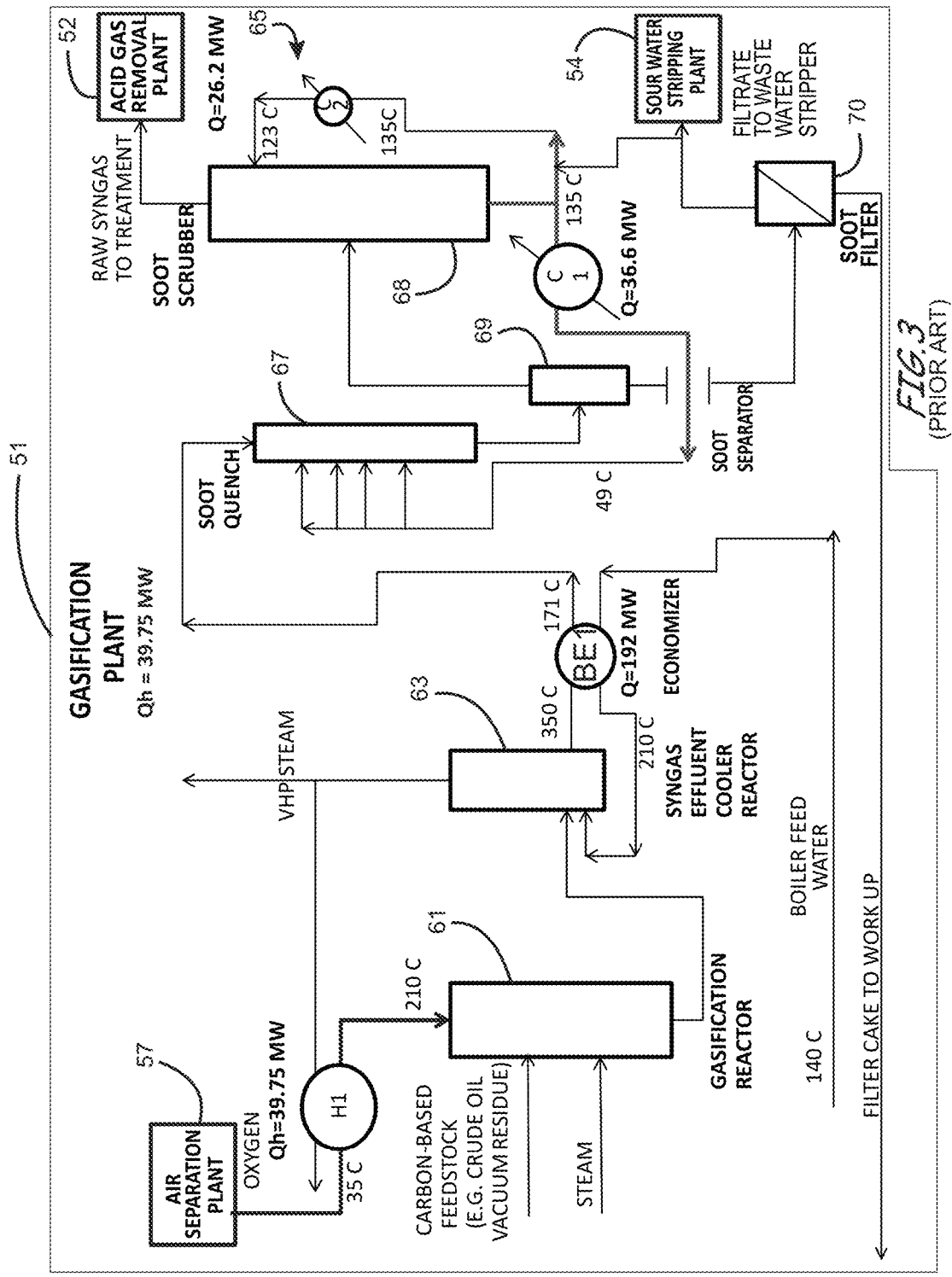
FIG. 3 is a schematic diagram of a conventional gasification plant.
Figure 4:
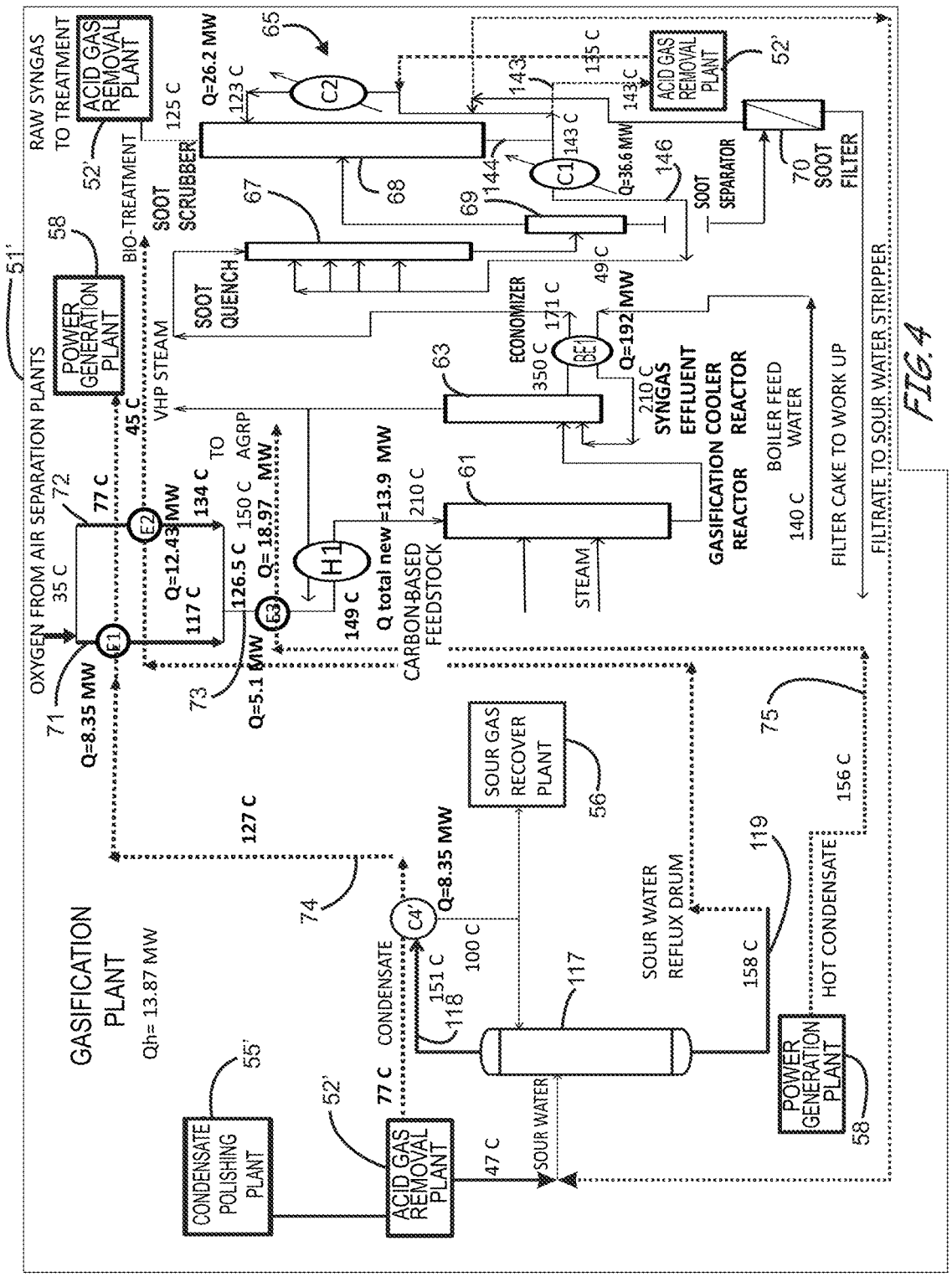
FIG. 4 is a schematic diagram illustrating an integrated process scheme for a gasification plant according to an embodiment of the present invention.

FIGS. 3 and 4 illustrate a conventional gasification plant 51 (FIG. 3) and a gasification plant 5' having modifications to provide advanced thermal coupling arrangements according to in the exemplary integrated process scheme (FIG. 4). The illustrated exemplary gasification plant 51' has been modified to include the addition of these three heat exchangers E1-E3 and corresponding streams 71-75, and portions of stream 119, to beneficially reduce the heat load required by gasification reactor(s) utility heater(s) H1, to thereby reduce the required heating utilities consumption of gasification plant 51' and its energy-based GHG emissions, by about 65% as compared to conventional gasification plants 51; the stream 75 to also integrate with the acid gas removal plant, 52', hydrogen recovery plant 53', sulfur recovery plant 54', condensate polishing plant 55', and power generation plant 58; and has been modified to include stream 143 to integrate with the acid gas removal plant, 52', to thereby assisting providing the savings of about 90 MW, or 30% of the total heating utility consumption over that of the total consumed by the conventional carbon-based feedstock-gasification multi-generation facility 50.

Referring to FIG. 4, the exemplary gasification plant 51' includes the three added heat exchanger units E1, E2 and E3 to heat the main oxygen line/header before the oxygen is distributed to the gasification reactors 61. The first new heat exchanger unit E1, thermal load of about 8.35 MW, uses a combination of streams 103 and 110, after first passing through acid gas removal plant heat exchanger units BE4 and E8, respectively, and being rejoined together as condensate stream 74, to function as a buffer stream, prior to proceeding to the ultimate destination of the power generation plant 58, to heat the first branch 71 of gasification reactor oxygen feed stream 73 produced at the air separation plant 57 prior to passing through gasification reactor heater(s) H1 en route to the gasification reactor(s) 61.

The condensate stream 74, initially at about 77° C., first passes through sour water stripping column overhead stream heat exchanger unit C4', thermal load of about 8.35 MW, to carry up/off the available excess thermal load of the overhead stream 118 of the sour water stripper 117, raising the temperature of the condensate stream 74 from 77° C. to 127° C., and reducing the temperature of the overhead stream 118 from about 151° C. to about 100° C., prior to proceeding through the heat exchanger unit E1. The condensate stream 74 at about 127° C. passes through heat exchanger unit E1, thermal load of about 8.35 MW, where it serves to increase the temperature of the first branch 71 of the oxygen feed stream 73 from about 35° C. to about 117° C., where its temperature is returned back to 77° C. A second oxygen branch 72 of the oxygen feed stream 73 also at about 35° C., and also ultimately en route to the gasification reactor(s) 61, is heated to 134° C. via heat exchanger unit E2, thermal load of about 12.43 MW, from about 35° C. to about 134° C. using the bottom stream 119 of the sour water stripper 117, passing through heat exchanger unit E2, while en route to a bio-treatment system. The heat exchanger unit E2 also cools the bottom stream 119 from about 158° C. to about 45° C.

After passing through heat exchanger units E1, E2, the two oxygen feed stream branches 71, 72, respectively, are then recombined together into oxygen feed stream 73 at an average temperature of about 126.5° C. before being heated by the third heat exchanger unit E3 thermal load of about 5.1 MW, from a temperature of about 126.5° C. to 149° C., en route to utility heater(s) H1, thermal load of about 13.9 MW, where the temperature of the oxygen feed stream 73 is raised from about 149° C. to about 210° C. before entering the gasification reactor(s) 61. The heat exchanger unit E3 receives a hot condensate stream 75 from the gasification plant 58, cooling the hot condensate stream 75 from about 156° C. to about 153 C, before the hot condensate stream 75 proceeds to the reaction section 81 of the acid gas removal plant 52' (FIG. 5).

Figure 5:
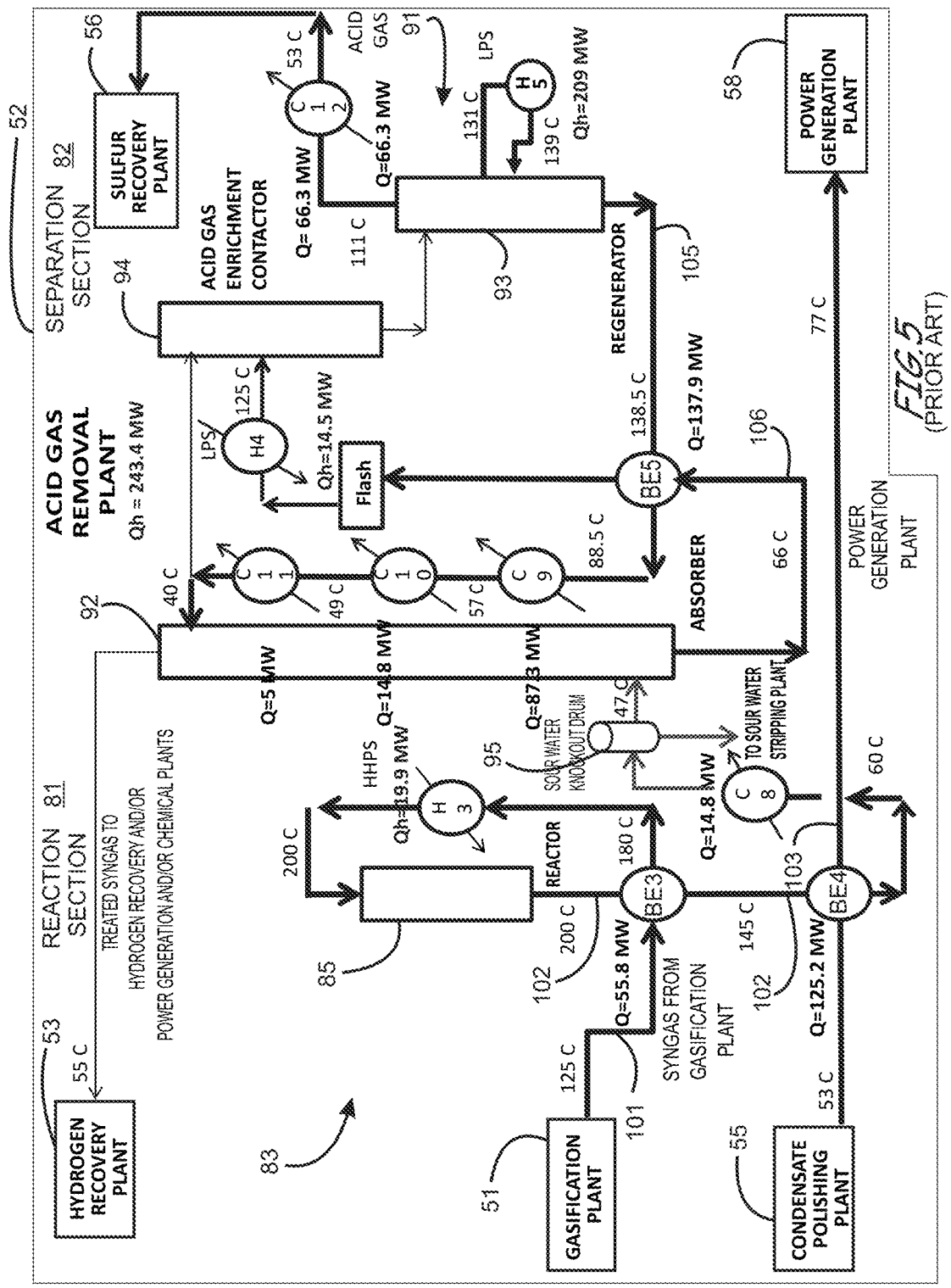
FIG. 5 is a schematic diagram of a conventional acid gas removal plant.
Figure 6:
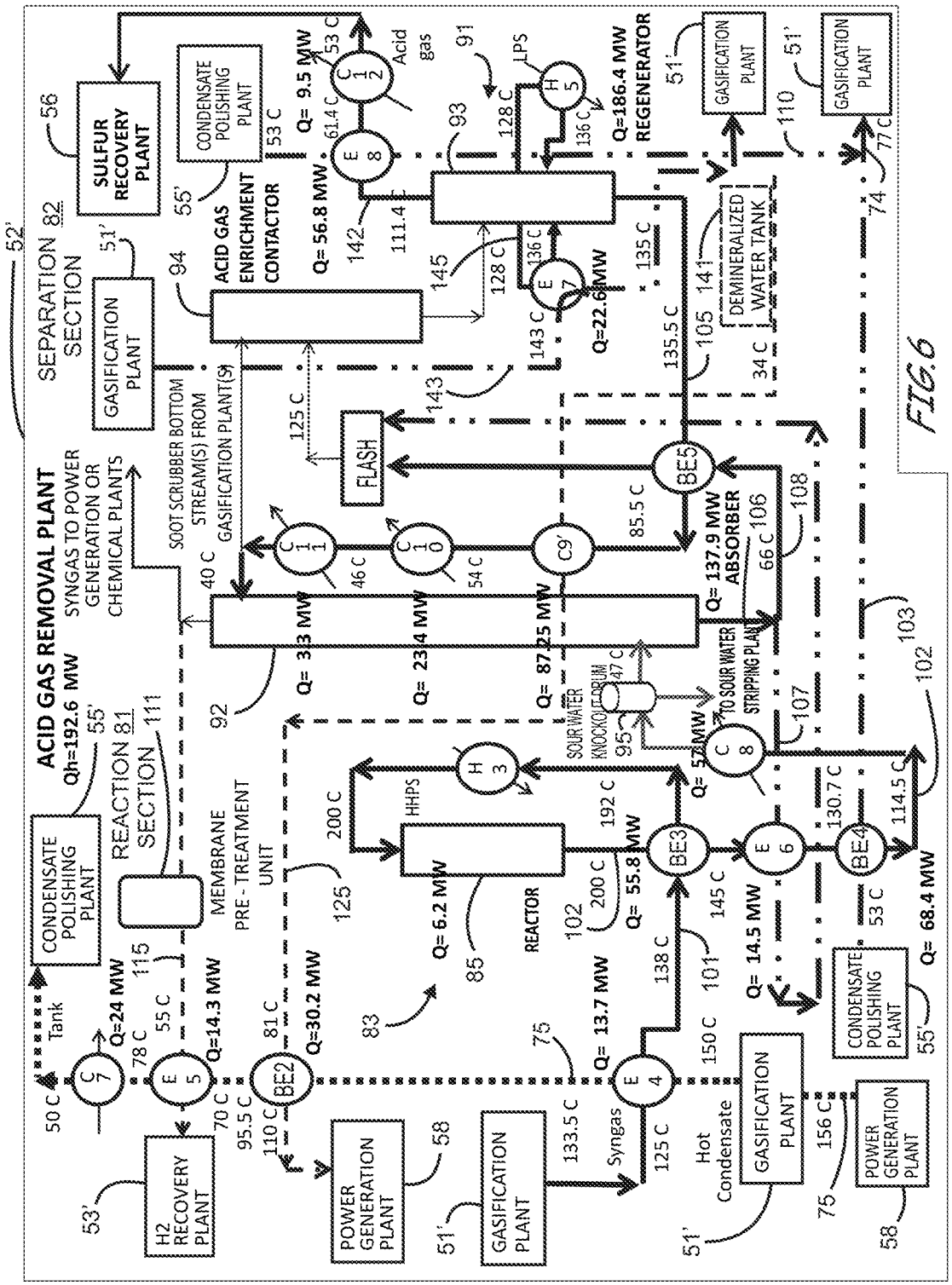
FIG. 6 is a schematic diagram illustrating an integrated process scheme for an acid gas removal plant according to an embodiment of the present invention.

FIGS. 5 and 6, illustrate a conventional acid gas removal plant 52 (FIG. 5) and an acid gas removal plant 52' having modifications to provide advanced thermal coupling arrangements according to in the exemplary integrated process scheme (FIG. 6), respectively, described later.

Figure 7:
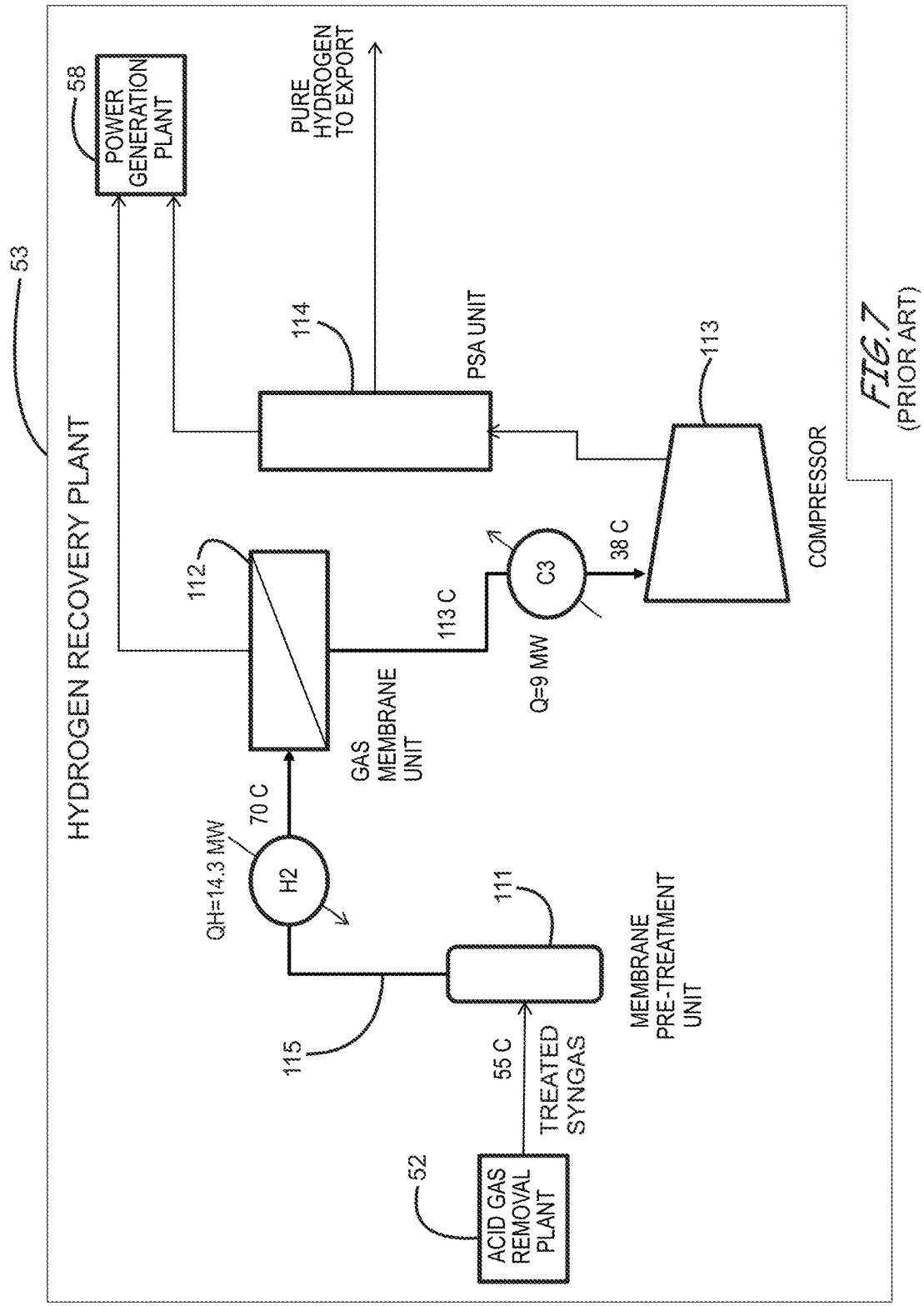
FIG. 7 is a schematic diagram of a conventional hydrogen recovery plant.
Figure 8:
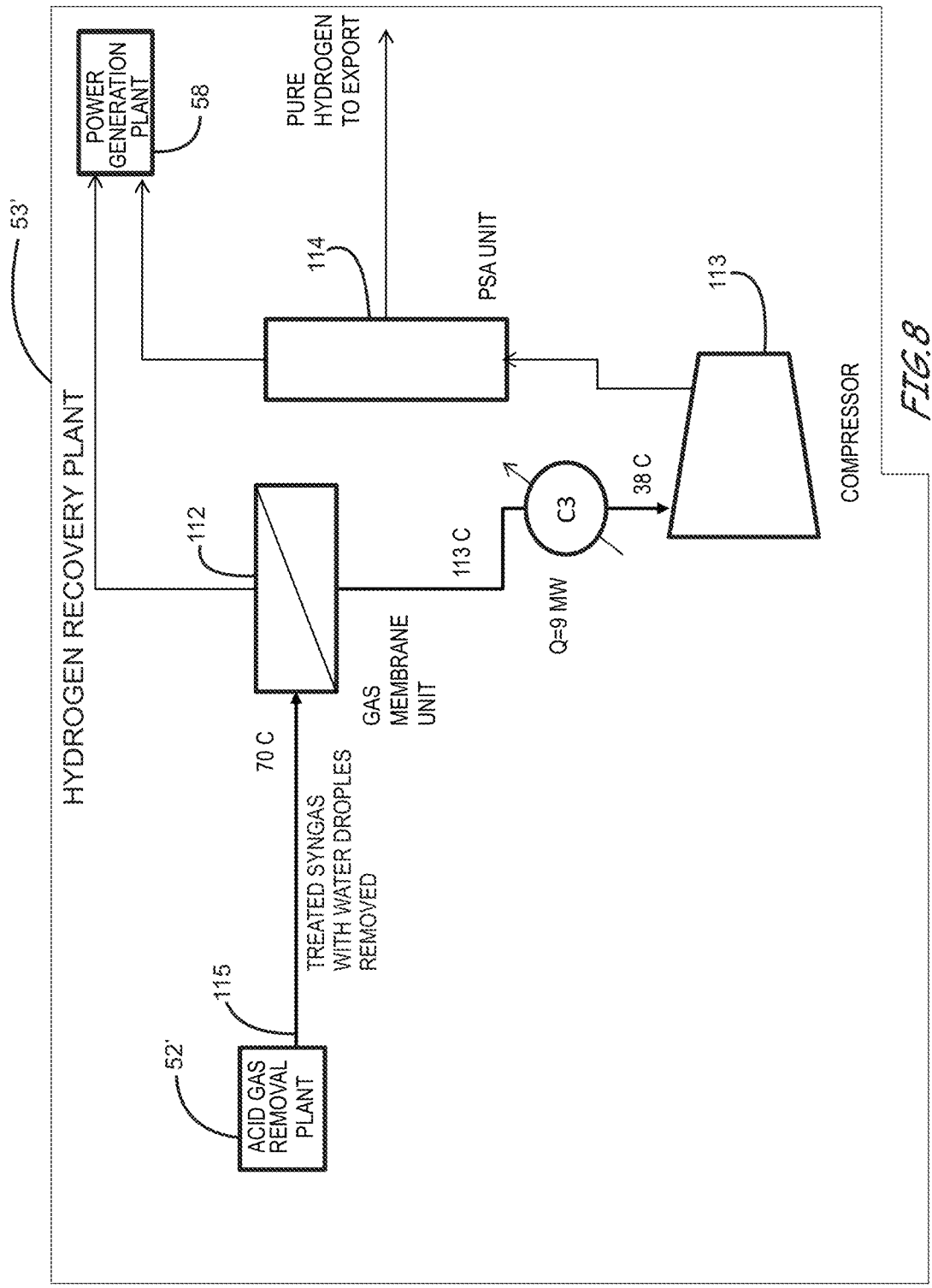
FIG. 8 is a schematic diagram illustrating an integrated process scheme for hydrogen recovery plant according to an embodiment of the present invention.

Referring to FIGS. 7 and 8, in this exemplary integrated process scheme, the hydrogen recovery plant's gas separation membrane pre-treatment drum/unit 111 used to separate the water droplets from the syngas and syngas stream heater H2 are demolished, removed, or otherwise rendered inert, completely eliminating the need to the heating utility required in the hydrogen recovery plant 53' (FIGS. 7-8). The gas separation membrane pre-treatment unit 111 and corresponding syngas stream heater E5 are located in the acid gas removal plant reaction section 81 (FIG. 6).

Figure 9:
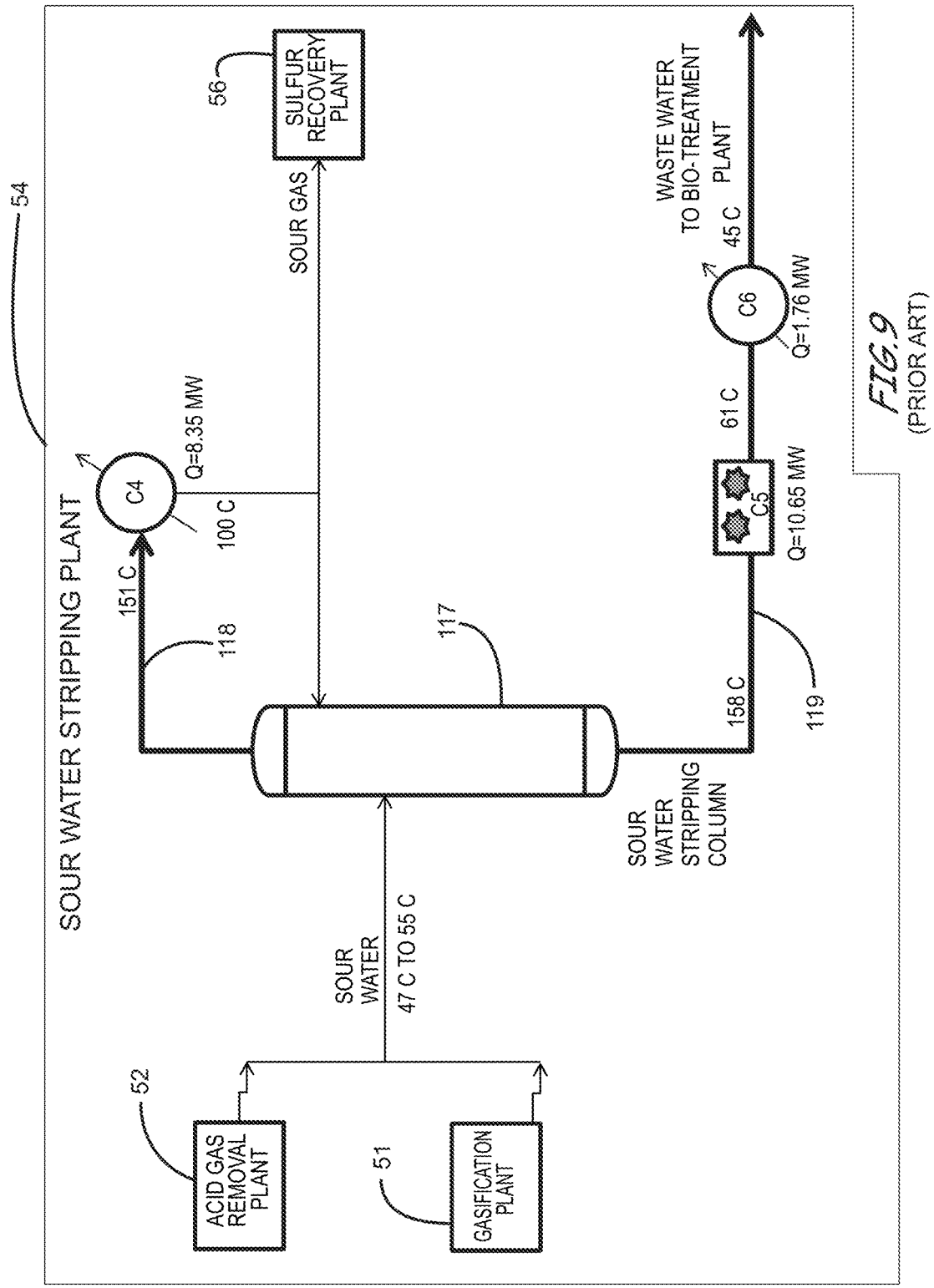
FIG. 9 is a schematic diagram of a conventional sour water stripping plant.
Figure 10:
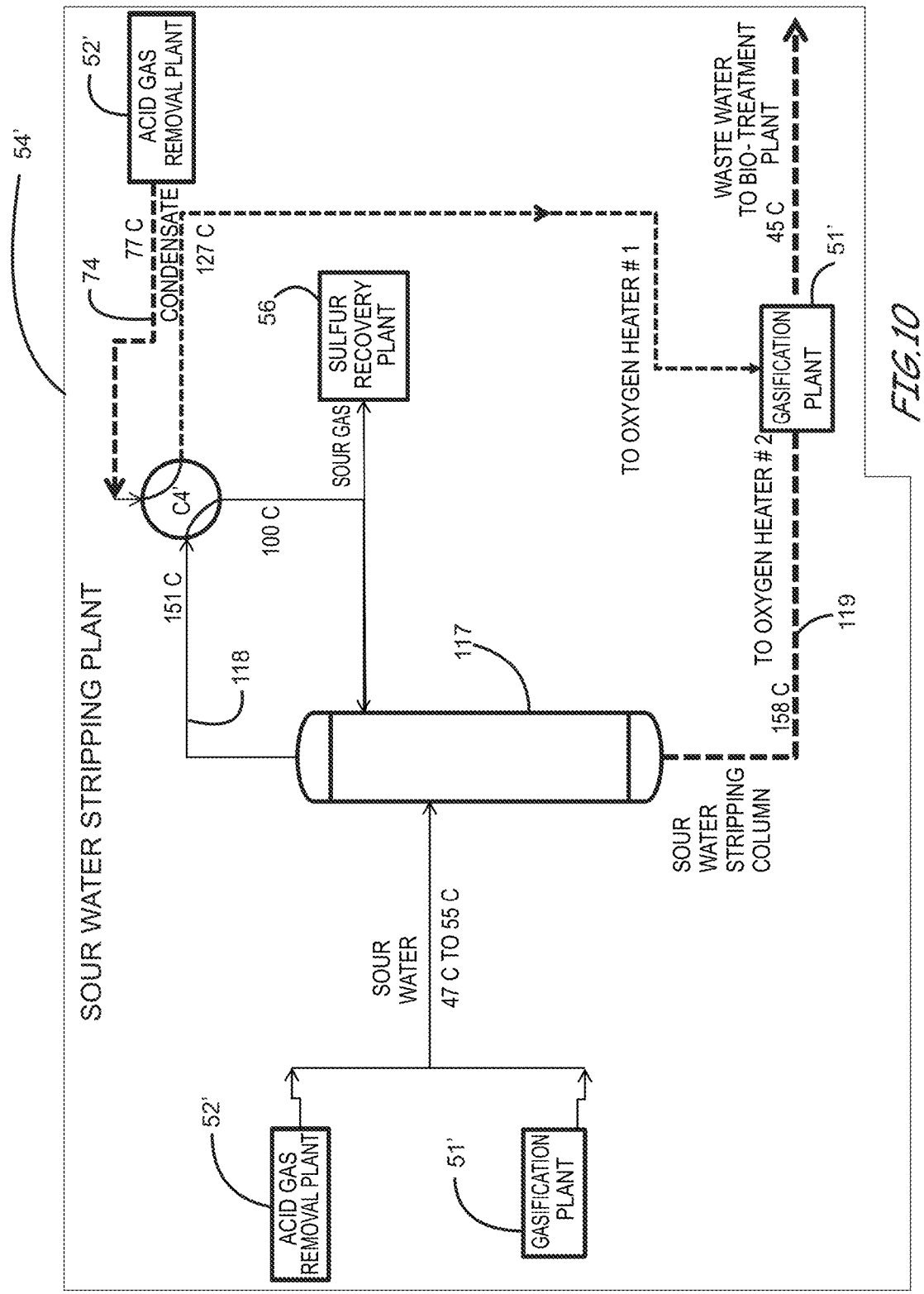
FIG. 10 is a schematic diagram illustrating an integrated process scheme for a sour water stripping plant according to an embodiment of the present invention.

Referring to FIGS. 9 and 10, in the exemplary integrated process scheme, the sour water stripping plant 54' upon integration with the gasification plant 51' does not need any cooling utilities. The bottom stream 119 from the sour water stripper 117 is routed from the sour water stripping plant 54' to the inlet section of the gasification plant 51' and to heat exchanger E2 to heat the second branch 72 of the oxygen main stream, en route to the reactors 61 from the air separation plant 57, before proceeding to the bio-treatment plant storage tanks (not shown). The top overhead stream 118 of the sour water stripper 117 is used to raise the temperature of the condensate stream 74 from the acid gas removal plant 52' from about 77° C. to about 127° C. to enable it heats up the first branch 71 of the oxygen feed to gasification plant 51' (FIG. 4).

Figure 11:
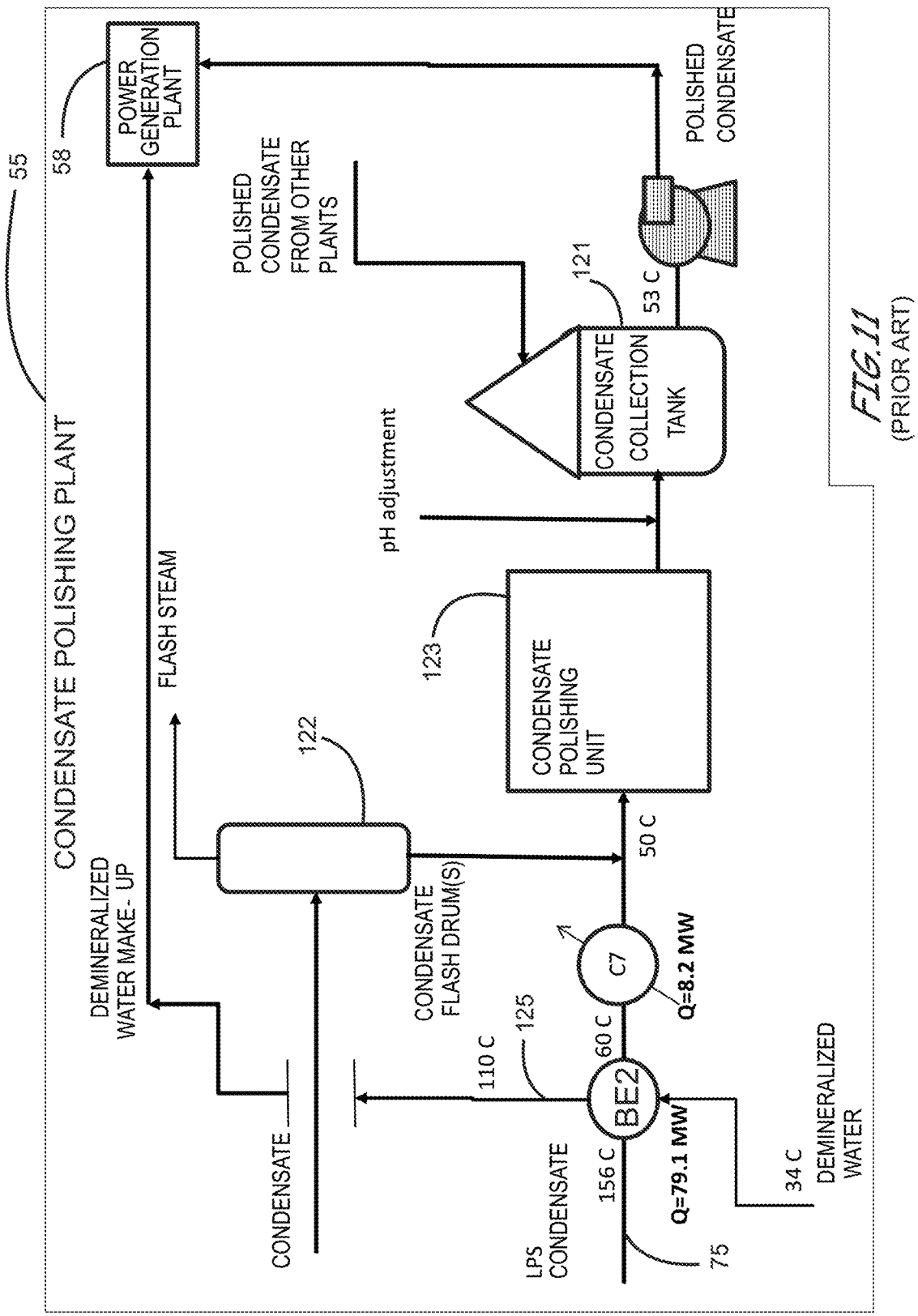
FIG. 11 is a schematic diagram of a conventional condensate polishing plant.
Figure 12:
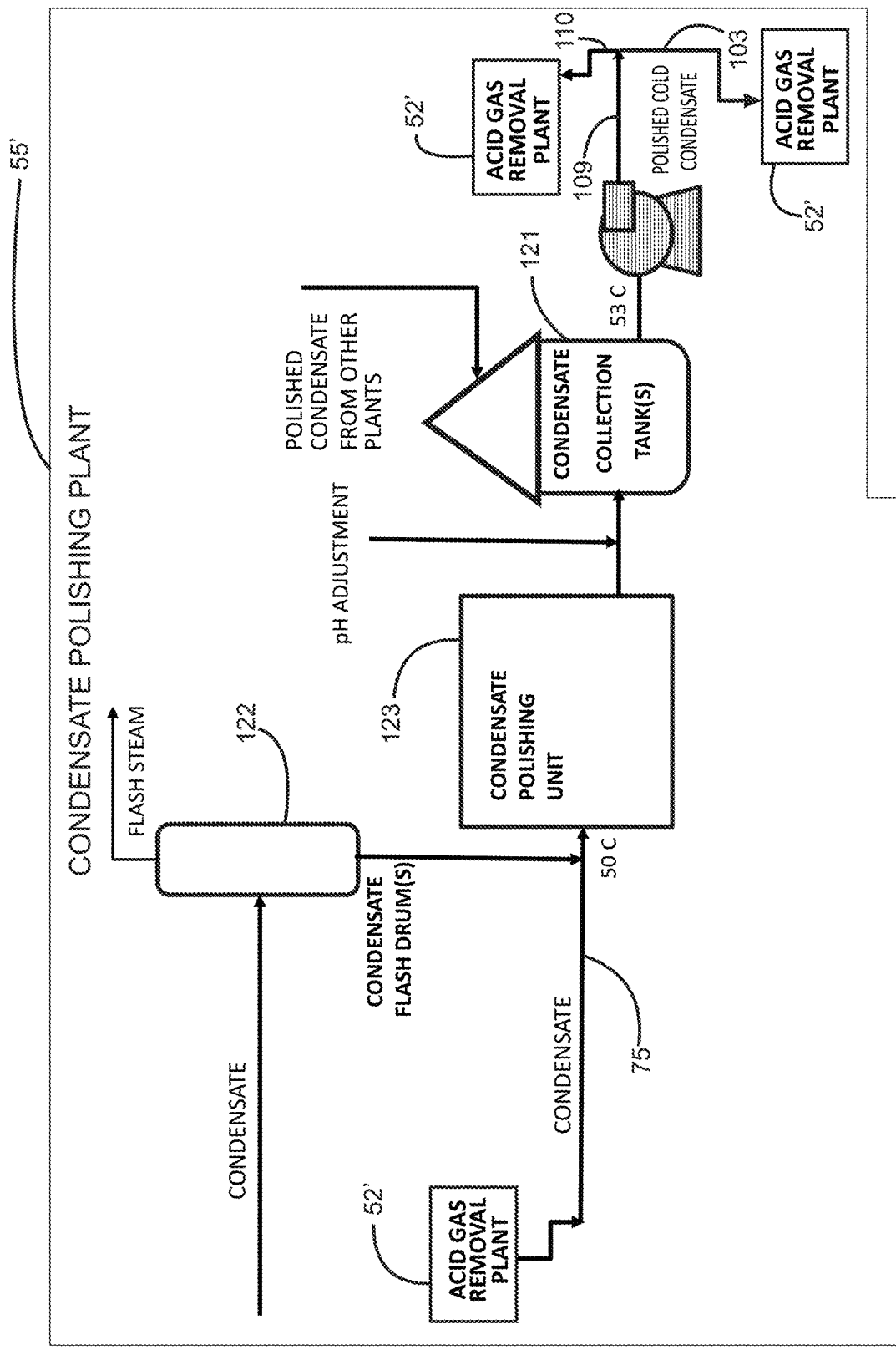
FIG. 12 is a schematic diagram illustrating an integrated process scheme for a condensate polishing plant according to an embodiment of the present invention.

Referring to FIGS. 11 and 12, in the exemplary integrated process scheme, the condensate polishing plant 55' includes the condensate storage tank 121, the atmospheric condensate flash drum(s) 122, and the condensate polisher unit 123. The heat exchanger BE2 for heating demineralized water 125 and cooling the hot LPS condensate stream 75, is removed from the condensate polishing plant 55 and located in the reaction section 81 of the acid gas removal plant 52' (FIG. 6). The water cooler C7 for cooling the hot condensate en route to the condensate polishing unit 123 is also moved to the acid gas removal plant's reaction section 81. According to the exemplary integrated process scheme, the cold condensate 109 at 53° C. from the condensate polishing plant 55' proceeds to the acid gas removal plant separation section 82 instead of or in addition to the acid gas removal plant reaction section 81 (FIGS. 6 and 12). As further shown in FIG. 12, and as well in FIG. 6, the cold condensate stream 109 splits into two branches 103, 110, with the first branch 103 directed to the reactor effluent stream/absorber-feed heat exchanger unit (cooler) BE4 relocated to the separation section 82 of the acid gas removal plant 52', and the second branch 110 directed to the added solvent regenerator top stream heat exchanger unit E8.

Referring to FIGS. 5 and 6, in the exemplary integrated process scheme, the acid gas removal plant 52' (FIG. 6) contains the syngas separation membrane pre-treatment drum 111 to clean the treated syngas stream 115. The reaction section/area 81 and separation section/area 82 are either combined together in one section/area in the plot plan (to be fully adjacent), or in an alternative configuration, they can be at least somewhat physically separated. In either configuration, the reaction section 81 typically contains: the reactor 85, the feed-effluent heat exchanger BE3, the high pressure steam heater H3, the relocated membrane pretreatment unit 111, the added raw syngas feed heat exchanger E4, the relocated demineralized water heat exchanger BE2, the added treated syngas heat exchanger E5, and the relocated hot condensate stream cooler C7, provided to cool the hot condensate stream 75 before proceeding to the tank 123 of the condensate polishing plant 55', along with the corresponding streams and pipes and/or conduits. In the combined configuration, the absorber-feed heat exchanger BE4, added heat exchanger E6, and optionally cooling unit C8 may be considered to be within the reaction section 81, with the remainder of the components, listed immediately below, considered to be within the separation section 82. In the separated configuration, the separation section 82 typically contains: the added heat exchanger E6, heat exchanger unit BE4, cooling unit C8, sour water knockout drum 95, absorber unit 95, the repurposed service cooler C9', water coolers C10 and C11, the heat exchanger unit BE5, the demineralized water tank 141, the flash drum, acid gas enrichment contractor 94, regenerator 93, the new second reboiler E7 for the solvent regenerator 93, the original LPS utility re-boiling unit H5, the added heat exchanger unit E8, and acid gas cooling unit 12, along with the associated streams and corresponding pipes and/or conduits.

According to the exemplary integrated process scheme, the hot condensate stream 75 from the power generation plant 58 enters the acid gas removal plant 52' at about 150° C. after being cooled from about 156° C. in the gasification plant 51' (FIG. 4). The hot condensate stream 75 is first routed to the gasification plant 51' at a temperature of about 156° C. to heat the oxygen feed 73 to the gasification reactors 61 in the added heat exchanger unit E3, thermal load of 5.1 MW, to heat the main oxygen stream/header 73 to the gasification reactor(s) 61. The hot condensate stream 75 exiting heat exchanger unit E3 is then routed to reaction section 81 of the acid gas removal plant 52', en route to the storage tank 121 of the condensate polishing plant 55'.

Upon entering the acid gas removal plant 52' at a temperature of about 150° C., the hot condensate 75 first passes through the added heat exchanger E4, thermal load of about 13.7 MW, to heat the syngas feed 101 to reactor 85 from about 125° C. to about 138° C. The hot condensate stream 75, exiting heat exchanger unit E4 at about 133.5° C., is then routed to heat exchanger BE2, thermal load of about 30.2 MW, to heat the demineralized water stream 125 to the power generation plant 58, from about 81° C. to about 110° C. The hot condensate stream 75, exiting heat exchanger unit BE2 at a temperature of about 95.5° C., is then routed to added heat exchanger unit E5, thermal load of about 14.3 MW, to heat the treated syngas feed 115 to the hydrogen recovery plant 53', from about 55° C. to about 70° C., which is received by the added heat exchanger E5, after being pretreated by the pretreatment unit 111.

According to the illustrated configuration, the hot condensate stream 75, at a temperature of about 78° C., then proceeds to a water cooler C7, where the remaining thermal load of about 24 MW is lost to the environment. At the water cooler C7, the hot condensate stream 75 is cooled to about 50° C. before the stream 75 is routed to the storage tank 121 of the condensate polishing plant 55'. The water cooler C7 can be positioned in the acid gas removal plant 52' or in the condensate polishing plant 55' according to what is determined to be the best placement for control structure response time, according to respective configuration of the acid gas removal plant 52' and condensate polishing plant 55'.

In the exemplary integrated process scheme, the acid gas removal plant reactor bottom outlet (effluent) stream 102 is cooled from about 200° C. to about 145° C. in BE3, thermal load of about 55.8 MW, using the syngas feed outlet stream 101. The syngas feed 101, after being heated from about 138° C. to about 192° C. in heat exchanger unit BE3, proceeds to heating utility heat exchanger H3, thermal load of about 6.2 MW, where it is further heated to the desired reactor feed temperature of about 200° C. using HHP steam. The reactor effluent stream 102 leaving BE3 at about 145° C., is further cooled in the added heat exchanger unit E6, thermal load of about 14.5 MW, from about 145° C. to about 130.7° C. using a branch 107 from the acid gas removal plant absorber bottom (rich solvent) stream 106.

The reactor effluent stream 102 then proceeds to heat exchanger unit BE4, thermal load of about 68.4 MW, where it is cooled from about 130.7° C. to about 114.5° C. using the first branch 103 of condensate stream 109 of the condensate polishing plant 55' (FIG. 12), before finally reaching its target temperature at about 47° C. using water cooler C8, thermal load of about 57 MW, prior to the effluent bottom stream 102 entering absorber 92. A syngas knockout (KO) drum 95 located in the pathway between the water cooler C8 and the absorber 92 collects sour water condensed as a result of a reduction in temperature of the reactor effluent stream 102 passing through water cooler C8.

In the exemplary integrated process scheme, the second branch 108 of the rich solvent stream 106 passes through heat exchanger unit BE5, thermal load of about 137.9 MW, where it is heated from 66° C. to approximately 125° C. en route to the acid gas enrichment contractor 94, by the bottom stream 105 from the solvent regenerator 93. The bottom stream 105 of the solvent regenerator 93 is received by the heat exchanger unit BE5 at a temperature of about 135.5° C. while en route to an overhead portion of the absorber 92, where it is cooled to about 85.5° C. The solvent (bottom stream) 105 of the solvent regenerator 93 further passes through the repurposed service cooler C9, replaced by or functioning as a heat exchanger unit C9', thermal load of about 87.2 MW, where it is further cooled to about 54° C., by a demineralized water stream 125, and then further to about 46° C. by chilled water cooler C10, thermal load of about 23.4 MW, and still further to about 40° C. by chilled water cooler C11, thermal load of about 3.3 MW.

According to the exemplary configuration, the bottom stream 105 is cooled in heat exchanger unit C9' by the demineralized water stream 125, either routed through the separation section 82 of the acid gas removal plant 52' or emanating from the demineralized water tank 141 positioned within the acid gas removal plant separation section 82, enroute to power generation plant 58. In the exemplary integrated process scheme, the demineralized water tank 141 is relocated to the acid gas removal plant 52'. Regardless, of the configuration, the cold stream 125 from the demineralized water tank 141 leaves the tank/enters the separation section 82 at about 34° C., where it is heated to about 81° C. in the heat exchanger unit C9', thermal load of about 87.25 MW, cooling down the lean solvent stream 105 from of the solvent regenerator 93 from about 86° C. to about 54° C. The stream 125 at 81° C. then precedes to the reaction section 81 to cool the hot condensate 75 at about 133.5° C. to about 95.5° C. in heat exchanger BE2, thermal load of about 30.2 MW, and to be heated to 110° C. before proceeding to the power generation plant 58 as boiler feed water.

As described above, in the exemplary integrated process scheme, the condensate stream 109 from the condensate polishing plant 55' (FIG. 12) at about 53° C. is split into two branches 103, 110. The first branch/split 103 is routed to heat exchanger unit BE4, thermal load of about 68.4 MW, positioned to cool the effluent stream 102 from about 130.7° C. to about 114.5° C., and the second branch/split 110 is routed to the added heat exchanger unit E8, thermal load of about 56.8 MW, positioned to cool the solvent regenerator acid gas top stream 142 from a temperature of about 111° C. to about 61.4° C. before the acid gas 142 is further cooled to about 53° C. in C12, thermal load of about 9.5 MW, using cooling water, before departing the acid gas removal plant 52' en route to the sulfur recovery plant 56. Those two branches/splits 103, 110, of the condensate stream 109 are then joined (consolidated) to form a "hot" condensate stream 74, having a temperature of about 77° C., where it proceeds from the separation section 82 of the acid gas removal plant 52' en route to the gasification plant 51', where the consolidated cold condensate stream 74 is utilized as a buffer stream, gaining an additional heat load at the repurposed/replaced sour water stripper overhead stream heat exchanger unit C4', to be used to heat the oxygen feed 71 to the gasification reactor 61 in heat exchanger unit E1, as described previously.

In this exemplary integrated process scheme, a branch 143 of bottom stream 144 of the gasification plant soot scrubber 68 at a temperature of about 143° C., is routed to the acid gas removal plant separation section 82 to be used as a heating utility in the added heat exchanger E7, thermal load of about 22.6 MW, functioning as a second/first reboiling unit (reboiler) E7, to reboil a solvent regenerator tray stream 145 extracted from a solvent stream tray of the solvent regenerator 93, before being routed back at a temperature of about 135° C. to the gasification plant 51', where it is further cooled to the desired temperature of about 123° C. by the soot scrubber pump around cooler C2 (FIG. 4), but with a thermal load reduced from about 48.8 MW to about 26.2 MW, as a result of the heat energy exchanged within the added heat exchanger unit (second/first reboiler) E7. Note, according to this exemplary process scheme, the routing configuration of the other branch 146 of the bottom stream 144 destined for the soot quench 67 and cooled by cooling utility unit C1, 36.6 MW, remains unchanged.

The added heat exchanger unit E7, utilizing the heat energy of branch 143 of the bottom stream 144 of the gasification plant soot scrubber 68, functions as a second/first reboiler unit (reboiler) E7, thermal load of about 22.6 MW, to reboil the solvent regenerator tray stream 145 extracted from a solvent stream tray of the solvent regenerator 93 at a temperature of about 123° C., to a return temperature of about 136° C. The second/first reboiler unit (reboiler) E7 beneficially works in conjunction with a first/second reboiler H5, utilizing LPS heat typically from a hot steam utility, to a boil a first/second tray stream from a temperature of 123° C. to a temperature of about 136° C., thermal load of about 186.4 MW, reduced from about 209 MW by the thermal load of about 22.6 MW provided, for example, at the same tray level by the second/first reboiler E7. Note, according to an exemplary configuration, the internal trays design has been modified to minimize the pressure drop across the column of the solvent regenerator 93. Additionally, the operating pressure of the bottom of the solvent regenerator 93 is optionally established to be between approximately 1.2 and 1.5 barg.

In this exemplary integrated process scheme, a branch 143 of bottom stream 144 of the gasification plant soot scrubber 68 at a temperature of about 143° C., is routed to the acid gas removal plant separation section 82 to be used as a heating utility in the added heat exchanger E7, thermal load of about 22.6 MW, functioning as a second/first reboiling unit (reboiler) E7, to reboil a solvent regenerator tray stream 145 extracted from a solvent stream tray of the solvent regenerator 93, before being routed back at a temperature of about 135° C. to the gasification plant 51', where it is further cooled to the desired temperature of about 123° C. by the soot scrubber pump around cooler C2 (FIG. 4), but with a thermal load reduced from about 48.8 MW to about 26.2 MW, as a result of the heat energy exchanged within the added heat exchanger unit (second/first reboiler) E7. Note, according to this exemplary process scheme, the routing configuration of the other branch 146 of the bottom stream 144 destined for the soot quench 67 and cooled by cooling utility unit C1, 36.6 MW, remains unchanged.

The added heat exchanger unit E7, utilizing the heat energy of branch 143 of the bottom stream 144 of the gasification plant soot scrubber 68, functions as a second/first reboiler unit (reboiler) E7, thermal load of about 22.6 MW, to reboil the solvent regenerator tray stream 145 extracted from a solvent stream tray of the solvent regenerator 93 at a temperature of about 123° C., to a return temperature of about 136° C. The second/first reboiler unit (reboiler) E7 beneficially works in conjunction with a first/second reboiler H5, utilizing LPS heat typically from a hot steam utility, to a boil a first/second tray stream from a temperature of 123° C. to a temperature of about 136° C., thermal load of about 186.4 MW, reduced from about 209 MW by the thermal load of about 22.6 MW provided, for example, at the same tray level by the second/first reboiler E7. Note, according to an exemplary configuration, the internal trays design has been modified to minimize the pressure drop across the column of the solvent regenerator 93. Additionally, the operating pressure of the bottom of the solvent regenerator 93 is optionally established to be between approximately 1.2 and 1.5 barg.

FIGS. 13-22 provide illustrative examples of embodiments of an apparatus including an exemplary energy management systems employing various advanced energy-efficient process schemes, which can be adapted on a standalone basis, but that are expected to render lower reductions in energy consumption and energy-based GHG emissions than that of the above described more fully integrated process scheme having the various configurations illustrated in FIGS. 4, 6, 8, 10 and 12. Many less integrated process schemes with different configurations can be produced from the exemplary more fully integrated process scheme.

FIGS. 13-22 provide illustrative examples of embodiments of a multi-generation apparatus including exemplary gasification system energy management systems employing integrated gasification plant-directed advanced process schemes, along with configuration and employment methodologies.

Figure 13:
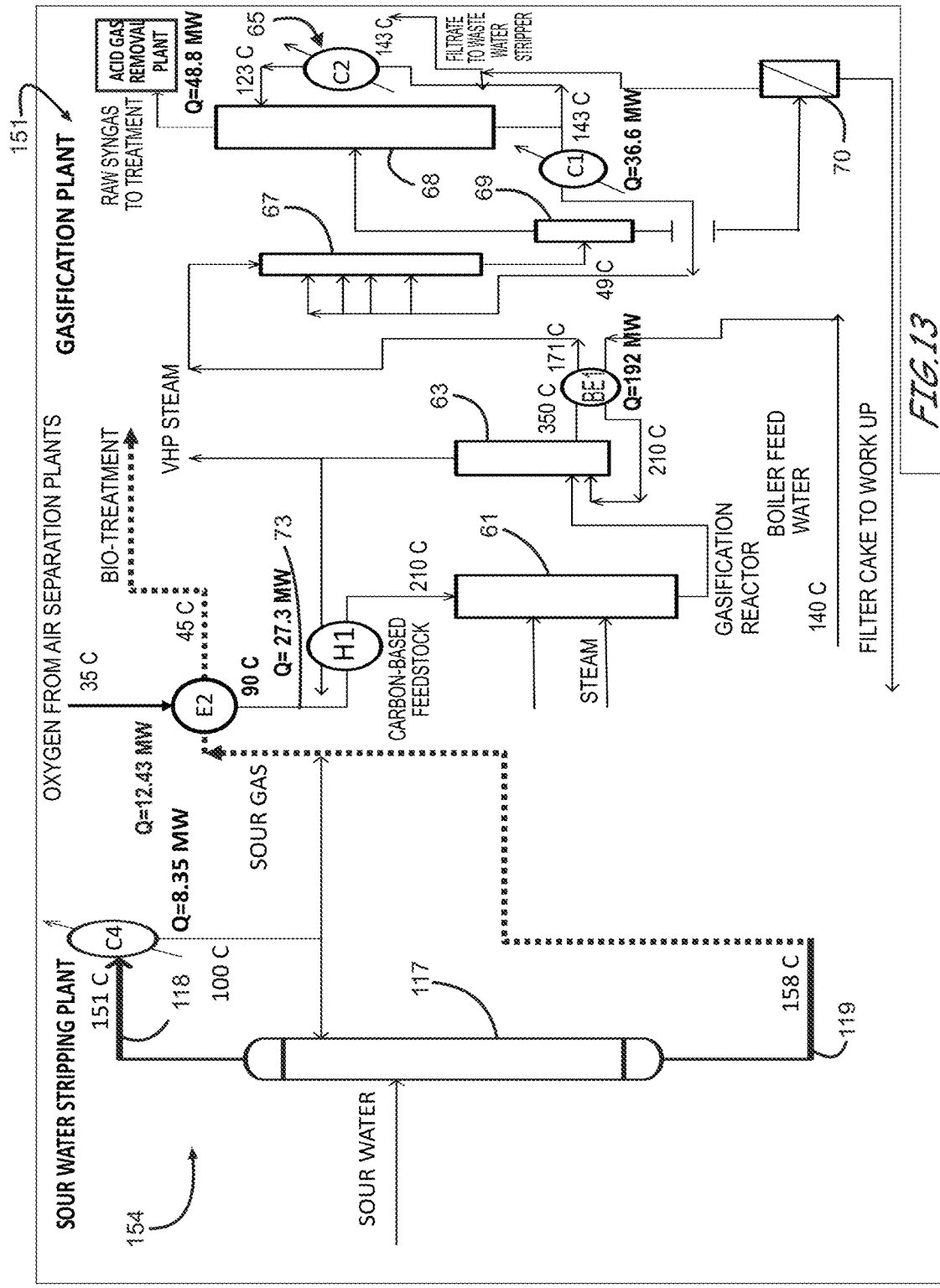
FIG. 13 is a schematic diagram illustrating an integrated process scheme for a gasification plant according to an embodiment of the present invention.
Figure 14:
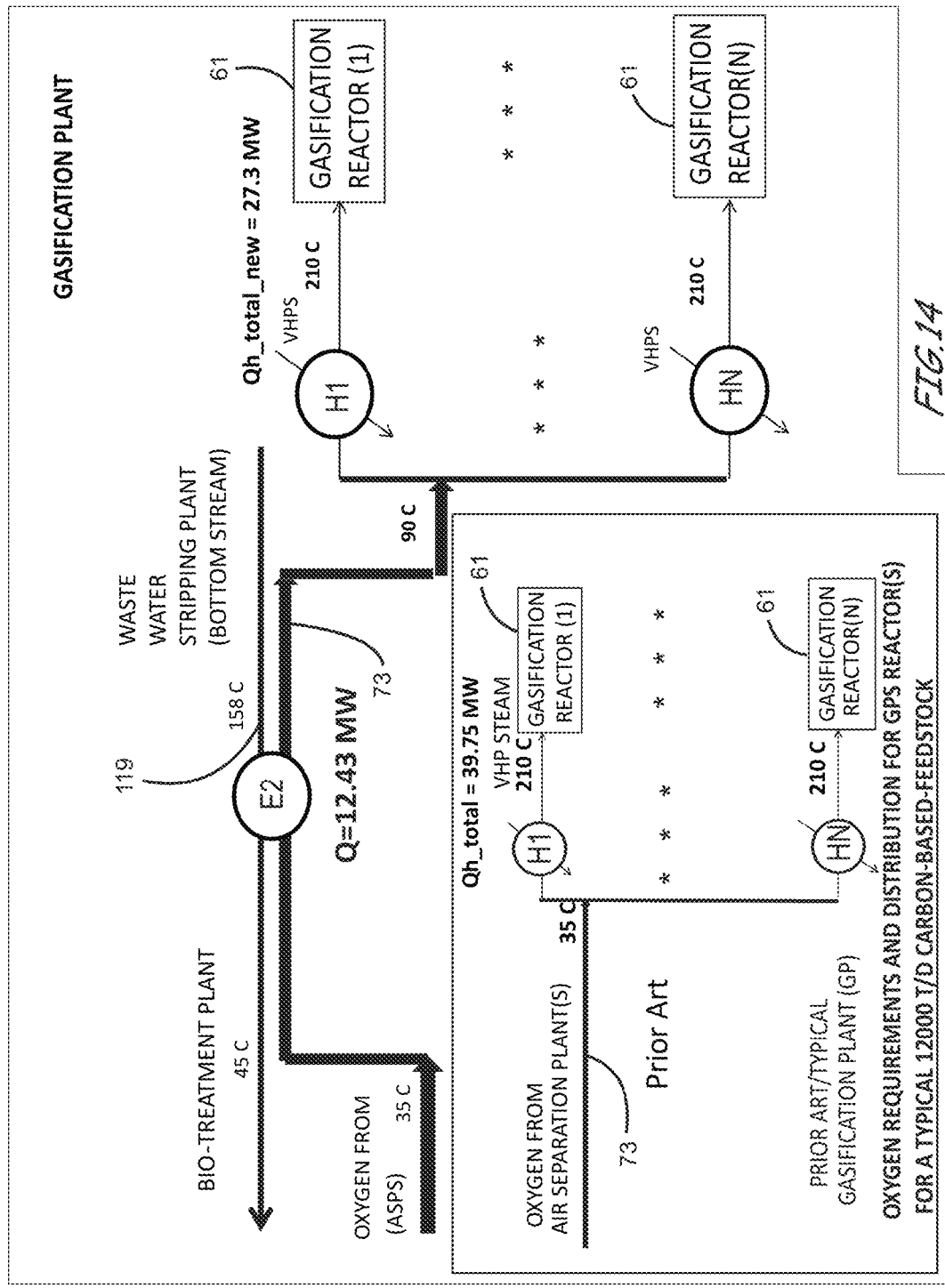
FIG. 14 is a schematic diagram illustrating a portion of the integrated process scheme illustrated in FIG. 13 according to an embodiment of the present invention.

Energy efficient "Gasification Plant-Directed" process scheme #1, detailed in FIGS. 13 and 14, can save the carbon-based feedstock-gasification multi-generation facility/apparatus about 31% of the gasification plant's energy consumption and energy-based GHG emissions. It integrates the gasification and sour water stripping plants 151, 154 through the sour water stripper bottom stream in an added heat exchanger E2 receiving substantially the entire oxygen feed 73, with a thermal load of 12.43 MW, to heat the gasification plant oxygen feed 73 from 35° C. to 90° C. before it enters the gasification plant steam heater H1.

Figure 15:
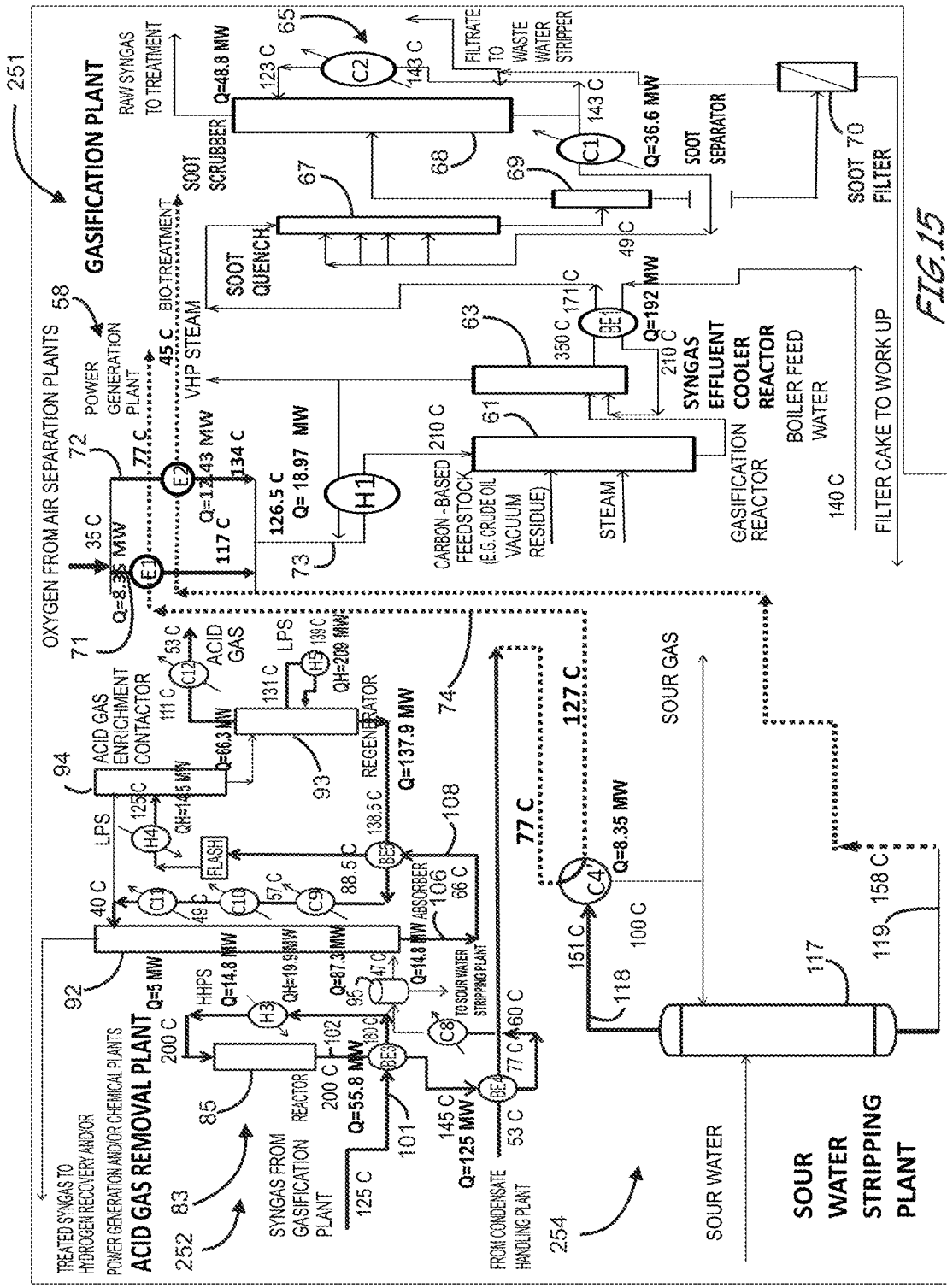
FIG. 15 is a schematic diagram illustrating an integrated process scheme for a gasification plant according to an embodiment of the present invention.
Figure 16:
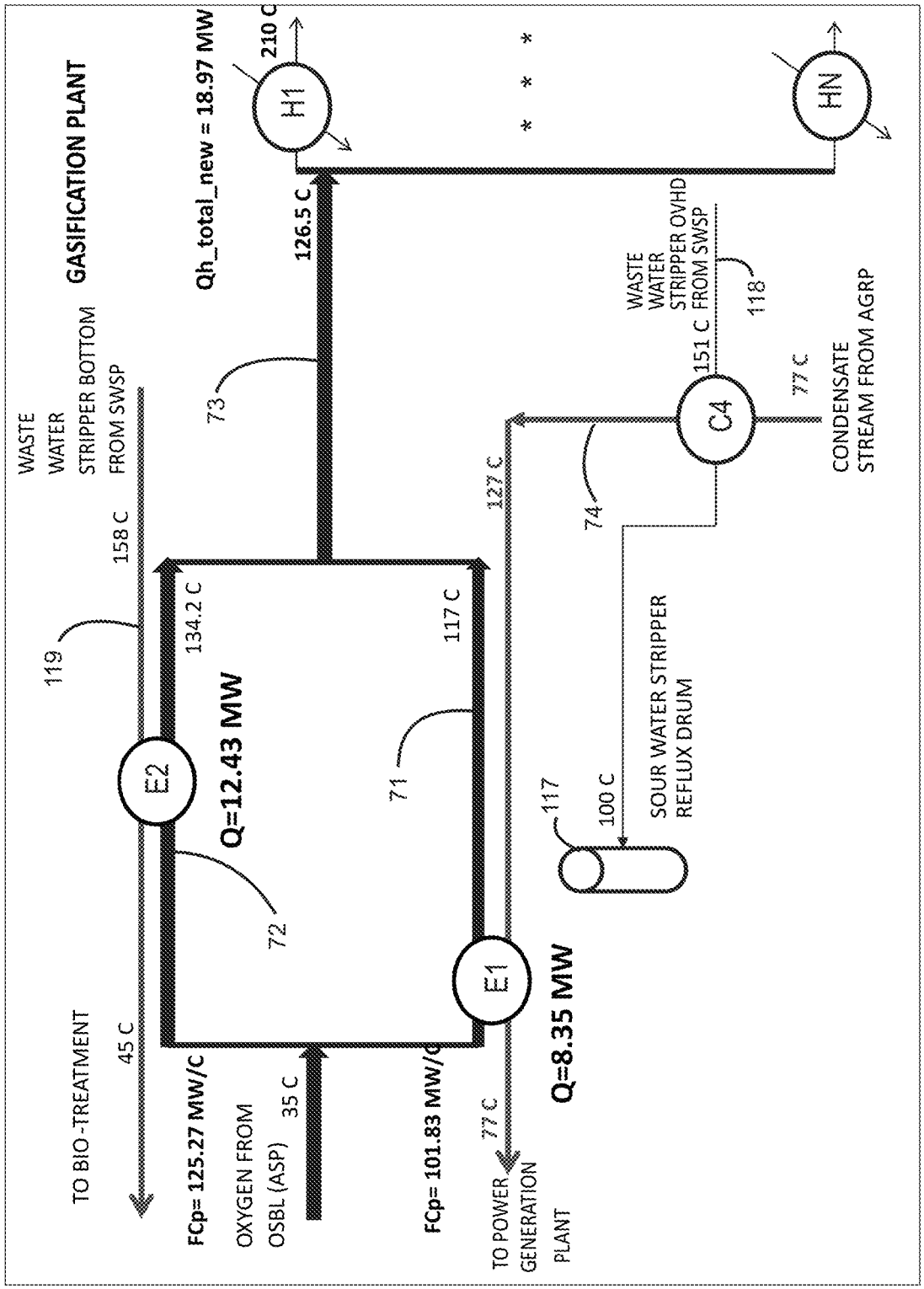
FIG. 16 is a schematic diagram illustrating a portion of the integrated process scheme illustrated in FIG. 15 according to an embodiment of the present invention.

Energy efficient "Gasification Plant-Directed" process scheme #2, detailed in FIGS. 15 and 16, can save the carbon-based feedstock-gasification multi-generation facility/apparatus about 52% of the gasification plant's energy consumption and energy-based GHG emissions. It integrates the gasification, acid gas removal, sour water stripping, and condensate polishing plants 251, 252(52), 254, 55, through the condensate stream 74 that works as a buffer to collect the thermal load in the sour water stripper overhead stream 118 with heat exchanger unit C4, to heat the first branch 71 of the oxygen feed 73 to the gasification reactor 61 in added heat exchanger unit E1, thermal load of about 8.35 MW, from 35° C. to 117° C.; and through the sour water stripper bottom stream 119 in an added heat exchanger E2, thermal load of 12.43 MW, to heat a second branch 72 from the gasification plant oxygen feed from 35° C. to 134° C. The two branches 71, 72, upon mixing to one stream 73 at a temperature of 126.5° C., proceeds to the steam heater H1 for the gasification reactor 61.

Figure 17:
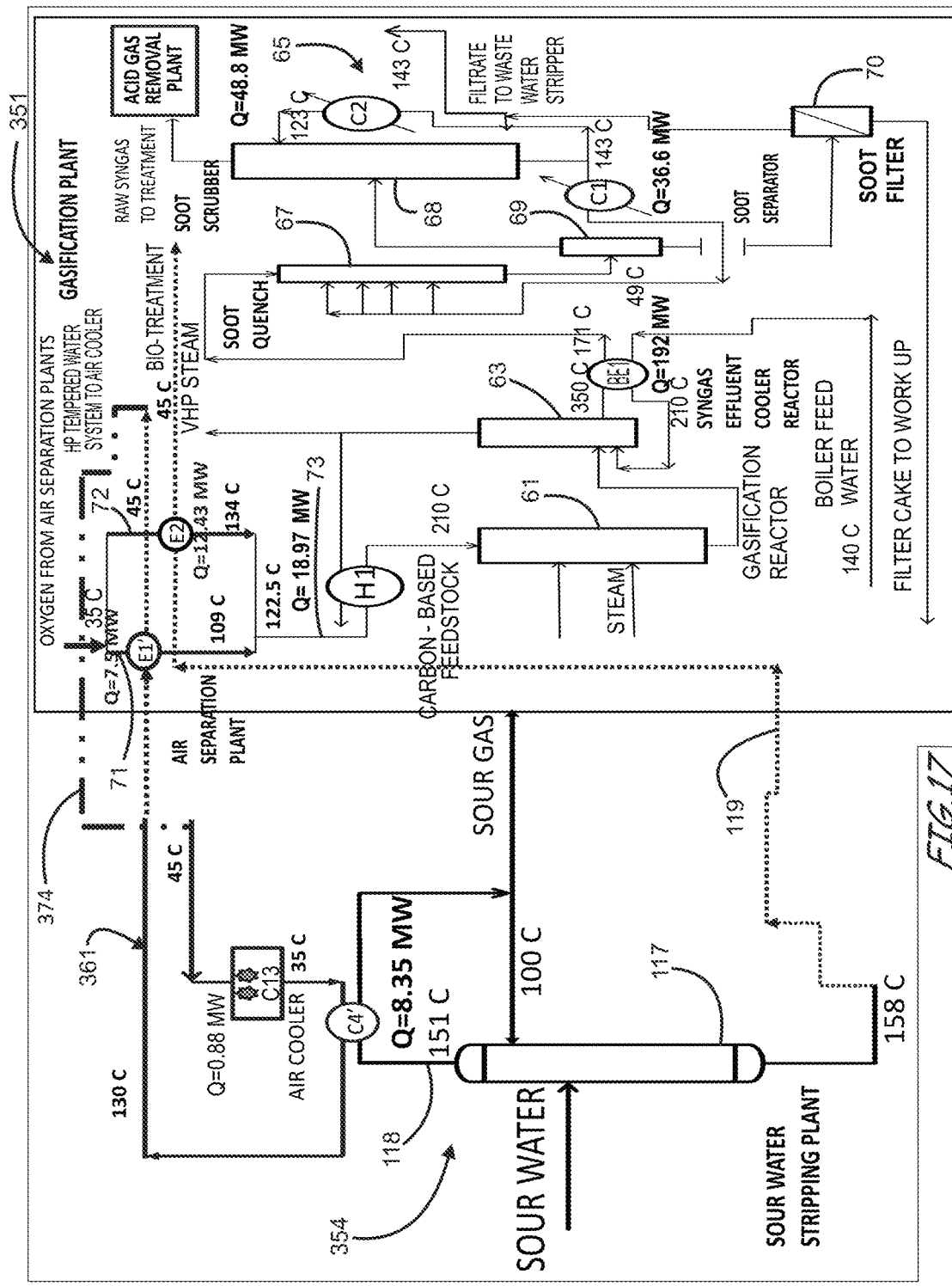
FIG. 17 is a schematic diagram illustrating an integrated process scheme for a gasification plant according to an embodiment of the present invention.
Figure 18:
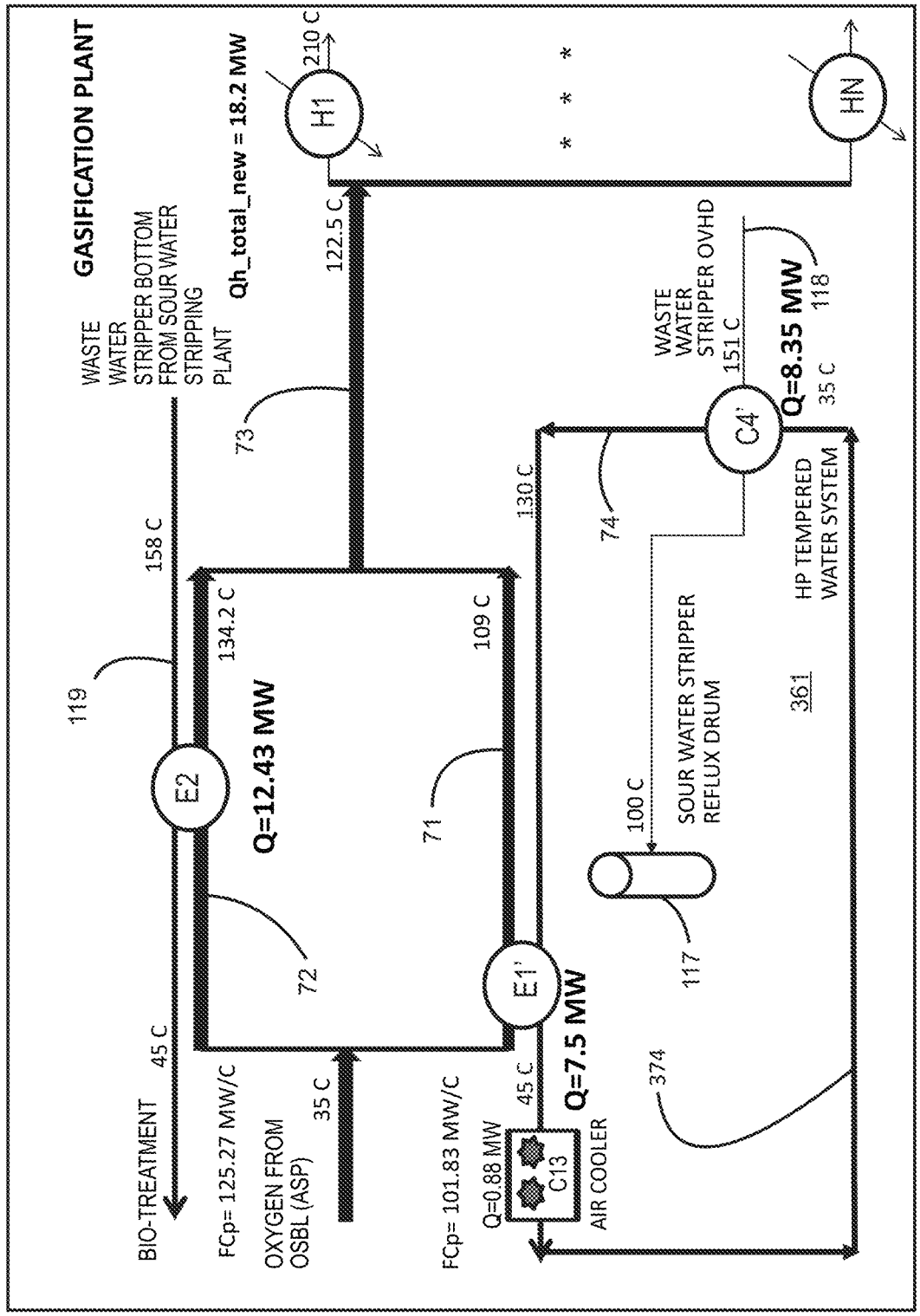
FIG. 18 is a schematic diagram illustrating a portion of the integrated process scheme illustrated in FIG. 17 according to an embodiment of the present invention.

Energy efficient "Gasification Plant-Directed" process scheme #3, detailed in FIGS. 17 and 18, can save the carbon-based feedstock-gasification multi-generation facility/apparatus about 50% of the gasification plant's energy consumption and energy-based GHG emissions. It integrates the gasification and sour water stripping plants 351, 354, through a high pressure hot (e.g., tempered) water/steam circuit or other system 361, collectively referred to as a "hot water system 361" for simplicity, that circulates a hot/cooling water/steam stream, collectively referred to as a "hot water stream 374," which functions as a buffer to collect the thermal load in the sour water stripper overhead stream 118 to both cool the sour water stripper overhead stream 118 and heat the first branch 71 of the oxygen feed 73 to the gasification reactor. The hot water stream 374 of the hot water system 361 first interfaces with or otherwise flows through, i.e., into and out of, a repurposed or substitute heat exchanger unit C4', thermal load of about 8.35 MW, to heat the collect heat from the sour water stripper overhead stream 118, being heated from 35° C. to 130° C., and then flows through added heat exchanger unit E1, thermal load of about 7.5 MW, to heat the first branch 71 of the oxygen feed 73 from 35° C. to 109° C. After heating the first branch 71, the hot water stream 374, at a temperature of approximately 45° C., is returned through a trim and/or air cooler/cooling unit C13, thermal load of about 0.88 MW to cool the return stream from 45° C. to 35° C., prior to cycling back through heat exchanger C4'.

The sour water stripper bottom stream 75, at a temperature of approximately 158° C., interfaces with or otherwise flows through an added heat exchanger E2, thermal load of about 12.43 MW, and route to the biotreatment plant, to heat the second branch 72 from the gasification plant oxygen feed 73 from 35° C. to 134° C., and to be cooled from 158° C. to 45° C.—negating the need for cooling units C5 and C6 (FIG. 9). The two branches 71, 72, upon mixing to one stream 73 at a temperature of 122.5° C., proceed through the gasification plant steam heater H1 en route to the gasification reactor 61.

Figure 19:
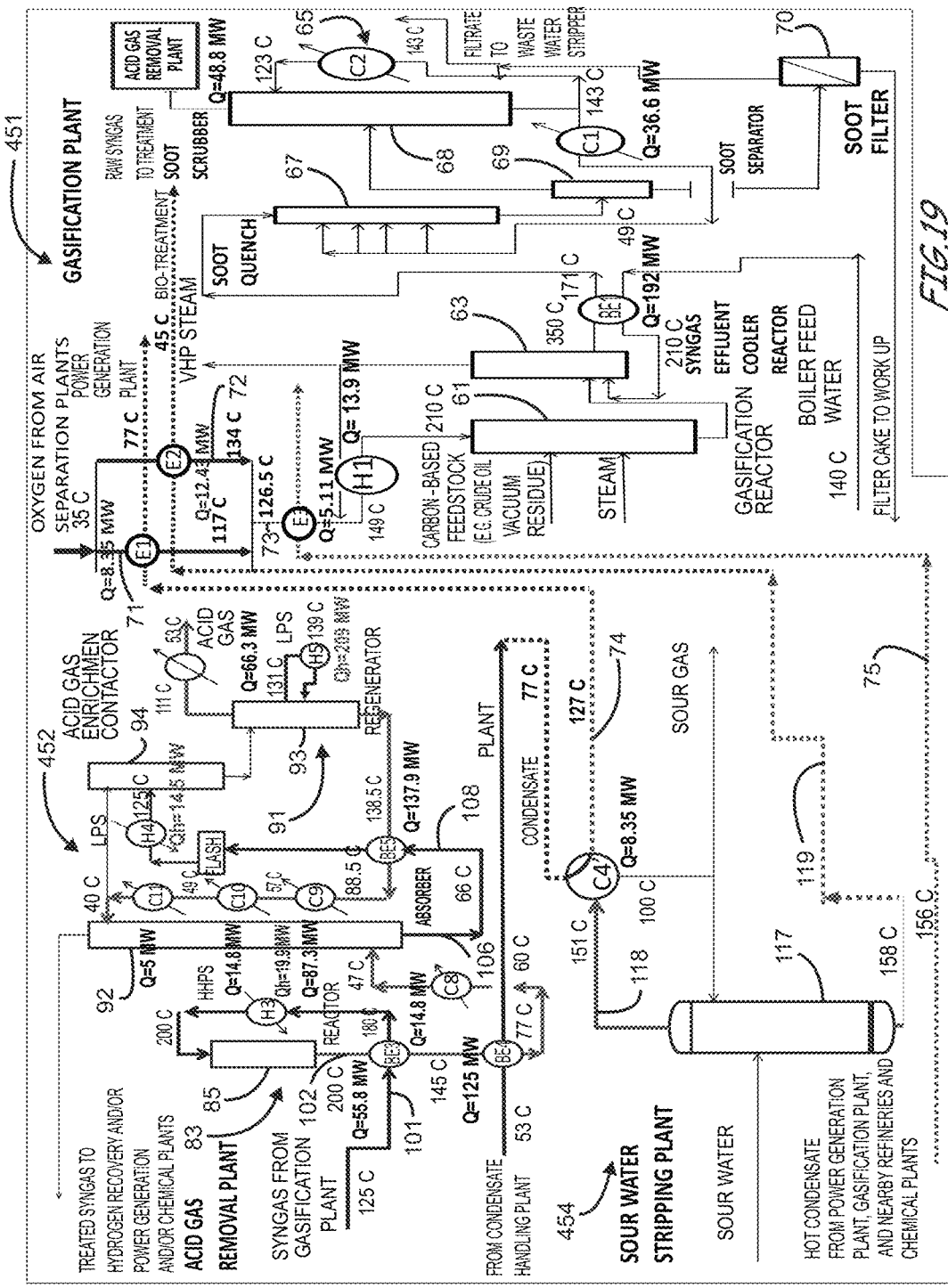
FIG. 19 is a schematic diagram illustrating an integrated process scheme for a gasification plant according to an embodiment of the present invention.
Figure 20:
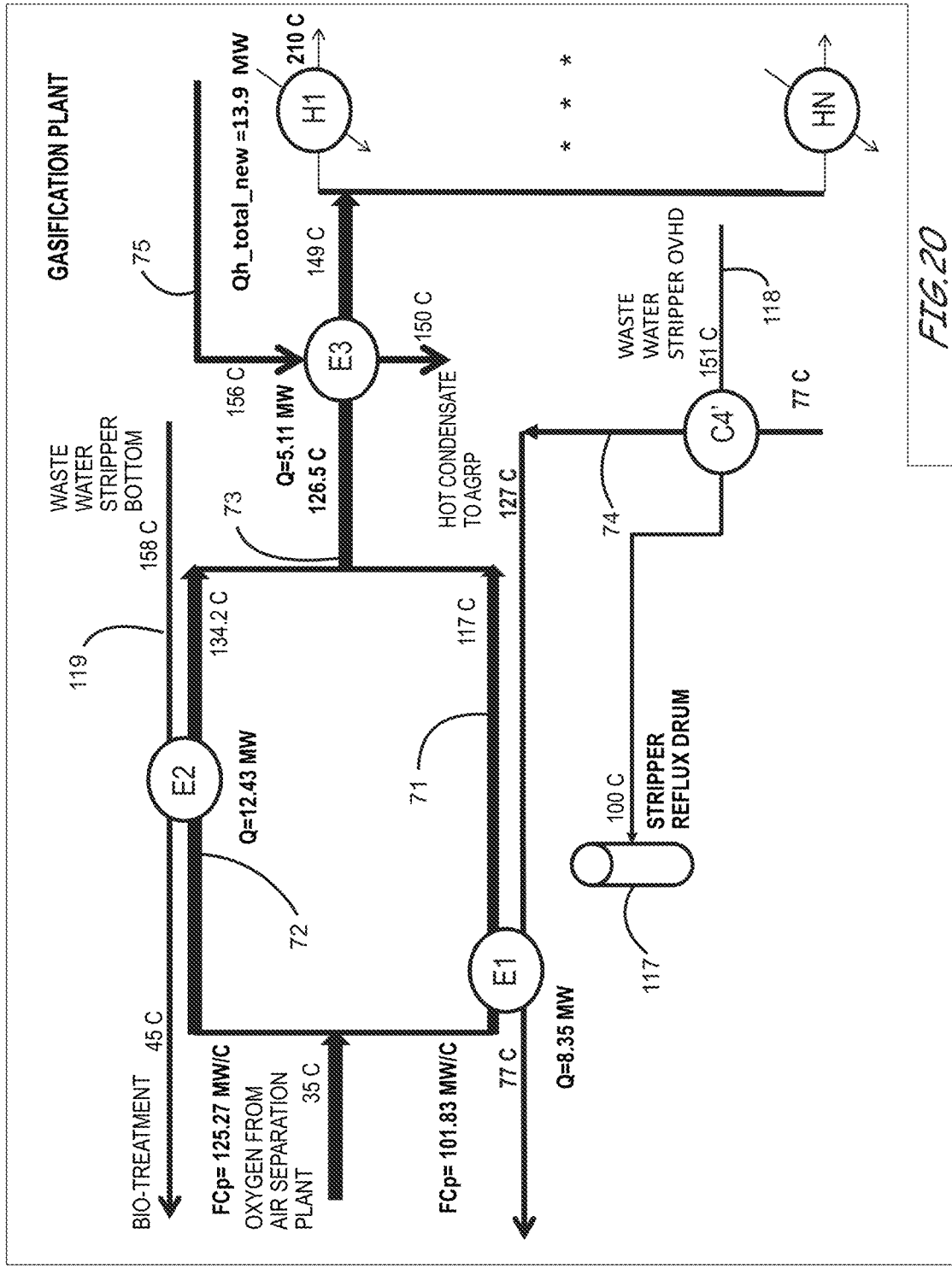
FIG. 20 is a schematic diagram illustrating a portion of the integrated process scheme illustrated in FIG. 19 according to an embodiment of the present invention.

Energy efficient "Gasification Plant-Directed" process scheme #4, detailed in FIGS. 19 and 20, can save the carbon-based feedstock-gasification multi-generation facility/apparatus about 65% of the gasification plant's energy consumption and energy-based GHG emissions. It integrates the gasification, acid gas removal, sour water stripping, and condensate polishing plants 451, 452(52), 454, 55, through the condensate stream 74 that works as a buffer to collect the thermal load in the sour water stripper overhead stream 118 with heat exchanger unit C4' to heat the first branch 71 of the oxygen feed 73 to the gasification reactor 61 in added heat exchanger unit E1, thermal load of about 8.35 MW, from 35° C. to 117° C., and through the sour water stripper bottom stream 119 in added heat exchanger E2, thermal load of 12.43 MW, to heat the second branch 72 from the gasification plant oxygen feed 73 from 35° C. to 134° C. The two branches 71, 72, upon mixing to one stream 73 at a temperature of 126.5° C. where it proceeds to the third added heat exchanger unit E3 that used hot condensate 75 at 156° C. to heat the mixed branch from 126.5° C. to 149° C. before the gasification plant steam heater H1.

Figure 21:
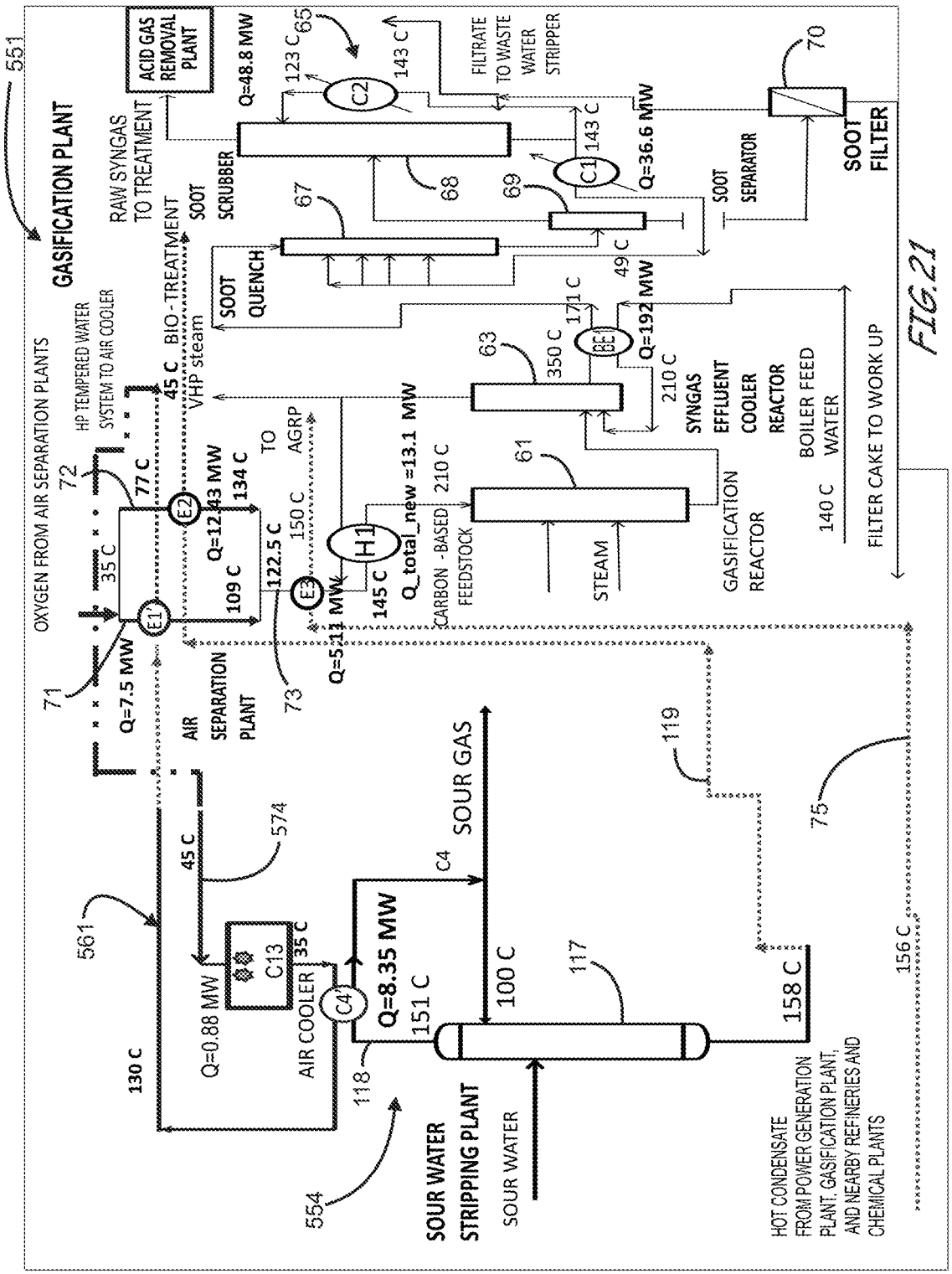
FIG. 21 is a schematic diagram illustrating an integrated process scheme for a gasification plant according to an embodiment of the present invention.
Figure 22:
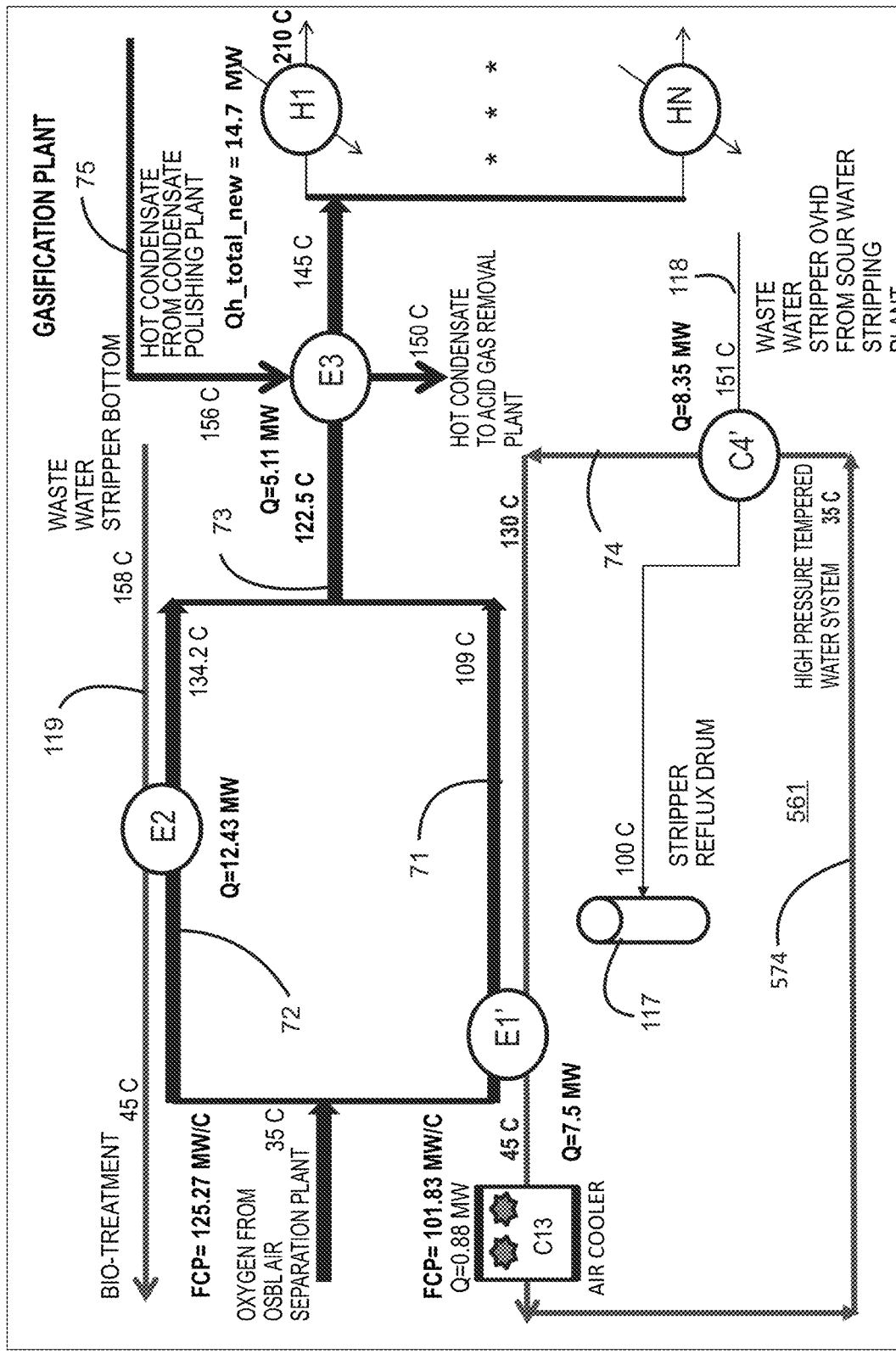
FIG. 22 is a schematic diagram illustrating a portion of the integrated process scheme illustrated in FIG. 21 according to an embodiment of the present invention.

Energy efficient "Gasification Plant-Directed" process scheme #5, detailed in FIGS. 21 and 22, can save the carbon-based feedstock-gasification multi-generation facility/apparatus about 63% of the gasification plant's energy consumption and energy-based GHG emissions. It integrates the gasification and sour water stripping plants 551, 554, through a high pressure hot (e.g., tempered) water/steam circuit or other system 561, collectively referred to as a "hot water system 561" for simplicity, that circulates a hot/cooling water/steam stream, collectively referred to as a "hot water stream 574," which functions as a buffer to collect the thermal load in the sour water stripper overhead stream 118 to both cool the sour water stripper overhead stream 118 and heat the first branch 71 of the oxygen feed 73 to the gasification reactor. The hot water stream 574 of the hot water system 561 first interfaces with or otherwise flows through, i.e., into and out of, a repurposed or substitute heat exchanger unit C4', thermal load of about 8.35 MW, to heat the collect heat from the sour water stripper overhead stream 118, being heated from 35° C. to 130° C., and then flows through added heat exchanger unit E1, thermal load of about 7.5 MW, to heat the first branch 71 of the oxygen feed 73 from 35° C. to 109° C. After heating the first branch 71, the hot water stream 574, at a temperature of approximately 45°

C., is returned through a trim and/or air cooler/cooling unit C13, thermal load of about 0.88 MW to cool the return stream from 45° C. to 35° C., prior to cycling back through heat exchanger C4'.

The sour water stripper bottom stream 75, at a temperature of approximately 158° C., interfaces with or otherwise flows through an added heat exchanger E2, thermal load of about 12.43 MW, and route to the biotreatment plant, to heat the second branch 72 from the gasification plant oxygen feed 73 from 35° C. to 134° C., and to be cooled from 158° C. to 45° C.—negating the need for cooling units C5 and C6 (FIG. 9). The two branches 71, 72, upon mixing to one stream 73 at a temperature of 122.5° C., proceed through the third added heat exchanger unit E3, thermal load of approximate 5.11 MW, that uses hot condensate 75 at 156° C. to heat the mixed branch from 122.5° C. to 145° C. before proceeding through the gasification plant steam heater H1, en route to the gasification reactor 61, and the oxygen stream 73 the hot condensate 75 from 156° to 150° C. prior to proceeding en route to a modified acid gas removal plant such as, for example, acid gas removal plant 1252 (FIG. 29).

The invention or inventions have been described in considerable detail with specific reference to the illustrated embodiments, It will be apparent, however, that various modifications and changes can be made within the spirit and scope of the invention as described in the foregoing specification. Additionally, although specific terms have been employed, the terms were used in a descriptive sense only and not for purposes of limitation. For example, when describing a polished cold condensate stream from the condensate polishing plant or facility being split into two streams, it should be understood that although illustrated in the singular sense, many of the components shown in the figures may, and typically are, provided in "trains" of multiple such components, rather than a single component, and thus, may be provided in sets of first and second branches of the condensate stream. Another example includes the oxygen feed from the air separation plant to the gasification reactor. The reactor can include a train of such gasification reactor's each receiving an oxygen feed, and in the case where the "oxygen feed" is split to have the top stream and wastewater bottom stream (or streams) from the sour water stripper (or train of strippers) provide separate heating loads to the split portions of the oxygen feed, this split portions can each include sets of split portions either receiving divided top and bottom streams of the sour water stripper, separate top and bottom streams from a train of strippers, or a combination thereof. A further example includes the use of the phrases "tempered" water stream," "tempered water system," and "tempered water circuit," which have been employed to describe a steam-hot water system, "tempered water" does not imply, but also does not exclude, mixing with cooling water to "temper" the temperature of the tempered water stream. Additionally, "tempered water" does not imply liquid water or exclude steam flowing through the "tempered water system (circuit)," as a result of exchanging heat with one of the various heat exchangers. Additionally, although the "tempered water circuit" may have been illustrated between a single set of components, groups of components, process streams, and/or groups of process streams, the circuit may or may not interface with other components and/or process streams.

Additionally, as noted previously, although specific temperatures, thermal loads of the heat exchanger units, corresponding cooling loads of the cold streams, heating duties of the heating units, and/or cooling duties of the units were shown, one of ordinary skill in the art would recognize that the various specific temperatures, thermal loads of the heat exchanger units, corresponding cooling loads of the cold streams, heating duties of the heating units, and/or cooling duties of the units function within certain operating windows; and that these snapshot values and operating windows are related to corresponding pressures, stream flow rates, heat capacity flowrates or other stored thermal energy attributes.

Further, one or more specific embodiments of the illustrated apparatus/sites, facilities, plants, sections, systems, and/or process schemes are described through the exemplary schematic diagrams. In an effort to provide a more concise description of these schemes/embodiments, not all features of an actual implementation are shown in the figures and/or described in the specification. It should be appreciated that in the development of any such actual implementation, specific decisions must be made to achieve the developer's specific goals, such as compliance with system-related, business-related, and operations-and-control related, as well as apparatus/site-related constraints, which may vary from one implementation to another. Moreover, it should be noted that such a development effort might be complex and time consuming, but would nevertheless, such undertaking of design, fabrication, manufacture and control would not require undue experimentation for those of ordinary skills having the benefit of this disclosure document.

This application claims priority to and the benefit of U.S. Provisional Patent Application Ser. No. 62/018,604, by Noureldin, titled "Energy Efficient Gasification Based Multi Generation Apparatus Employing Advanced Process Schemes and Related Methods" filed on Jun. 28, 2014, which is related to U.S. patent application Ser. No. 13/099,144, by Noureldin, titled "Energy-Efficient and Environmentally Advanced Configurations for Naptha Hydrotreating Process" filed on May 2, 2011, which are each incorporated herein by reference in their entireties. This application also relates to: U.S. patent application Ser. No. 14/692,633, by Noureldin, titled "Energy Efficient Gasification Based Multi Generation Apparatus Employing Advanced Process Schemes and Related Methods" filed on the same day as this application, Apr. 21, 2015; U.S. patent application Ser. No. 14/292,666, by Noureldin, titled "Energy Efficient Gasification-Based Multi Generation Apparatus Employing Energy Efficient Acid Gas Removal Plant-Directed Process Schemes and Related Methods" filed on the same day as this application, Apr. 21, 2015; and U.S. patent application Ser. No. 14/692,673, by Noureldin, titled "Energy Efficient Apparatus Employing Energy Efficient Process Schemes Providing Enhanced Integration of Gasification-Based Multi-Generation and Hydrocarbon Refining Facilities and Related Methods" filed on the same day as this application, Apr. 21, 2015; all of which are each incorporated herein by reference in their entireties.

That claimed is:

1. A gasification-based multi-generation apparatus, comprising:
   a gasification system configured to generate the raw syngas feed from a carbon-based feedstock, the gasification system comprising:
   a gasification plant or facility;
   a condensate polishing plant or facility;
   a sour water stripping plant or facility comprising a sour water stripper;
   a gasification reactor; and
   a gasification system energy management system;
   wherein the gasification system energy management system comprises:

a first gasification system process-to-process heat exchanger unit positioned to receive a polished cold condensate stream and an overhead stream of the sour water stripper to add a thermal load to the polished cold condensate stream and to cool the overhead stream of the sour water stripper;

a second gasification system process-to-process heat exchanger unit positioned to receive the polished cold condensate stream having the added thermal load from the overhead stream of the sour water stripper and to receive at least a portion of an oxygen feed to the gasification reactor to provide heat energy to the at least a portion of the oxygen feed and to remove at least a portion of the added thermal load added to the polished cold condensate stream; and a third gasification system process-to-process heat exchanger unit positioned to receive a wastewater bottom stream from the sour water stripper and to receive at least a portion of the oxygen feed to the gasification reactor to provide heat energy to the at least a second portion of the oxygen feed to the gasification reactor and to cool the wastewater bottom stream from the sour water stripper; and a fourth gasification system process-to-process heat exchanger unit positioned to receive a hot condensate stream and the oxygen feed to the gasification reactor to provide heat energy to heat the oxygen feed to the gasification reactor and to cool the hot condensate stream;

wherein the sour water stripping plant or facility is integrated into the gasification plant or facility through at least the wastewater bottom stream from the sour water stripper.

2. The apparatus as defined in claim 1, wherein at least a portion of the oxygen feed to the gasification reactor received by the third gasification system process-to-process heat exchanger unit is substantially the entire oxygen feed to the gasification reactor.

3. The apparatus as defined in claim 1, further comprising:
an acid gas removal system configured to remove acidic contaminants from a raw syngas feed to thereby provide a treated syngas feed, the acid gas removal system comprising an acid gas removal plant or facility;
wherein the at least a portion of an oxygen feed to the gasification reactor received by the second gasification system process-to-process heat exchanger unit comprises a first branch of the oxygen feed to the gasification reactor;
wherein the at least a portion of an oxygen feed to the gasification reactor received by the third gasification system process-to-process heat exchanger unit comprises a second branch of the oxygen feed to the gasification reactor;
wherein the acid gas removal system energy management system comprises:
a sixth acid gas removal system process-to-process heat exchanger unit positioned to receive at least a portion of the polished cold condensate stream from the condensate polishing plant or facility and a reactor effluent bottom stream from a contaminant hydrolysis reactor to provide heat energy to the at least a portion of the polished cold condensate stream and to cool the reactor effluent bottom stream;
the acid gas removal plant or facility being integrated with the condensate polishing plant or facility through the at least a portion of the polished cold condensate stream received by the sixth acid gas removal system process-to-process heat exchanger unit,
the condensate polishing plant or facility, the acid gas removal plant or facility, the sour water stripping plant or facility being integrated with the gasification plant or facility through at least the polished condensate stream received by the sixth acid gas removal system process-to-process heat exchanger unit and the first and the second gasification system process-to-process heat exchanger units, en route to a power generation plant or facility, working as a buffer to indirectly gather heat energy from the bottom stream of the contaminant hydrolysis reactor and the overhead stream of the sour water stripper to heat the first branch of the oxygen feed to the gasification reactor, and
the sour water stripping plant or facility being further integrated with the gasification plant or facility through at least the wastewater bottom stream from the sour water stripper en route to a bio treatment unit, plant or facility, to provide heat energy to heat the second branch of the oxygen feed to the gasification reactor.

4. The apparatus as defined in claim 1,
wherein the at least a portion of an oxygen feed to the gasification reactor received by the third gasification system process-to-process heat exchanger unit comprises a second branch of the oxygen feed to the gasification reactor; and
wherein the gasification system energy management system comprises:
a high-pressure tempered water circuit;
a fifth gasification system process-to-process heat exchanger unit positioned to receive a tempered water stream from the tempered water circuit and the overhead stream of the sour water stripper to add a thermal load to the tempered water and to cool the overhead stream of the sour water stripper; and
a sixth gasification system process-to-process heat exchanger unit positioned to receive the tempered water stream having the added thermal load from the overhead stream of the sour water stripper and the first branch of the oxygen feed to the gasification reactor to provide heat energy to the first branch of the oxygen feed and to remove at least a substantial portion of the added thermal load added to the tempered water stream,
the sour water stripping plant or facility being integrated with the gasification plant or facility through at least the tempered water circuit functioning as a buffer to collect the thermal load from the overhead stream of the sour water stripper to heat the first branch of the oxygen feed to the gasification reactor, and the wastewater bottom stream from the sour water stripper provide heat energy to heat the second branch of the oxygen feed while en route to a bio treatment unit, plant or facility, to provide heat energy to heat the second branch of the oxygen feed to the gasification reactor.

5. The apparatus as defined in claim 1, further comprising;
an acid gas removal system configured to remove acidic contaminants from a raw syngas feed to thereby provide a treated syngas feed, the acid gas removal system comprising an acid gas removal plant or facility;
wherein the at least a portion of an oxygen feed to the gasification reactor received by the second gasification system process-to-process heat exchanger unit comprises the first branch of the oxygen feed to the gasification reactor;

wherein the at least a portion of an oxygen feed to the gasification reactor received by the third gasification system process-to-process heat exchanger unit comprises a second branch of the oxygen feed to the gasification reactor;

wherein the acid gas removal system energy management system comprises a sixth acid gas removal system process-to-process heat exchanger unit positioned to receive at least a portion of the polished cold condensate stream from the condensate polishing plant or facility, and a reactor effluent bottom stream from a contaminant hydrolysis reactor to provide heat energy to the at least a portion of the polished cold condensate stream and to cool the reactor effluent bottom stream; and the acid gas removal plant or facility being integrated with the condensate polishing plant or facility through the at least a portion of the polished cold condensate stream received by the sixth acid gas removal system process-to-process heat exchanger unit, the condensate polishing plant or facility, the acid gas removal plant or facility, the sour water stripping plant or facility being integrated with the gasification plant or facility through at least the polished condensate stream received by sixth acid gas removal system process-to-process heat exchanger unit and the first and the second gasification system process-to-process heat exchanger units, en route to a power generation plant or facility, working as a buffer to indirectly gather heat energy from the bottom stream of the contaminant hydrolysis reactor and the overhead stream of the sour water stripper to heat the first branch of the oxygen feed to the gasification reactor, and the sour water stripping plant or facility being further integrated with the gasification plant or facility through at least the wastewater bottom stream from the sour water stripper en route to a bio treatment unit, plant or facility, to provide heat energy to heat the second branch of the oxygen feed to the gasification reactor.

6. The apparatus as defined in claim 1,
wherein the at least a portion of an oxygen feed to the gasification reactor received by the third gasification system process-to-process heat exchanger unit comprises a second branch of the oxygen feed to the gasification reactor; and
wherein the gasification system energy management system comprises:
  a high-pressure tempered water circuit;
  a fifth gasification system process-to-process heat exchanger unit positioned to receive a tempered water stream from the tempered water circuit and the overhead stream of the sour water stripper to add a thermal load to the tempered water and to cool the overhead stream of the sour water stripper; and
  a sixth gasification system process-to-process heat exchanger unit positioned to receive the tempered water stream having the added thermal load from the overhead stream of the sour water stripper and the first branch of the oxygen feed to the gasification reactor to provide heat energy to the first branch of the oxygen feed and to remove at least a substantial portion of the added thermal load added to the tempered water stream;
the sour water stripping plant or facility being integrated with the gasification plant or facility through at least the tempered water circuit functioning as a buffer to collect the thermal load from the overhead stream of the sour water stripper to heat the first branch of the oxygen feed to the gasification reactor, and the wastewater bottom stream from the sour water stripper while en route to a bio treatment unit, plant or facility, to provide heat energy to heat the second branch of the oxygen feed to the gasification reactor.

7. The apparatus as defined in claim 1, further comprising:
an acid gas removal system configured to remove acidic contaminants from a raw syngas feed to thereby provide a treated syngas feed;
the acid gas removal system comprising an acid gas removal plant or facility, the acid gas removal plant or facility comprising a solvent regenerator, a contaminant hydrolysis reactor and an acid gas contaminant absorber;
the acid gas removal system comprising an acid gas removal system energy management system comprising:
  a fourth acid gas removal system process-to-process heat exchanger unit defining a solvent regenerator reboiler positioned to receive at least a portion of a soot scrubber bottom stream received from the gasification system and a solvent regenerator tray stream extracted from a solvent stream tray of the solvent regenerator to provide heat energy to reboil the extracted solvent regenerator tray stream and to cool the soot scrubber bottom stream,
  a fifth acid gas removal system process-to-process heat exchanger unit positioned to receive at least a portion of a polished cold condensate stream received from a condensate polishing plant or facility, and a solvent regenerator top stream from the solvent regenerator to provide heat energy to the at least a portion of the polished cold condensate stream and to cool the solvent regenerator top stream,
  a sixth acid gas removal system process-to-process heat exchanger unit positioned to receive at least a portion of the polished cold condensate stream from the condensate polishing plant or facility, to provide heat energy to the at least a portion of the polished cold condensate stream; and
  a seventh acid gas removal system process-to-process heat exchanger unit positioned to receive the raw syngas feed from the gasification system and a hot condensate stream from one or more of the following: the gasification plant or facility, a power generation plant or facility, an adjacent refinery, and an adjacent chemical plant, and to provide heat energy to the raw syngas feed and to cool the hot condensate stream from the gasification system;
wherein the at least a portion of the polished cold condensate stream received by the fifth process-to-process heat exchanger unit of the acid gas removal system comprises a first branch of the polished cold condensate stream receiving heat energy from the solvent regenerator top stream and the at least a portion of the polished cold condensate stream received by the sixth acid gas removal system process-to-process heat exchanger unit defines a second branch of the polished cold consecrate stream;
the first and the second branches of the polished cold conduit stream being recombined into a single polished cold conduit stream and received by the gasification plant or facility after receiving heat energy at the fifth and sixth process-to-process heat exchanger units, and
the acid gas removal plant or facility being integrated with the condensate polishing plant or facility through the at least a portion of the polished cold condensate stream received by the sixth acid gas removal system process-to-process heat exchanger unit, the acid gas removal plant or facility being integrated with at least the condensate polishing plant or facility and the gasification plant or facility through at least the first and the second branches of the polished condensate stream from the condensate polishing plant or facility, received by the fifth and the sixth acid gas removal system process-to-process heat exchanger units and the single polished cold conduit stream received by one or more of the first and second gasification system process-to-process heat exchanger units, working as a buffer to indirectly gather heat energy from the solvent regenerator top stream and a bottom stream of the contaminant hydrolysis reactor, to heat at least portions of the oxygen feed to the gasification reactor, the acid gas removal plant or facility being further integrated with the gasification plant or facility through the soot scrubber bottom stream to provide heat energy to heat the solvent regenerator reboiler.

8. The apparatus as defined in claim 7, wherein the solvent regenerator has a solvent regenerator bottom functioning at an operating pressure of between approximately 1.2 and 1.5 barg to thereby minimize pressure drop across column portions of the solvent regenerator.

9. The apparatus as defined in claim 1, further comprising an acid gas removal system configured to remove acidic contaminants from a raw syngas feed to thereby provide a treated syngas feed;

the acid gas removal system comprising an acid gas contaminant absorber, a solvent regenerator, and an acid gas removal system energy management system, the acid gas removal system energy management system comprising:

a first acid gas removal system process-to-process heat exchanger unit positioned to receive a hot condensate stream received from the gasification system and the raw syngas feed from the gasification system to provide heat energy to the raw syngas feed and to cool the hot condensate stream from the gasification system, a second acid gas removal system process-to-process heat exchanger unit positioned to receive the hot condensate stream received from the gasification system and the treated syngas feed from the acid gas contaminant absorber to provide heat energy to the treated syngas feed and to further cool the hot condensate stream from the gasification system, a third acid gas removal system process-to-process heat exchanger unit positioned to receive a reactor effluent bottom stream from a contaminant hydrolysis reactor and at least a portion of a rich solvent bottom stream from the acid gas contaminant absorber to provide heat energy to the rich solvent bottom stream and to cool the reactor effluent bottom stream, a fourth acid gas removal system process-to-process heat exchanger unit defining a solvent regenerator reboiler positioned to receive at least a portion of a soot scrubber bottom stream received from the gasification system and a solvent regenerator tray stream extracted from a solvent stream tray of the solvent regenerator to provide heat energy to reboil the extracted solvent regenerator tray stream and to cool the soot scrubber bottom stream, and a fifth acid gas removal system process-to-process heat exchanger unit positioned to receive at least a portion of a polished cold condensate stream received from a condensate polishing plant or facility, and a solvent regenerator top stream from the solvent regenerator to provide heat energy to the at least a portion of the polished cold condensate stream and to cool the solvent regenerator top stream.

10. The apparatus as defined in claim 1, further comprising an acid gas removal system comprising an acid gas removal plant or facility comprising an acid gas removal system energy management system;

wherein the acid gas removal system energy management system comprises first, second, third, fourth, and fifth acid gas removal system process-to-process heat exchanger units.

11. The apparatus as defined in claim 10, wherein the fourth acid gas removal system process-to-process heat exchanger unit defines a solvent regenerator having a solvent regenerator bottom functioning at an operating pressure of between approximately 1.2 and 1.5 barg to thereby minimize pressure drop across column portions of the solvent regenerator.

12. A carbon-based feedstock-gasification multi-generation apparatus, comprising:

an acid gas removal system configured to remove acidic contaminants from a raw syngas feed to thereby provide a treated syngas feed; and a gasification system configured to generate the raw syngas feed from a carbon-based feedstock, the gasification system integrated with, or containing and integrated with a sour water stripping system comprising a sour water stripper;

the acid gas removal system comprising an acid gas contaminant absorber, a solvent regenerator, and an acid gas removal system energy management system, the acid gas removal system energy management system comprising:

a first acid gas removal system process-to-process heat exchanger unit positioned to receive a hot condensate stream from the gasification system and the raw syngas feed from the gasification system to provide heat energy to the raw syngas feed and to cool the hot condensate stream from the gasification system, a second acid gas removal system process-to-process heat exchanger unit positioned to receive the hot condensate stream from the gasification system and the treated syngas feed from the acid gas contaminant absorber to provide heat energy to the treated syngas feed and to further cool the hot condensate stream from the gasification system, a third acid gas removal system process-to-process heat exchanger unit positioned to receive a reactor effluent bottom stream from a contaminant hydrolysis reactor and a rich solvent bottom stream from the acid gas contaminant absorber to provide heat energy to the rich solvent bottom stream and to cool the reactor effluent bottom stream, a fourth acid gas removal system process-to-process heat exchanger unit defining a solvent regenerator reboiler positioned to receive a soot scrubber bottom stream from the gasification system and a solvent regenerator tray stream extracted from a solvent stream tray of the solvent regenerator to provide heat energy to reboil the extracted solvent regenerator tray stream and to cool the soot scrubber bottom stream, a fifth acid gas removal system process-to-process heat exchanger unit positioned to receive a first branch of a polished cold condensate stream from a condensate polishing unit, plant, or facility, and a solvent regenerator top stream from the solvent regenerator to provide heat energy to the first branch of the polished cold condensate stream and to cool the solvent regenerator top stream, and a sixth acid gas removal system process-to-process heat exchanger unit positioned to receive a second branch of the polished cold condensate stream from the condensate polishing unit, plant, or facility, and the reactor effluent bottom stream from the contaminant hydrolysis reactor to provide heat energy to the second branch of the polished cold condensate stream and to cool the reactor effluent bottom stream;

the gasification system comprising a gasification reactor, a syngas fluid cooler reactor, and a soot ash removal unit comprising a soot quench column, a soot separator, a soot filter, a soot scrubber, the condensate polishing plant or facility and a gasification system energy management system, the gasification system energy management system comprising:

a first gasification system process-to-process heat exchanger unit positioned to receive the polished cold condensate stream and an overhead stream of the sour water stripper to add a thermal load to the polished cold condensate stream and to cool the overhead stream of the sour water stripper, a second gasification system process-to-process heat exchanger unit positioned to receive the polished cold condensate stream having the added thermal load from the overhead stream of the sour water stripper and a first branch of an oxygen feed to the gasification reactor to provide heat energy to the first branch of the oxygen feed and to remove at least a portion of the added thermal load added to the polished cold condensate stream by the first gasification system process-to-process heat exchanger unit, a third gasification system process-to-process heat exchanger unit positioned to receive a wastewater bottom stream from the sour water stripper and a second branch of the oxygen feed to the gasification reactor to provide heat energy to the second branch of the oxygen feed to the gasification reactor and to cool the wastewater bottom stream from the sour water stripper, and a fourth gasification system process-to-process heat exchanger unit positioned to receive a hot condensate stream and the oxygen feed to the gasification reactor to provide heat energy to the oxygen feed to the gasification reactor and to cool the hot condensate stream.

13. The apparatus as defined in claim 12, wherein the acid gas removal system comprises an acid gas removal plant, wherein the acid gas removal plant contains, is integrated with, or both contains and is integrated with the contaminant hydrolysis reactor, wherein the acid gas removal plant further comprises the acid gas contaminant absorber, the solvent regenerator, the acid gas removal system energy management system, and a syngas separation membrane pretreatment drum to clean syngas of water droplets to thereby provide the treated syngas, and wherein the acid gas removal system energy management system further comprises:

a seventh acid gas removal system process-to-process heat exchanger unit positioned to receive the hot condensate stream from the gasification system and demineralized water from a demineralized water tank to provide heat energy to the demineralized water and to further cool the hot condensate stream from the gasification system; and an eighth acid gas removal system process-to-process heat exchanger unit positioned to receive the demineralized water from the demineralized water tank and a lean solvent bottom stream from the solvent regenerator to provide heat energy to the demineralized water and to cool the lean solvent bottom stream.

14. The apparatus as defined in claim 13, wherein the solvent regenerator has a solvent regenerator bottom functioning at an operating pressure of between approximately 1.2 and 1.5 barg to thereby minimize pressure drop across column portions of the solvent regenerator.

* * * * *